(12) United States Patent
Hashimoto et al.

(10) Patent No.: US 6,973,639 B2
(45) Date of Patent: Dec. 6, 2005

(54) AUTOMATIC PROGRAM GENERATION TECHNOLOGY USING DATA STRUCTURE RESOLUTION UNIT

(75) Inventors: Keiji Hashimoto, Kawasaki (JP); Yuki Chujoh, Kawasaki (JP); Keisui Asai, Minato (JP); Jun Ginbayashi, Kawasaki (JP); Hiroyuki Yoshida, Kawasaki (JP); Rieko Yamamoto, Kawasaki (JP); Emiko Hamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 672 days.

(21) Appl. No.: 09/767,857

(22) Filed: Jan. 24, 2001

(65) Prior Publication Data

US 2001/0044932 A1    Nov. 22, 2001

(30) Foreign Application Priority Data

Jan. 25, 2000  (JP) .............................. 2000-015296
Oct. 23, 2000  (JP) .............................. 2000-322402

(51) Int. Cl.[7] .............................................. G06F 9/44
(52) U.S. Cl. ...................... 717/106; 717/109; 717/113; 715/809; 715/810; 715/967
(58) Field of Search .............................. 717/100–136; 703/22; 345/762, 161; 705/27, 6, 5; 704/257; 707/101, 6, 204; 700/90, 86; 713/200; 709/201; 716/18; 701/117; 715/809, 810, 967

(56) References Cited

U.S. PATENT DOCUMENTS

| | | | |
|---|---|---|---|
| 3,845,289 A | * | 10/1974 | French ........................ 701/117 |
| 4,831,580 A | * | 5/1989 | Yamada ....................... 717/105 |
| 4,949,253 A | * | 8/1990 | Chigira et al. .............. 717/107 |
| 5,212,634 A | * | 5/1993 | Washizaki et al. ............ 700/90 |
| 5,287,449 A | * | 2/1994 | Kojima ........................ 345/161 |
| 5,331,546 A | * | 7/1994 | Webber et al. ................. 705/6 |
| 5,381,548 A | * | 1/1995 | Matsuo ........................ 717/107 |
| 5,485,601 A | * | 1/1996 | Ching ......................... 717/106 |
| 5,522,078 A | * | 5/1996 | Matsuzuki ................... 717/107 |

(Continued)

OTHER PUBLICATIONS

Zohar Manna, Richard J. Waldinger, Toward automatic program synthesis, Mar. 1971, Communications of the ACM, vol. 14 Issue 3, pp.: 151-165.*

(Continued)

*Primary Examiner*—Tuan Dam
*Assistant Examiner*—Satish S. Rampuria
(74) *Attorney, Agent, or Firm*—Staas & Halsey LLP

(57) ABSTRACT

The present invention provides automatic program generation technology that enables the generation of a diverse range of programs with fewer models. The automatic program generation device of the present invention, which automatically generates programs that will perform the predetermined processing, comprises a plurality of data structure resolution units that respectively include a model program for a corresponding data structure, wherein the model program includes resolution logic for performing a setting peculiar to the predetermined processing; and a resolution unit for generating a program for performing the predetermined processing by acquiring resolution information relating to the setting peculiar to the predetermined processing for resolution logic included in the model program in the data structure resolution unit corresponding to a selected data structure and by synthesizing the model program and the resolution information for the resolution logic. In the present invention, model programs are prepared in correspondence with data structures. Compared with the preparation of a model for each use and/or processing flow, it enables the generation of a diverse range of programs with fewer models.

19 Claims, 30 Drawing Sheets

U.S. PATENT DOCUMENTS

| | | | | |
|---|---|---|---|---|
| 5,526,522 | A * | 6/1996 | Takeuchi | 717/107 |
| 5,572,437 | A * | 11/1996 | Rostoker et al. | 716/18 |
| 5,815,717 | A * | 9/1998 | Stack | 717/105 |
| 5,850,516 | A * | 12/1998 | Schneier | 713/200 |
| 5,862,325 | A * | 1/1999 | Reed et al. | 709/201 |
| 5,920,717 | A * | 7/1999 | Noda | 717/104 |
| 6,055,537 | A * | 4/2000 | LeTourneau | 707/101 |
| 6,088,717 | A * | 7/2000 | Reed et al. | 709/201 |
| 6,257,774 | B1 * | 7/2001 | Stack | 717/110 |
| 6,275,976 | B1 * | 8/2001 | Scandura | 717/120 |
| 6,345,288 | B1 * | 2/2002 | Reed et al. | 709/201 |
| 6,345,387 | B1 * | 2/2002 | Morrison | 717/170 |
| 6,405,361 | B1 * | 6/2002 | Broy et al. | 717/100 |
| 6,427,234 | B1 * | 7/2002 | Chambers et al. | 717/140 |
| 6,442,522 | B1 * | 8/2002 | Carberry et al. | 704/257 |
| 6,467,078 | B1 * | 10/2002 | Matsuba et al. | 717/100 |
| 6,470,323 | B1 * | 10/2002 | Suzuki et al. | 705/27 |
| 6,502,236 | B1 * | 12/2002 | Allen et al. | 717/136 |
| 6,536,037 | B1 * | 3/2003 | Guheen et al. | 717/151 |
| 6,601,232 | B1 * | 7/2003 | Burba et al. | 717/100 |
| 6,618,635 | B1 * | 9/2003 | Beck et al. | 700/86 |
| 6,634,019 | B1 * | 10/2003 | Rice et al. | 717/127 |
| 6,658,645 | B1 * | 12/2003 | Akuta et al. | 717/106 |
| 6,675,370 | B1 * | 1/2004 | Sundaresan | 717/106 |
| 6,772,407 | B1 * | 8/2004 | Leymann et al. | 717/100 |
| 6,799,190 | B1 * | 9/2004 | Boothby | 707/204 |
| 2002/0083420 | A1 * | 6/2002 | Zammit et al. | 717/135 |
| 2002/0162091 | A1 * | 10/2002 | Crocker | 717/126 |
| 2003/0167454 | A1 * | 9/2003 | Iordanov et al. | 717/104 |

OTHER PUBLICATIONS

David W. Embley, Forms-based automatic program generation, Jan. 1978, ACM Press, vol. 2, pp.: 972-979.*

Bik et al., Automatic data structure selection and transformation for sparse matrix computations, IEEE Transactions on, vol.: 7, Issue: 2, Feb. 1996, pp.: 109-126.*

Tracey et al., An automated framework for structural test-data generation, IEEE International Conference on, Oct. 13-16, 1998, pp.: 285-288.*

Garcia et al., A framework for automatic dynamic data mapping, IEEE Symposium on, Oct. 23-26, 1996, pp.: 92-99.*

Gupta, SPMD execution of programs with dynamic data structures on distributed memory machines, IEEE, Apr. 20-23, 1992 Page(s):232-241.*

Schmitz et al., PROGEN: a program generator to generate conversion programs for test patterns, IEEE, May 12-14, 1992 Page(s):165-168.*

Sloane, Generating dynamic program analysis tools, IEEE, Sep. 29-Oct. 2, 1997 Page(s):166-173.*

Calvez et al., A programmable multi-language generator for codesign, IEEE, Feb. 23-26, 1998 Page(s):927-928.*

Sirkin et al., Software components in a data structure precompiler, IEEE, May 17-21, 1993 Page(s):437-446.*

* cited by examiner

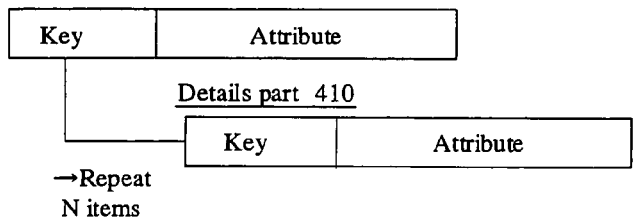

Fig.4

|  | Header part | Details part |
|---|---|---|
| Register slip | Register | Register |
| Update slip | Update | Update |
| Add detail | — | Register |
| ... | ... | ... |

Fig.5

```
Model program for slip·update
public void 《Operation name》(《Slip name》Msg entityInfo)
throws UserException {
  if(《Updateable state name》){
    mapFrom(entityInfo); //Update of attribute
    setState(《State name after update》);//Setting of state
    《Inherent check》
  }else{
    throw new CAAUserException(《Error Message》);
  }
}
```

Fig.6

==Third slip type resolution information input screen==   11e

Operation name: Authorization by section manager

Corresponding basic operation name: Update slip

Register slip
Update slip
Delete slip

Cancel

Fig.11

==Fourth slip type resolution information input screen==   11f

《Operation resolution part》

Updateable state name: Authorization being requested

State name after update: Request for authorization has made

Error message: "This cannot be authorized"

Inherent check: Authorization type="Division manager settlement slip"

Return   Generate   Cancel

Fig.12

| | Resource part | Reservation part | Reservation cell part |
|---|---|---|---|
| Register reservation | Register | Register | Register |
| Cancel reservation | Delete | Delete | Delete |
| Confirm vacant status | — | Search | — |
| Change reserved period | — | Update | Delete/Register |
| Change reserved resource | Search | Update | Delete/Register |
| Search by reservation condition | — | Search | — |
| ... | ... | ... | ... |

| Insurance / Product indemnity | Use and model | Special non-discharge agreement by age | Special family bike contract | Uninsured party injury insurance |
|---|---|---|---|---|
| A | • Ordinary private vehicle<br>• Small private vehicle<br>• Light private vehicle<br>• Two-wheeled vehicle<br>• Motorized bicycle | • 21 years<br>• 26 years<br>• 30 years<br>• Age irrelevant | Yes | Yes |
| B | • Ordinary private vehicle<br>• Small private vehicle<br>• Light private vehicle | • 21 years<br>• 26 years<br>• 30 years<br>• Age irrelevant | Yes | Yes |
| C | • Ordinary private vehicle<br>• Small private vehicle<br>• Light private vehicle | • 21 years<br>• 26 years<br>• 30 years<br>• Age irrelevant | Yes | Yes |
| D | • Ordinary private vehicle<br>• Small private vehicle<br>• Light private vehicle | • 21 years<br>• 26 years<br>• 30 years<br>• Age irrelevant | No | No |
| E | • Ordinary private vehicle<br>• Small private vehicle<br>• Light private vehicle<br>• Two-wheeled vehicle<br>• Motorized bicycle | • 50 years | No | No |

Sales slip

| Sale number | Date order issued | Client name | Total |
|---|---|---|---|
| 101 | 2/14/00 | Merchant A | 22000 |

Fig.31b

Invoice slip

| Invoice number | Invoice date | Invoiced to | Total |
|---|---|---|---|
| 201 | 2/29/00 | Merchant A | 17000 |

Fig.31c

Receipt slip

| Receipt number | Invoice date | Invoiced to | Total |
|---|---|---|---|
| 301 | 2/29/00 | Merchant A | 17000 |

Fig.31d

Transaction details

| Detail number | Product | Quantity | Unit price | Price |
|---|---|---|---|---|
| 1001 | Ball point pen | 100 | 100 | 10000 |
| 1002 | Correction fluid | 10 | 200 | 2000 |
| 1003 | Pencil | 100 | 50 | 5000 |
| 1004 | Eraser | 50 | 100 | 5000 |

| Product (X-axis) | Organization (Y-axis) | Time (T-axis) | | |
|---|---|---|---|---|
| | | Business year | Month | Daily |
| Product type | Headquarters | O | — | — |
| | Business division | O | O | — |
| | Section | — | — | — |
| Model | Headquarters | — | — | — |
| | Business division | O | O | — |
| | Section | O | O | — |
| Product | Headquarters | — | — | — |
| | Business division | — | O | — |
| | Section | O | O | O |

AUTOMATIC PROGRAM GENERATION TECHNOLOGY USING DATA STRUCTURE RESOLUTION UNIT

TECHNICAL FIELD OF THE INVENTION

The present invention relates to technology that aids the writing of programs, and more particularly to automatic program generation technology that uses model programs that correspond to data structures.

BACKGROUND OF THE INVENTION

In conventional computer aided program generation systems, formats are prepared for describing specifications for the programs to be generated and a generator method that generates programs from the specifications described in accordance with the formats is generally used. The important matters for evaluation in these methods are: (a) how small can the specification description be in comparison to the scale of the program to be generated; and (b) how can the specification format be made more easily understood by the user than the structure of the program to be generated and how difficult can entry of mistakes be made. Focussing on (a), there are: (i) methods wherein patterns are made in accordance with the use and/or processing flow of the programs to be generated, and models are prepared for each pattern, and users describe only parts unique to the program to be generated; and (ii) methods wherein a format that is more descriptive than the program to be written is provided as a language for describing specifications.

SUMMARY OF THE INVENTION

The problem that arises when method (i) is adopted is that models must cover a substantial number of pattern in order to reduce the amount of specifications to be written by the user. This means that many models that correspond to uses and/or processing flows must be prepared to suit the diversity of the programs to be generated.

An object of the present invention is to provide automatic program generation technology that can generate a diverse range of programs using fewer models.

The automatic program generation apparatus of the first aspect of the present invention, that automatically generates a program that will perform a predetermined processing, comprises: a plurality of data structure resolution units that respectively include a model program for a corresponding data structure, wherein the model program includes a resolution logic for performing a setting peculiar to the predetermined processing; and a resolution unit for generating a program for performing the predetermined processing by acquiring resolution information relating to the setting peculiar to the predetermined processing for a resolution logic included in the model program in the data structure resolution unit corresponding to a selected data structure and by synthesising the model program and the resolution information for the resolution logic. In the present invention, model programs are prepared in correspondence with data structures. Compared with the preparation of a model for each use and/or processing flow, it enables the generation of a diverse range of programs with fewer models.

The aforementioned resolution unit may have means for analyzing the resolution logic included in the model program in the data structure resolution unit corresponding to the selected data structure and for prompting a user to input the resolution information for the resolution logic. This enables the user to more easily input the resolution information for the resolution logic. Accordingly, it is more difficult for mistakes to enter the generated program.

The aforementioned automatic program generation apparatus can be implemented by a combination of an ordinary computer and programs. The programs are stored, for example, in storage media or storage devices including floppy disks, CD-ROMs, optical magnetic disks, semiconductor memory, or hard disks. The intermediate processing results will be temporarily stored in the storage device such as the main memory of the computer.

A generation program of the second aspect of the present invention, that is used to generate a program in accordance with a predetermined specification, includes: a first model program that prescribes a data structure comprising one or a plurality of record types and a link between record types if a plurality of record type exists, and that includes a resolution logic for performing a setting in accordance with the predetermined specification for the data structure; and a second model program that includes a resolution logic for performing a setting for an operation in accordance with the predetermined specification, and that corresponds to a basic operation executed for the data structure. The generation program corresponds the above data structure resolution unit.

In the embodiment of the present invention discussed hereinafter, a data structure resolution unit can be any of the following: a data structure resolution unit for a simple type data structure; a data structure resolution unit for a slip type data structure; a data structure resolution unit for a hierarchy type data structure; a data structure resolution unit for a tree type data structure; a data structure resolution unit for a stock type data structure; a data structure resolution unit for a time band reservation type data structure; a data structure resolution unit for a plan type data structure; a data structure resolution unit for a seat reservation type data structure; a data structure resolution unit for a composition type data structures; a data structure resolution unit for a detail-led slip type data structure; a data structure resolution unit for a pedigree type data structure; and a data structure resolution unit for a matrix type data structure.

BRIEF DESCRIPTION OF THE DRAWINGS

FIG. 4 is a schematic diagram of a slip type data structure;

FIG. 5 is a table that shows examples of the basic operations included in the operation base unit of a data structure resolution unit corresponding to a slip type data structure;

FIG. 6 shows an example of a model program corresponding to a slip update operation;

FIG. 11 shows a third resolution information input screen for a data structure resolution unit for a slip type data structure;

FIG. 12 shows a fourth resolution information input screen for a data structure resolution unit for a slip type data structure;

FIG. 23 shows an example of a table of combinations of insurance products and securities for vehicle insurance;

FIG. 24 shows an example in which FIG. 23 is shown as a matrix type data structure;

FIG. 31a is an example of a sales slip used to explain a detail-led slip type data structure;

FIG. 31b is an example of an invoice slip used to explain a detail-led slip type data structure;

FIG. 31c is an example of a receipt slip used to explain a detail-led slip type data structure;

FIG. 31d is an example of transaction details used to explain a detail-led slip type data structure;

DETAIL DESCRIPTION OF THE PREFERRED EMBODIMENTS

Figure 1:
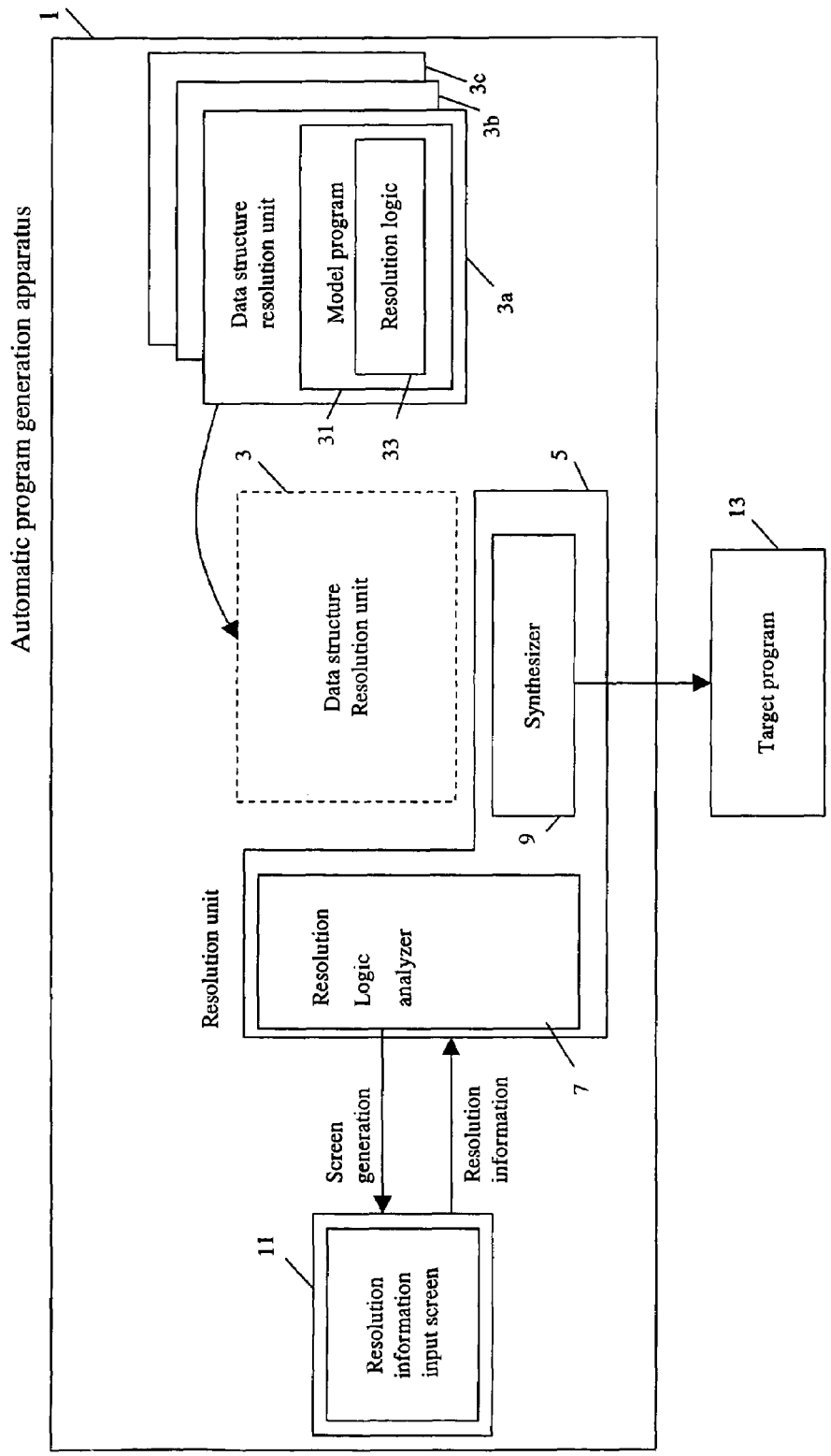
FIG. 1 is a block diagram that shows an overview of the automatic program generation apparatus.

An overview of the automatic program generation apparatus of an embodiment of the present invention is shown in FIG. 1. The automatic program generation apparatus 1 comprises data structure resolution units 3, a resolution unit 5 that includes a resolution logic analyzer 7 and a synthesiser 9, and a resolution information input screen 11. A plurality of data structure resolution units 3 are provided for respective data structures (3a, 3b, and 3c in FIG. 1) and the resolution unit 5 processes the data structure resolution unit 3 that corresponds to the data structure selected by the user. The data structure resolution 3 includes a model program 31 that includes resolution logic 33 for providing settings peculiar to the program to be generated. The resolution logic analyzer 7 in the resolution unit 5 analyzes the resolution logic 33 of the data structure resolution unit 3 and generates an input screen 11 that prompts the user to enter resolution information. In accordance with the specification of the program to be generated, the user enters resolution information for the resolution logic 33 on the input screen 11. The synthesiser 9 of the resolution unit 5 generates the target program 13 by synthesizing the model program 31 of the data structure resolution unit 3 and the resolution information for the resolution logic 33 entered by the user.

Figure 2:
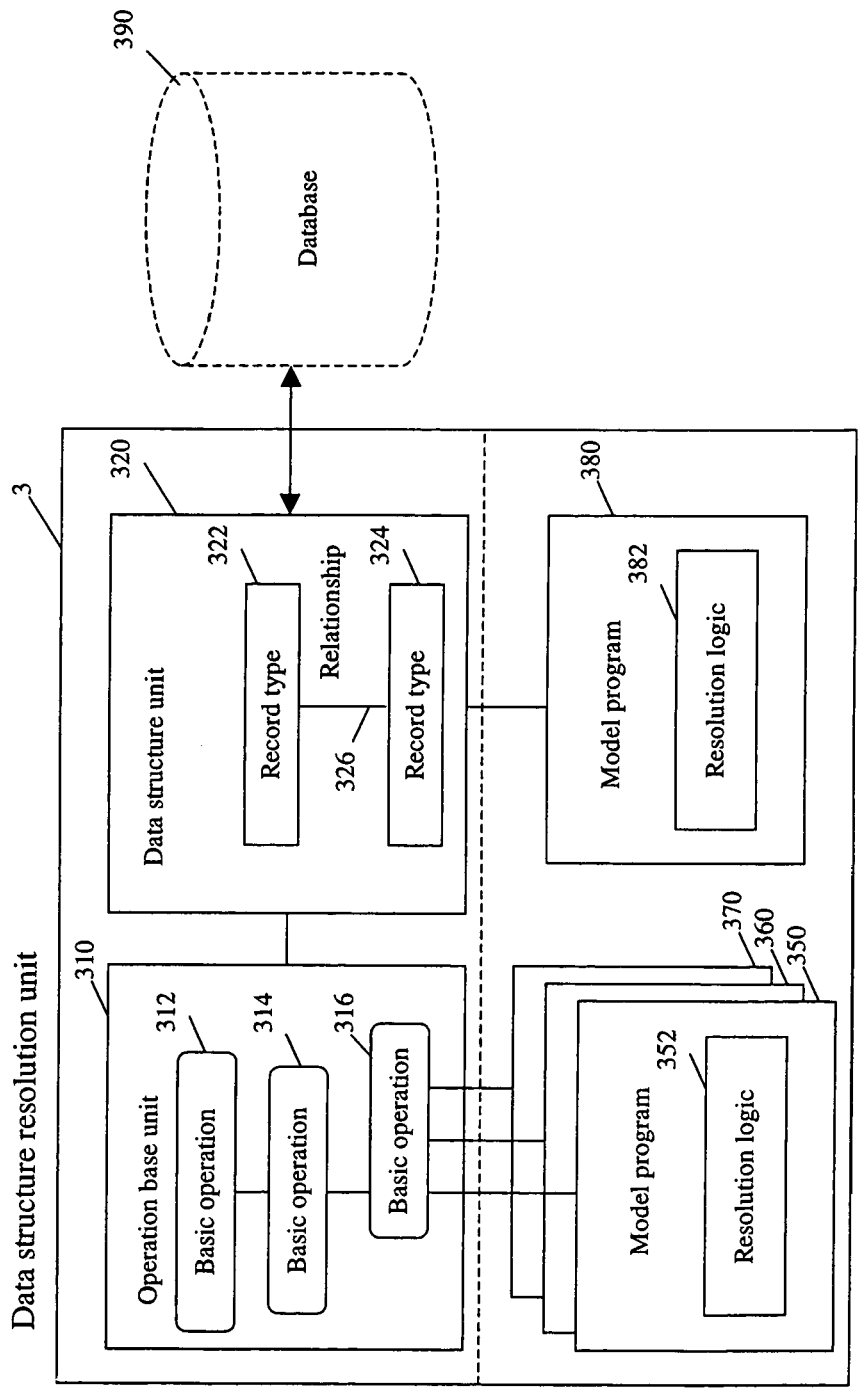
FIG. 2 is a block diagram that shows an overview of the data structure resolution unit.

FIG. 2 shows an overview of a data structure resolution unit 3. The data structure unit 320 in the data structure resolution unit 3 is a unit that prescribes the data structure that corresponds to this data structure resolution unit 3. That is, it prescribes the data structure using one or a plurality of record types 322 and 324 and the link 326 that shows the relationship between the plurality of record types if the plurality of record types exist. In addition to prescribing data structures, this data structure unit 320 has an interface with the database 390. That is, it comprises a function that outputs data stored in record types 322 and 324 to the database and a function that reads data from the database to form structures in accordance with both record types 322 and 324 and the relationship between record types. The database 390 is not included in the data structure resolution unit 3. Accordingly, the database 390 is drawn as a dotted line in FIG. 2.

This data structure unit 320 is, in actual, a model program 380. As discussed above, the model program 380 prescribes the data structure handled by the data structure resolution unit 3 and has an interface with the database 390. The model program 380 also includes resolution logic 382. This resolution logic 382 enables settings for the data structure that is handled by the data structure resolution unit 3. For example, it enables the attributes and types of records to be set. Since the data structure is already determined, the parts that can be set by the resolution logic 382 in the model program 380 that corresponds to the data structure unit 320 have less freedom than the resolution logic in the model programs for operations discussed later.

The operation base unit 310 performs basic operations 312 through 316, which are the basic operations for the data structure prescribed by the data structure unit 320. The basic operations 312 through 316 are operations required in correspondence with the data structure, for example, insert record, link, update, search, and delete.

This operation base unit 310 is also, in actual, the model programs 350 through 370. In FIG. 2, the model program 350 corresponds to the basic operation 312, the model program 360 to the basic operation 314, and the model program 370 to the basic operation 316. Thus, model programs 350 through 370 that respectively correspond to basic operations 312 through 316 are prepared. Model programs 350 through 370 perform operations for data items included in each record and are provided in a form of a program with parts that can be embedded. The part of the model programs 350 through 370 that can be embedded is the resolution logic 352. The resolution logic 352 provides the means for embedding the work logic peculiar to the target program into the model programs 350 through 370. In actual fact, the place where the information should be embedded, the information to be embedded, and the format of this information are provided in the model programs 350 through 370 using a tagged language.

1. Slip Type Data Structure

Figure 3:
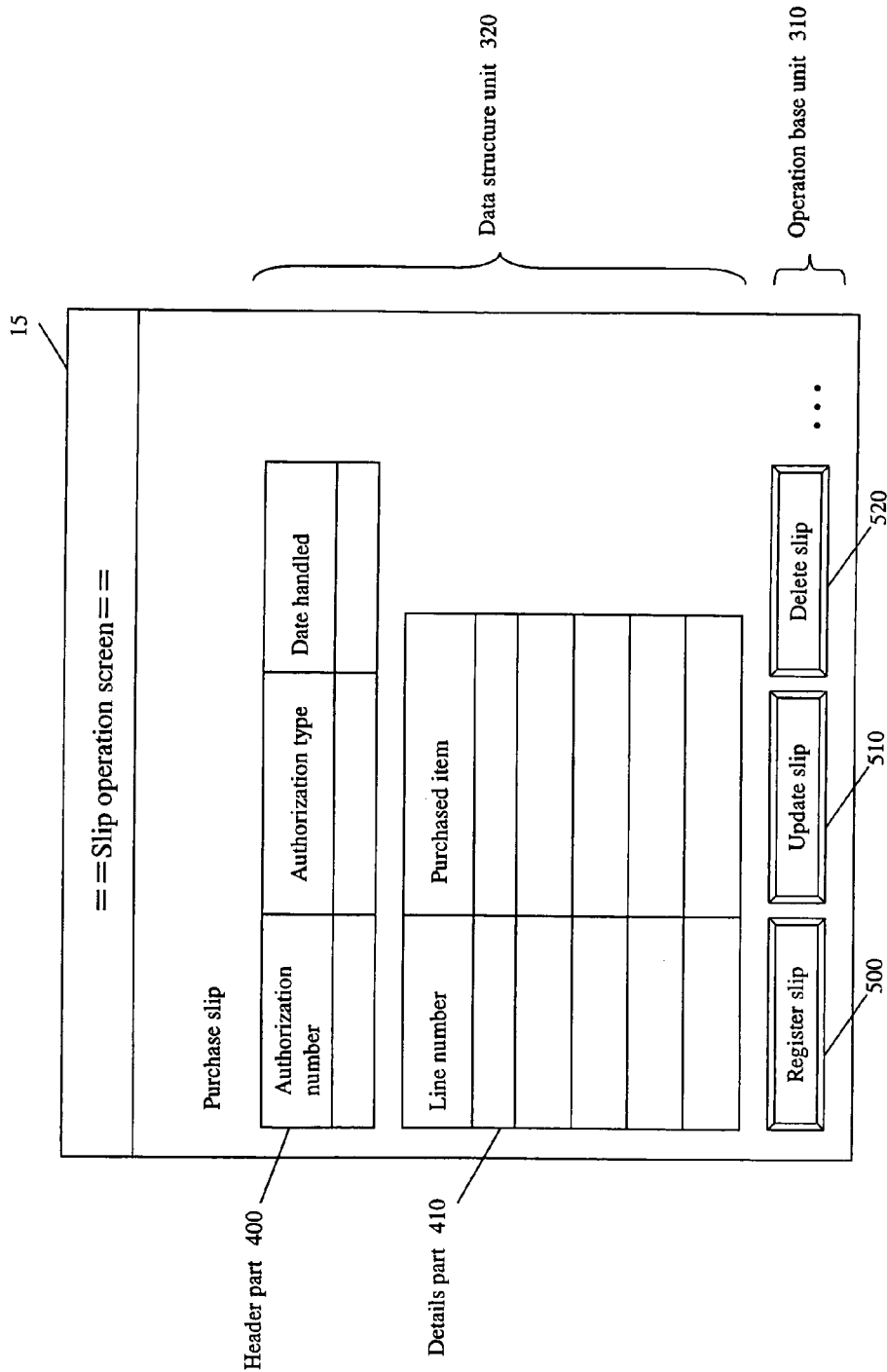
FIG. 3 shows an example of a slip operation screen output by a program for processing a slip type data structure.

To enable this embodiment to be understood better, data structures will be explained below one by one. For example, now we consider a case of the generation of a program that outputs the slip operation screen 15 as shown in FIG. 3. The slip operation screen 15 is a screen for operating purchase slips and includes data relating to the data structure unit 320 and operation buttons 500 through 520, which relate to the operation base unit 310. The data relating to the data structure unit 320 includes a table for authorization numbers, authorization types, and handling dates included in the header part 400 and a table for line numbers and purchased items included in the details part 410. The operation buttons relating to the operation base unit 310 include a slip register button 500 for performing a slip registration operation, a slip update button 510 for performing a slip update operation, a slip delete button 520 for performing a slip deletion operation and etc.

The program that outputs the slip operation screen 15 as shown in FIG. 3 use the slip type data structure. Accordingly, when generating such a type of programs, a data structure resolution unit 3 that corresponds to the slip type data structure must be selected. In the slip type data structure, information is handled in a header unit and the header manages details. The data structure unit 320 in the data structure resolution unit 3 that corresponds to the slip type data structure can be shown, for example, as in FIG. 4. That is, it can be shown as a header part 400 that includes a key and an attribute and a details part 410 that is linked from the header part 400 and includes a key and an attribute. One header part 400 can be linked by the N details parts 410 (N is an integer of 0 or more).

Also, the operation base unit 310 of the data structure resolution unit 3 includes basic operations of types such as those shown below. The character strings inside the brackets are method names.

(1) Find header (findHeaderByKey)

Searches for a slip header that has the designated header key.

(2) Find details (findDetailsByKey)

Searches for slip details that have the designated header key.

(3) Find detail (findDetailByKey)

Searches for a slip detail that has the designated header key by designating a line number.

(4) Find slip (findSlipByKey)

Searches for a slip that has the designated header key.

(5) Find header by condition

Searches for a header by designating a condition, and acquires header information for one slip after the conditional search (nextHeader).

(6) Find slip by condition

Searches for a slip by designating a condition, and acquires all information for one slip after the conditional search (nextSlip).

(7) Create new header with key (createHeaderWithKey1)

By using the designated key, creates a new slip header, and returns the result as true or false.

(8) Create new header with key

By using the designated key, creates a new slip header (createHeaderWithKey2), and returns the created slip information.

(9) Create new header without key

Creates a new slip header without the designation of the key (createHeaderWithoutKey), and returns the created slip information.

(10) Create new slip with key (createSlipWithKey1)

By using the designated key, creates a new slip, and returns the result as true or false.

(11) Create new slip with key

By using the designated key, creates a new slip (createSlipWithKey2), and returns the created slip information.

(12) Create new slip without key

Creates a new slip without the designation of the key (createSlipWithoutKey), and returns the created slip information.

(13) Add details (insertDetails1)

Adds a plurality of details to an existing slip, and returns the result as true or false.

(14) Add details

Adds a plurality of details to an existing slip (insertDetails2), and returns the added slip information.

(15) Cancel details (cancelDetails)

Cancels details of an existing slip.

(16) Update header

Updates the contents of a header specified with a key and returns the result as true or false.

(17) Update header

Updates the contents of a header specified with a key and returns the results as the header contents.

(18) Update details

Updates the details of a slip designated with a key, and returns the result as true or false.

(19) Update details

Updates the details of a slip designated with a key, and returns the results as the updated slip contents.

(20) Update slip

Updates the contents of a slip designated with a key, and returns the result as true or false.

(21) Delete slip (removeSlip)

Physically deletes the header that has the designated key in addition to all details included in that header.

The basic operations explained in the above paragraphs are groups of even more detailed operations. For example, as shown in FIG. 5, the slip registration operation (create new slip, in previous paragraph) performs registration operations for the header part 400 and for the details part 410. The slip update operation (update slip, in previous paragraph) performs update operations for the header part 400 and for the details part 410. The details addition operation (add details, in previous paragraph) performs a registration operation for the details part 410.

As discussed above, model programs that include resolution logic are prepared for each basic operation in the operation base unit 310. FIG. 6 shows an example of a model program source for a slip update operation. In the example of FIG. 6, the part enclosed by <<>> is the resolution logic. The target program can be generated if the user enters resolution information in this part. In the example of FIG. 6, the operation name, slip name, updateable state names, state name after update, inherent check, and error messages are set in accordance with the target program specification. FIG. 6 is a model program for a slip update operation.

Since complex descriptions cannot be made with just the information enclosed in <<>>, the meanings of tags may be described in a separate tag list, and then the information in this tag list may be read out based on the information inside the <<>>. For example, it is possible that the reference destination to the tag list is included in the <<>> and data about the choices to be selected by the user is stored in the tag list.

Figure 7:
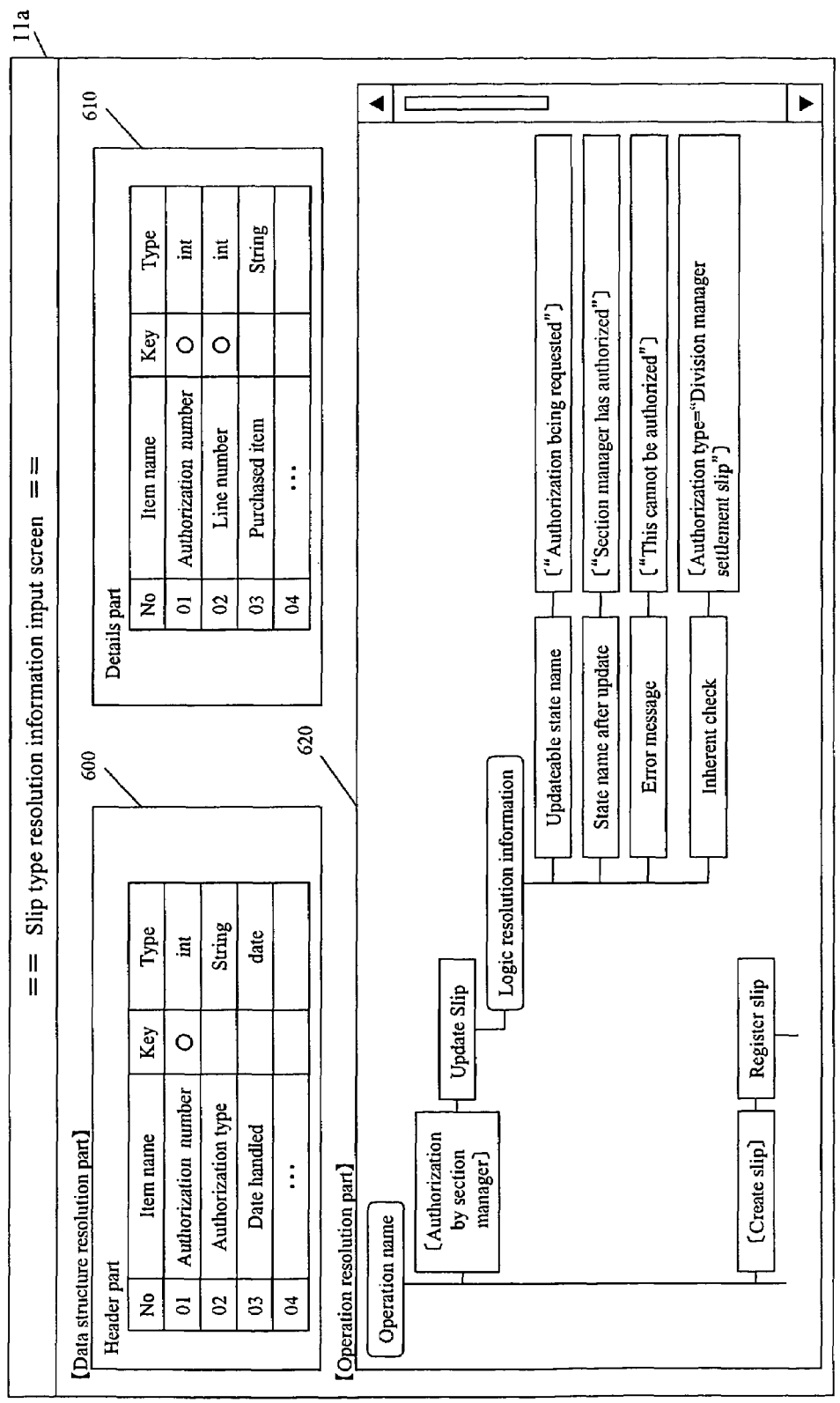
FIG. 7 shows an example of a screen for the input of resolution information for a data structure resolution unit for a slip type data structures.

When the resolution logic analyzer 7 in the resolution unit 5 shown in FIG. 1 analyzes the resolution logic 33 in the data structure resolution unit 3 that corresponds to the slip type data structure as described above, the user is prompted to enter the data such as that shown in FIG. 7. That is, the resolution logic analyzer 7 outputs the resolution information input screen 11a. The input screen 11a is divided into data structure resolution parts 600 and 610, which relate to the resolution logic of the data structure part 320, and the operation resolution part 620, which relates to the resolution logic of the operation base unit 310.

The header part 600 in the data structure resolution part is a part for input of the settings for the header part 400 in the slip type data structure. In FIG. 7, an item name 'authorization number' is entered. This authorization number is a key and its type is entered as an integer (int). In other words, an authorization number of an integer type is stored in the key part of the header part 400 in FIG. 4. Information such as an item name 'authorization type' of the character string type (string) and an item name 'date handled' of the date type (date) is also entered. The authorization type and the date handled are stored in the attribute part of the header part 400 in FIG. 4. The data structure resolution part 610 is a part for the input of settings for the details part 410 in the slip type data structure. In FIG. 7, an item name 'authorization number' of the integer type and an item name 'line number' of the integer type are entered as keys. In other words, authorization number and line number are stored in the key part of the details part 410 in FIG. 4. An item name 'purchased item' of the character string type is also entered. This purchased item is stored in the attribute part of the details part 410 in FIG. 4.

The operation resolution part 620 is partially shown in FIG. 7. 'Authorization by section manager' is entered by the user as the operation name in accordance with the specification of the target program. A basic operation name corresponding to 'authorization by section manager' is then selected from the basic operation name list. Here, the basic operation corresponding to 'authorization by section manager' is the operation 'update slip'. Next, the logic resolution information corresponding to the operation 'update slip' is entered. The resolution logic analyzer 7 analyzes the part written by the tagged language that is the resolution logic embedded in the model program for the operation 'update slip'. It then requests specific entry of the updateable state name (here, 'authorization being requested'), specific entry of the state name after the update (here, 'Section manager has authorized'), specific entry of an error message (here, 'This cannot be authorized'), and specific entry of an inherent check (here, 'authorization type='division manager settlement slip'. It can also be described in Boolean format like this.). The user then enters another operation name and processing continues as described above. In the example of FIG. 7, 'create slip' is entered as the next operation name. 'Register slip' is selected as the basic operation corresponding to the 'create slip' operation.

It is difficult for a user to enter all the resolution information in one screen as in FIG. 7 and there is possibility for missed entries and input errors. Accordingly, it is possible to configure the resolution logic analyser 7 so as to have the user enter or select the required information in order as shown in FIGS. 8 through 12.

Figure 8:
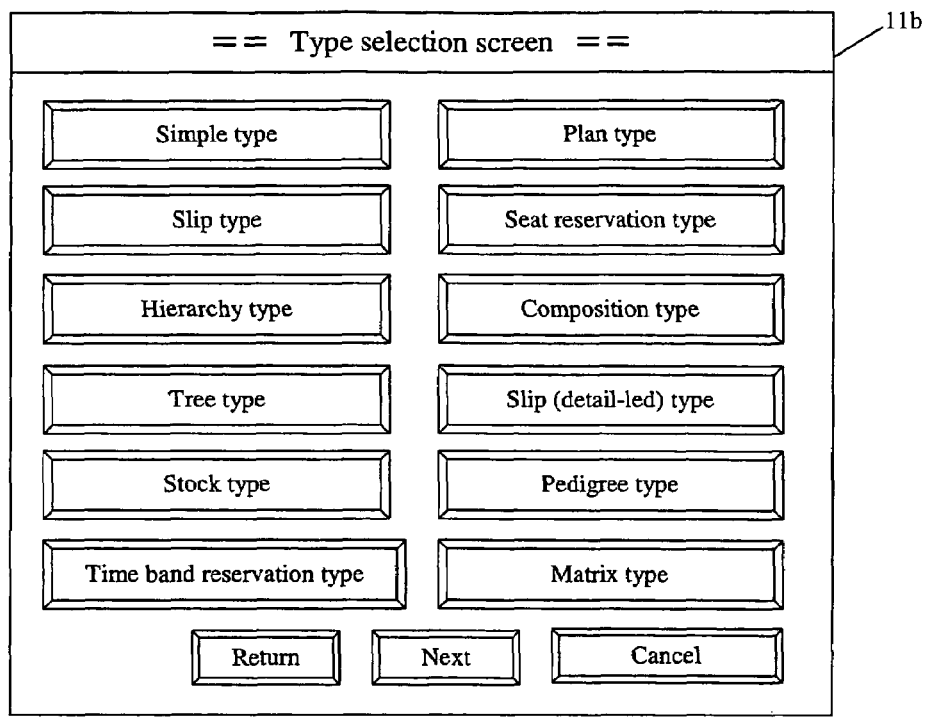
FIG. 8 shows an example of a screen for selecting a data structure.

FIG. 8 is a type selection screen 11b for selecting the data structure at the beginning when automatically generating a program using this automatic program generation apparatus 1. The type selection screen 11b includes: a button for selecting a simple type data structure; a button for selecting a slip type data structure; a button for selecting a hierarchy type data structure; a button for selecting a tree type data structure; a button for selecting a stock type data structure; a button for selecting a time band reservation type data structure; a button for selecting a plan type data structure; a button for selecting a seat reservation type data structure; a button for selecting a composition type data structure; a button for selecting a detail-led slip type data structure; a button for selecting a pedigree type data structure; a button for selecting a matrix type data structure; a button (return) for returning to the first screen output by this automatic program generation apparatus; a button (next) for moving to the processing for the entry of resolution information relating to the selected data structure; and a button for cancelling a selection. The data structure resolution unit 3 corresponding to the data structure selected in the type selection screen 11b is prepared to perform the following processing.

In this embodiment of the present invention, as explained above, any of twelve types of data structure can be selected. However, it is also possible to add other data structures and select one of even more data structures for program generation. It is also possible to provide a configuration in which only two or more of the twelve data structures are displayed on the type selection screen 11b as being able to be selected.

Assume here that a slip type data structure is selected and the 'Next' button pressed. When this occurs, the data structure resolution unit 3 that corresponds to the slip type data structure is read, the resolution logic analyzer 7 analyzes the resolution logic 33 included in the data structure resolution unit 3, and outputs the first slip resolution information input screen shown 11c in FIG. 9. This first slip resolution information input screen (11c) prompts the user to enter the slip name. In this example, the user enters 'Purchase slip' to generate a program for processing slips for purchased items, and then presses the 'Next' button. To change the selection to another data structure, the user has to press the 'Return' button. To cancel slip name input, the user has to press the 'Cancel' button.

Figure 9:
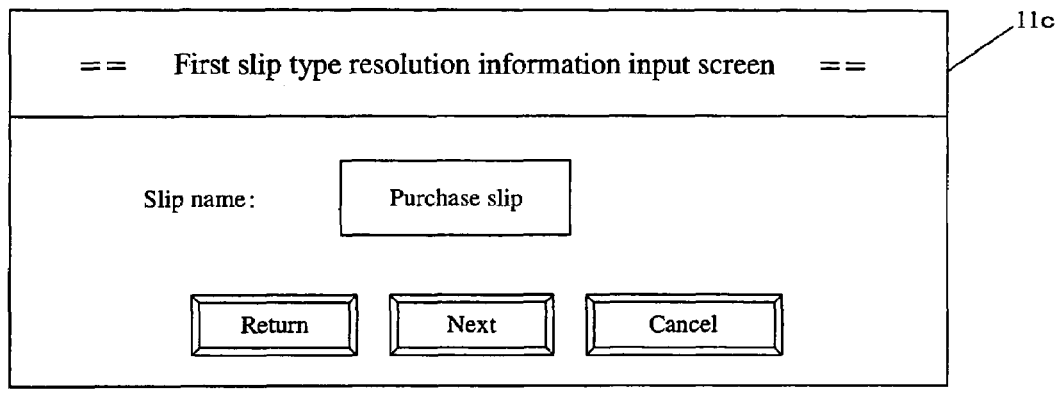
FIG. 9 shows a first resolution information input screen for a data structure resolution unit for a slip type data structure.

In FIG. 9, when the 'Next' button is pressed, the second slip resolution information input screen 11d is output from the resolution logic analyzer 7. The resolution logic analyzer 7 analyzes the resolution logic 382, which is embedded in the model programs 380 for the data structure 320, and displays tables for the entry of data structures resolution parts 600 and 610. The data structure resolution part 600 prompts the user to enter the resolution information for the header part 400. The user enters the item name, whether or not it is a key, and the type. In other words, the model programs 380 include the resolution logic 382 for providing attributes for the header record. In this example, an item name 'authorization number' of the integer type, which is a key, an item name 'authorization type' of the character string type, and an item name 'Date handled' of the date type are entered. In the data structure resolution part 610, the user is prompted to enter resolution information for the details part 410. Here, the user enters item names, whether or not they are keys, and types. In other words, the model programs 380 include the resolution logic for providing attributes for the details record. In this example, an item name 'Authorization number' of the integer type, which is a key, an item name 'Line number' of the integer type, which is a key, and an item name 'Purchased item' of the character string type are entered.

After entry of the resolution information in accordance with the specification of the program to be generated is finished, the user presses the 'Next' button to enter the next piece of resolution information. The user can press the 'Return' button to enter another slip name or can press the 'Cancel' button to cancel input.

Figure 10:
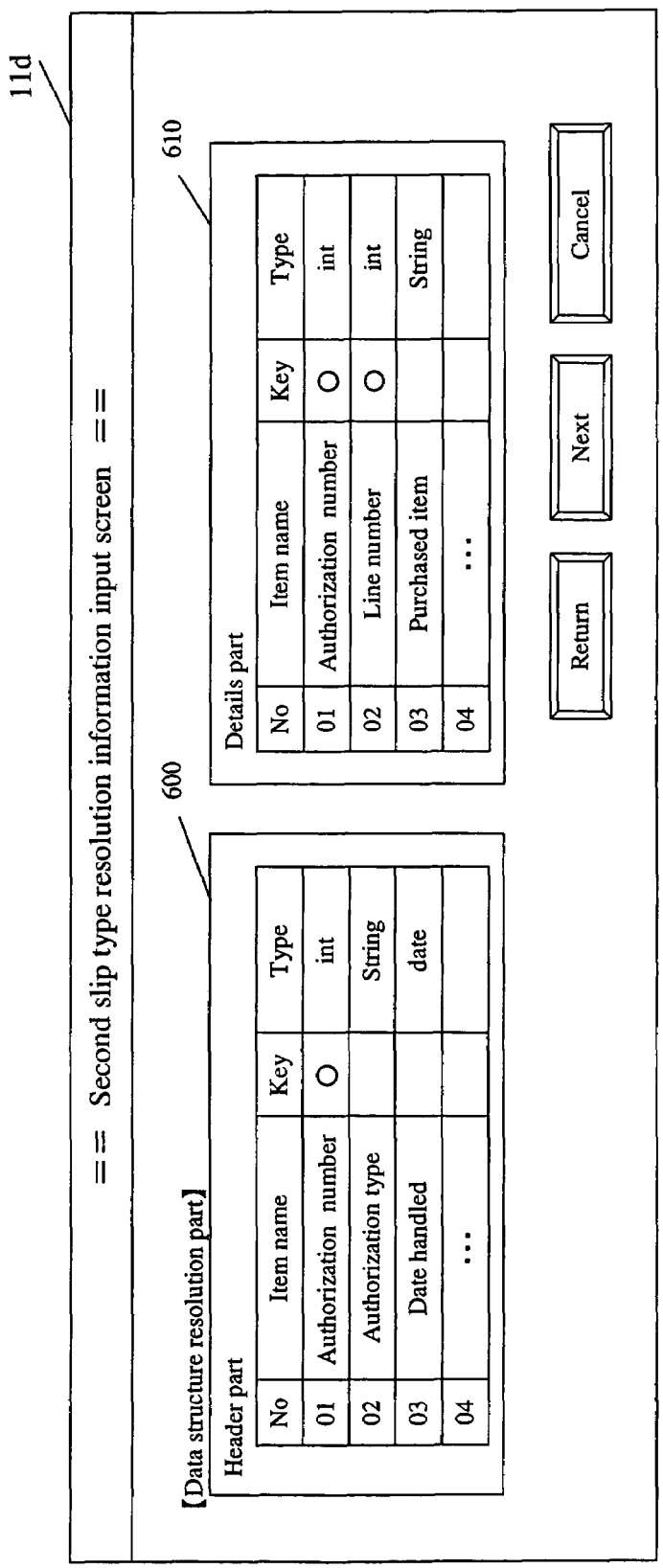
FIG. 10 shows a second resolution information input screen for a data structure resolution unit for a slip type data structure.

When the 'Next' button is pressed in FIG. 10, the third slip resolution information input screen 11e is output from the resolution logic analyzer 7. The resolution logic analyzer 7 prompts the user to select the basic operation for which settings will be made. In the third slip resolution information input screen 11e, the user enters the operation name and selects the basic operation name that corresponds to this operation unit. The basic operation name list that relates to the names of basic operations included in the operation base unit 310 is used to select the basic operation name. In FIG. 11, the basic operation name list is shown as a combo box. In the example in FIG. 11, 'Authorization by section manager' is entered as the operation name and 'update slip' is selected for the corresponding basic operation. Although the combo box actually hides it, if all entries have been made in the third slip resolution information input screen 11e, the user presses the 'Next' button. On the other hand, the user presses the 'Return' button to return to the second slip resolution information input screen 11d or press the 'Cancel' button to cancel input.

When the 'Next' button is pressed in FIG. 11, the fourth slip resolution information input screen 11f (FIG. 12) is output from the resolution logic analyzer 7. This fourth slip resolution information input screen 11f prompts the user to place entries in the operation resolution part 620. The resolution logic analyzer 7 analyzes the model programs that correspond to the selected basic operation and requests the input of resolution information for the embedded resolution logic. In this example, an updateable state name, a state name after update, an error message, and an inherent check can be entered. 'Authorization being requested' is entered as the updateable state name, 'Request for authorization has made' as the state name after update, 'This cannot be authorized' as the error message, and 'Authorization type=Division manager settlement slip' as the inherent check. Thus, resolution logic for defining the state of the header record by its relationship with the operation, and resolution logic for describing settings made in accordance with program specification by record attributes, record states, or combinations of record attributes and states, are embedded in this model programs that correspond to basic operations.

If all information has been entered on the fourth slip resolution information input screen 11f, the user presses the 'Generate' button. This causes the synthesiser 9 to generate the program for the basic slip update operation. Next, resolution information for other operations deemed necessary in the specification of the program to be generated is entered. The user has to press the 'Return' button to return to the previous input screen or the 'Cancel' button to cancel input.

The data structure is thus first selected by the user as discussed above. The resolution logic analyzer 7 then analyzes the resolution logic 33 of the data structure resolution unit 3 that corresponds with the selected data structure and outputs the resolution information input screen 11. The corresponding resolution information is then entered by the user and the synthesizer 9 synthesizes the resolution information and the model programs 31 to generate the program.

Figure 13:
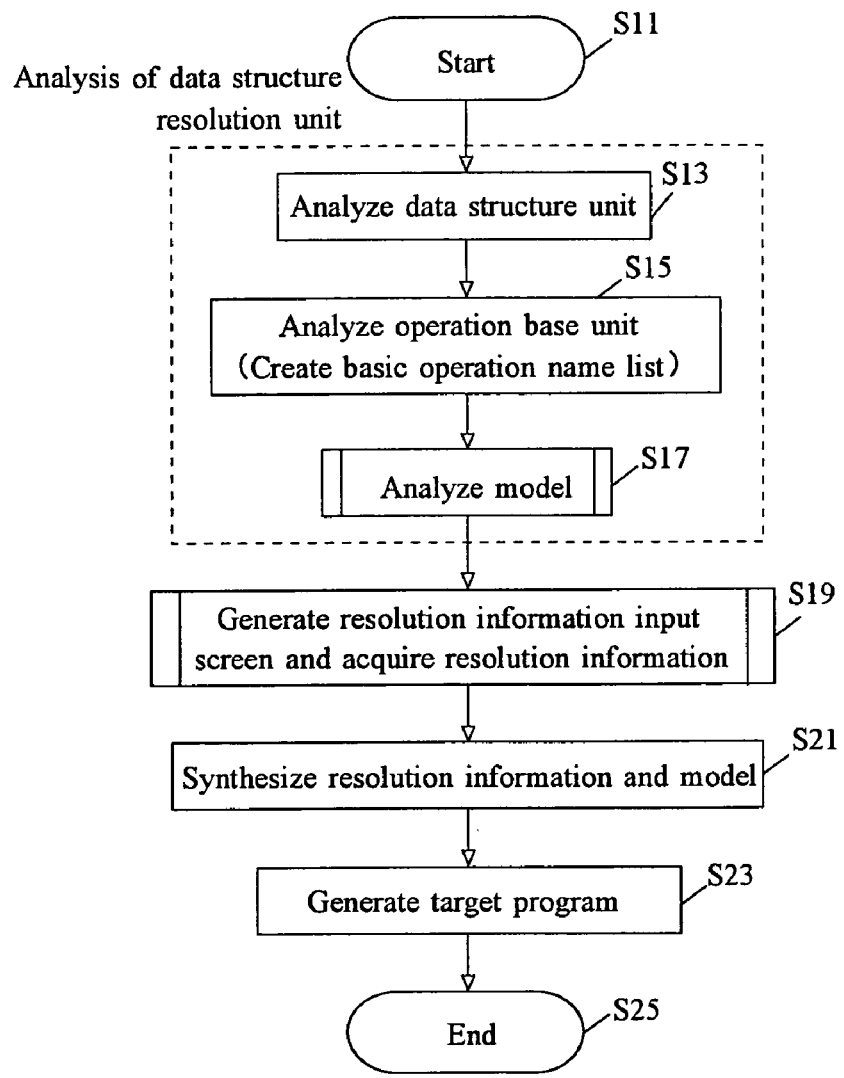
FIG. 13 is a flow chart for explaining the flow of processing in the resolution unit.
Figure 14:
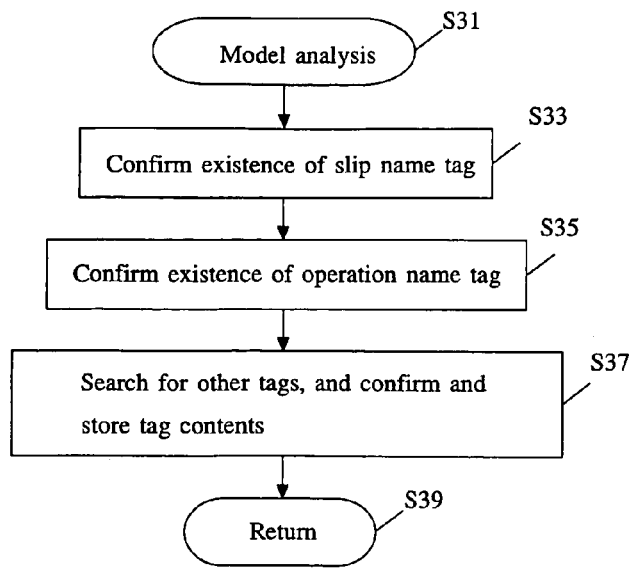
FIG. 14 is a flow chart that shows the flow of analysis processing in the model program that corresponds to a slip type data structure.
Figure 15:
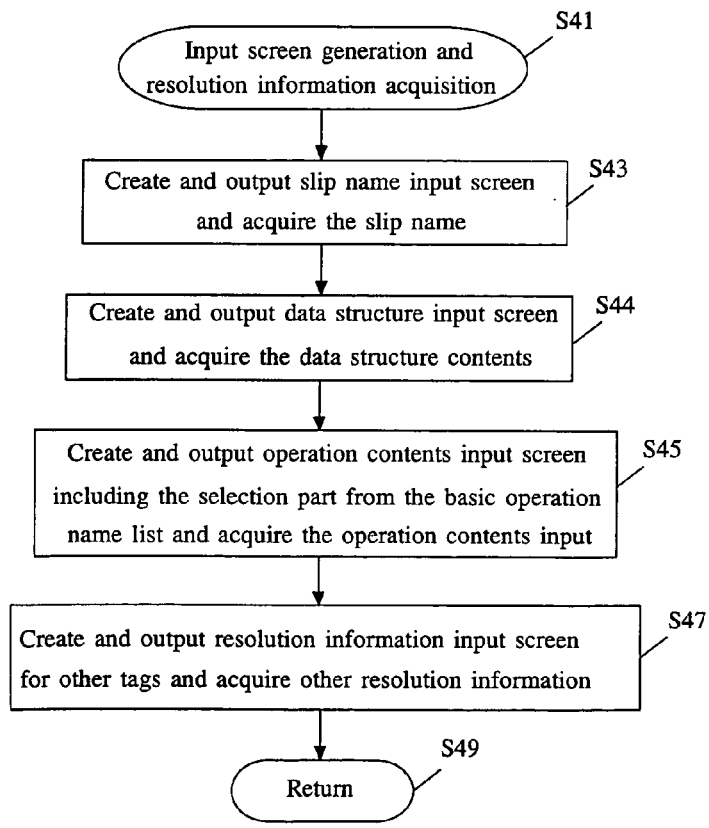
FIG. 15 is a flow chart that shows the flow of processing in input screen generation and resolution information acquisition processing for a slip type data structure.

Here, the flow of processing in the resolution unit 5 will be summarized using FIGS. 13 through 15.

If the data structure is selected by the user and processing starts (FIG. 13: step S11), the resolution logic analyzer 7 analyzes the data structure resolution unit 3 that corresponds to the selected data structure. Firstly, the data structure unit 320 in the data structure resolution unit 3 is analyzed (step S13). The resolution logic 382 of the model programs 380 is analyzed. The analysis results are used later and so are temporarily stored in a storage device.

Next, the operation base unit 310 is analyzed (step S15). Here, the model programs 350 through 370 for each basic operation in the operation base unit 310 are read out and a basic operation name list, which is a list of basic operation names is created. The read model programs 350 through 370 are then analyzed (step S17). Analysis of model programs will be explained later using FIG. 14.

If analysis of the data structure resolution unit 3 ends processing up to step S17, the resolution logic analyzer 7 generates the resolution information input screen for input of resolution information for the resolution logic and displays this for the user (step S19). It then obtains resolution information from the user. The processing in step S19 will also be explained later using FIG. 15. The synthesizer 9 combines the acquired resolution information and the model program 31 (step S21) and generates the target program (step S23). If part of the resolution logic embedded in the model program 31 is embedded with the acquired resolution information, the target program can be generated.

FIG. 14 is used to show the processing in the analysis of model programs. The processing in FIG. 14 is the analysis processing for the slip type data structure. Firstly, the existence of a slip nametag, which is the resolution logic embedded in the model program corresponding to the slip type data structure, is confirmed (step S33). A slip nametag is always included in the model program corresponding to the slip type data structure. Accordingly, if a slip nametag cannot be found in step S33, this means that the model program in question is not suitable as a model program for the slip type data structure. If the existence of a slip nametag cannot be confirmed, an error message may also be output.

Next, the existence of an operation nametag is confirmed (step S35). This operation nametag is also resolution logic that is always provided in model programs, and so if it is not found, an error message may be output. A model program is then scanned to search for another tag. The tag contents are then confirmed and stored in a storage device (step S39). The results of the analysis of the model program are temporarily stored in a storage device and used in the processing through which the next resolution information input screen is generated.

Next, the processing in generating resolution information input screens and acquiring resolution information will be explained using FIG. 15. The processing in FIG. 15 is processing for the slip type data structure. Firstly, a slip name input screen is created and displayed for the user. A slip name is obtained from the user (step S43). For example, the first slip resolution information input screen 11*c* shown in FIG. 9 is displayed and the slip name obtained from the user. Next, a data structure input screen is generated and displayed for the user. The details of the settings for the data structure are then obtained from the user (step S44). For example, the second slip resolution information input screen 11*d* shown in FIG. 10 is displayed and information relating to the header part 400 and details part 410 is obtained from the user.

Next, an operation contents input screen that includes the selection parts from the basic operation name list is created and displayed for the user. Operation details are obtained from the user (step S45). For example, the third slip resolution information input screen 11*e* shown in FIG. 11 is displayed and the operation name and corresponding basic operation name are obtained from the user. Lastly, resolution information input screens are created for other tags and displayed for the user. Other resolution information is obtained from the user (step S47). For example, the fourth slip resolution information input screen 11*f* shown in FIG. 12 is displayed and resolution information concerning the settings peculiar to the target program are obtained from the user.

Figure 16:
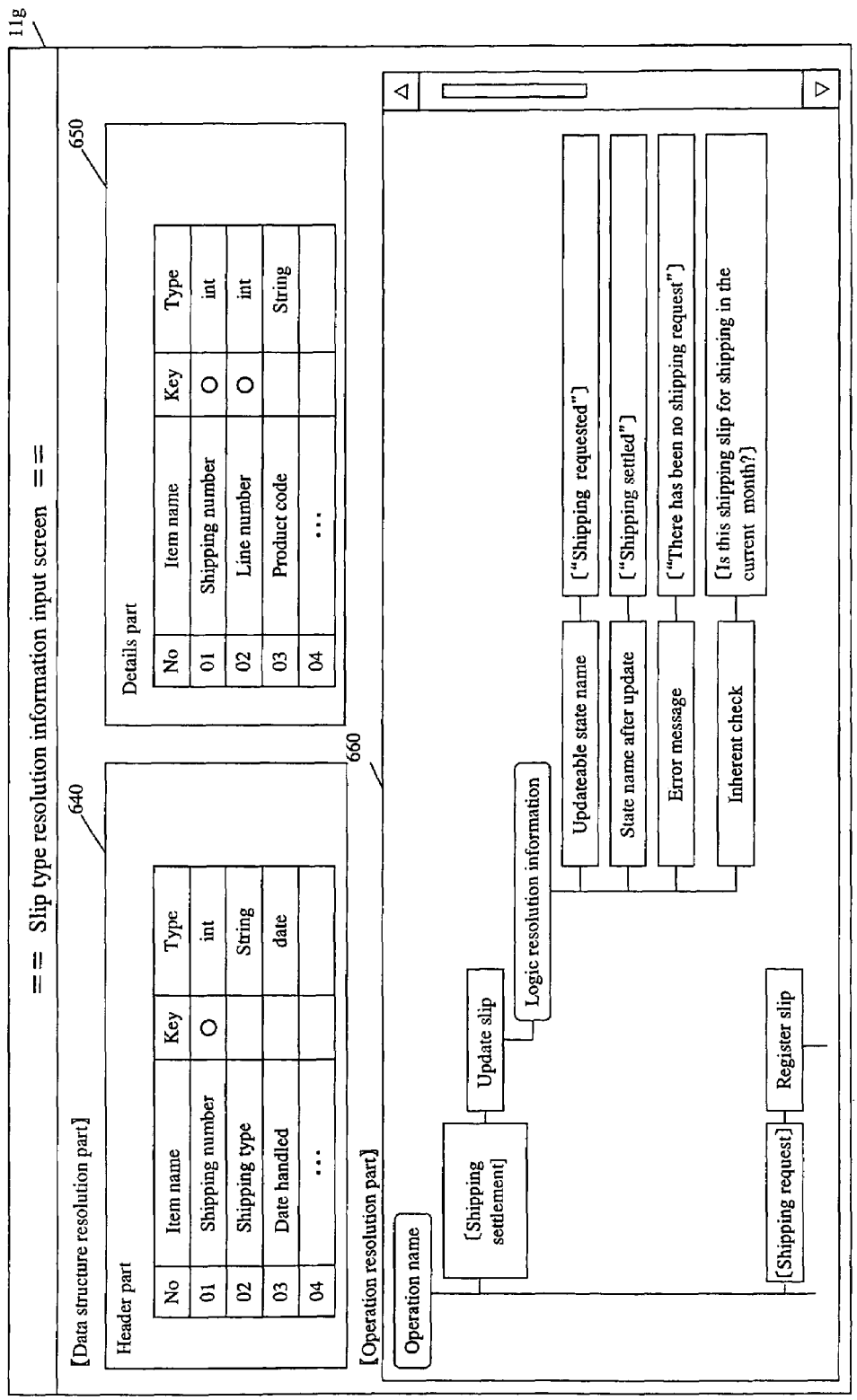
FIG. 16 shows an example of a resolution information input screen for another program that use a slip type data structure.

Next, an example is shown of resolution information that should be entered if another program that uses the slip type data structure are generated. FIG. 16 is an example of a screen 11*g* for the input of resolution information that should be entered if a program for processing shipping slips is created. As shown in FIG. 7, in the case of the slip type data structure, the data structure resolution part 640 is the part for input of the settings for the header part 400 and the data structure resolution part 650 is the part for input of the settings for the details part 410. Item names, whether or not they are keys, and data types are entered in the header part 400. In the example of FIG. 16, the facts that the item name 'Shipping number' is a key and is integer type data are entered. The fact that the item name 'Shipping type' is character string type data is entered. The fact that the item name 'Date handled' is date type data is entered.

Item names, whether or not they are keys, and data types are entered in the details part 410. In the example of FIG. 16, the facts that the item name 'Shipping number' is a key and integer type data are entered. The facts that the item name 'Line number' is a key and integer type data are entered. The fact that the item name 'Product code' is character string type data is entered.

The operation name is entered in the operation resolution part 660, and then processing is performed to embed resolution information in the resolution logic of the model program for the corresponding basic operation. In the example of FIG. 16, firstly 'Shipping settlement' is entered as the operation name. The basic operation that corresponds to 'shipping settlement' is selected from the basic operation name list. Here, 'update slip' is selected as the corresponding basic operation. Resolution information that corresponds to the resolution logic of the model program for the 'slip update' operation is then entered. Here, input of an updateable state name is requested and 'Shipping requested' is entered by the user. The user is requested to enter the state name after update and 'Shipment settled' is entered by the user. Input of an error message is also requested, and the user enters 'There has been no shipping request'. Input of an inherent check is then requested and the user enters 'Is this shipping slip for shipping in the current month?' If all input relating to the shipping settlement operation has finished, resolution information for other operations is input. In the example in FIG. 16, the name of the next operation, 'Shipping request' is entered and the fact that 'register slip' is selected is shown as the corresponding basic operation. Such a processing is repeated until the prescription for necessary operations in accordance with the specification of the target program is completed.

2. Time Band Reservation Type Data Structure

Figure 17:
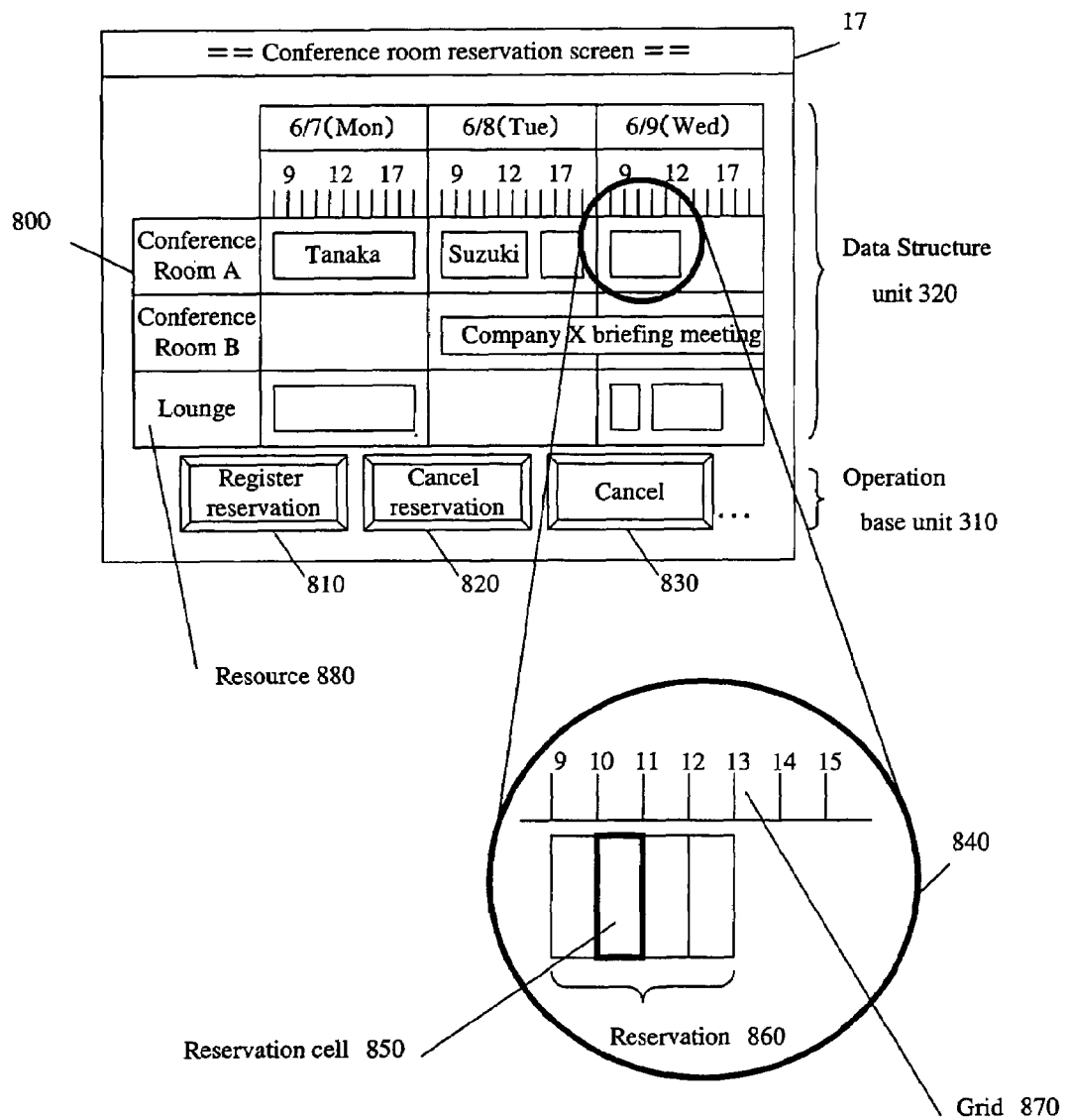
FIG. 17 shows an example of a screen output by a program that uses a time band reservation type data structure.

The following explanations relate to a time band reservation type data structure. FIG. 17 shows an example of a screen output by the program generated if the time band reservation type data structure is selected.

This program is a conference room reservation program and displays a conference room reservation screen. Table 800 is the part that shows the data that corresponds to the data structure unit 320 of the data structure resolution unit 3. It is possible to reserve resources 880 here, such as Reception Room A, Reception Room B, and Lounge. FIG. 17 shows a screen for processing reservations for June 7, June 8, and June 9. To make it easy to understand the reservation times for each day, a time axis that goes from 0900 hours through 1700 hours is shown. On the lines for each resource, time bands for which reservations have already been entered are shown. On the other hand, the register reservation button 810, the cancel reservation button 820, and cancel button 830 are a group of buttons for executing operations that correspond to the operation base unit 310 of the data structure resolution unit 3.

An enlarged view of the reservation status of Reception Room A for June 9 is given in the enlarged display part 840 in FIG. 17. The part of the time axis for making reservations is called the grid 870. The reservation time units are called reservation cells 850 and the reservation 860 is defined by the group of reservation cells 850.

Figures 18, 19:
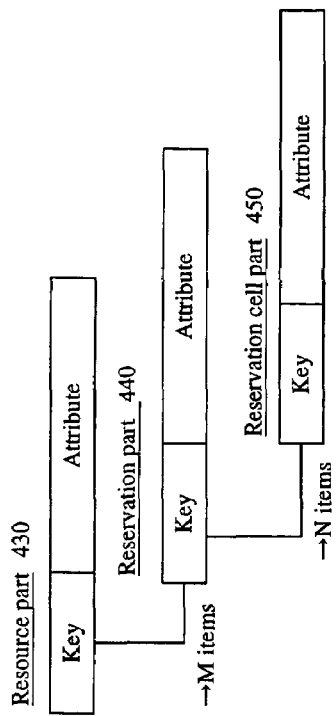
FIG. 18 is a schematic diagram that shows an overview of a time band reservation type data structure.
FIG. 19 is a table that shows examples of basic operations for a time band reservation type data structure.

FIG. 18 shows the time band reservation type data structure that is the source of the program for displaying screens such as that shown in FIG. 17. The time band reservation data type structure comprises a resource part 430, M (where M is an integer of 0 or more) reservation parts 440, N (where N is an integer of 0 or more) reservation cell parts 450 for each reservation part 440, links that couple the resource part 430 and the reservation part 440, and links that couple the reservation part 440 and the reservation cell part 450. The resource part 430 is the part in which data for the resources 880 in FIG. 17 is stored. The reservation parts 440 are the parts in which data for the reservations 860 in FIG. 17 is stored. The reservation cell parts 450 are the parts in which data for the reservation cells 850 in FIG. 17 is stored. Keys and attributes are stored in each of the resource part 430, reservation parts 440, and reservation cell parts 450.

Furthermore, the operation base unit 310 of the data structure resolution unit 3 includes basic operations such as those shown below. The character strings in the brackets are method names.

(1) Register reservation (with key) (createReservationWithKey1)

Creates a reservation and reservation cell in accordance with input information (registers as awaiting cancellation if the reservation has already been created).

(2) Register reservation (with key)

Creates a reservation and reservation cell in accordance with input information (registers as awaiting cancellation if the reservation has already been created) (createReservationWithKey2), and returns information for the created reservation entity.

(3) Register reservation (without key)

Creates a reservation and reservation cell in accordance with input information (registers as awaiting cancellation if the reservation has already been created) (createReservationWithoutKey), and returns information for the created reservation entity. The primary key is acquired from the number assignment class and then used.

(4) Cancel reservation (cancelReservation)

Cancels (physically deletes) a reservation that has the reservation key in the input information. The following processing is performed for related reservation cells based on this reservation state. (a) If this reservation is 'Awaiting cancellation', the designation will be released. (b) If this reservation is a 'Regular reservation' and awaiting cancellation is designated, the awaiting cancellation will be upgraded to a regular reservation and the awaiting cancellation will be released. (c) If this reservation is a 'Regular reservation' and awaiting cancellation is not designated, the reservation cell will be deleted.

(5) Confirm regular reservation is possible (isVacant)

Confirms the corresponding reservation cells corresponding to a resource, a date, and a time band in input information. If a reservation does not exist, it is returned that a regular reservation is possible (true).

(6) Confirm reservation is not possible (isOccupied)

Confirms the reservation cells corresponding to a resource, a date, and a time band in input information. If even one designation of awaiting cancellation exists, it is returned that reservation is impossible (true).

(7) Confirm reservation status (isReserved)

Confirms the status of all reservation cells relating to a reservation for which the input reservation key. If all are 'Regular reservations', the fact that the reservation is approved (true) is returned.

(8) Change reserved period (changeReservedPeriod)

Acquires a reservation for the input reservation key, and changes to the designated period. Performs the change if the period after the change can be reserved, but returns reservation unapproved (negative value) if the reservation is impossible. Depending on the reservation status after the change, returns a positive value if the reservation is possible or a value of 0 if it is awaiting cancellation.

(9) Change reserved resource (changeReservedResource)

Obtains a reservation for the input reservation key, and changes to the designated resource. Performs the change if the resource after the change can be reserved, but returns reservation unapproved (negative value) if the reservation is impossible. Depending on the reservation status after the change, returns a positive value if the reservation is possible or a value of 0 if it is awaiting cancellation.

(10) Update reservation

Updates a reservation in accordance with input information. Returns the results as true or false.

(11) Get chain-upgraded reservation key list (getChainElevatedReservation)

In operations to cancel a reservation, to change the reservation period, or to change the resource, stores the reservation key list in the designated message carrier if an awaiting cancellation is upgraded because an existing regular reservation is cancelled.

(12) Find reservation key (findReservationKey)

Obtains the reservation for the designated reservation key, and stores that information in a message carrier for output.

(13) Find reservation by designated period

Searches for reservations included in the designated date (period), and returns whether or not reservations exist (findReservationByPeriod). Stores the search results of reservations in the designated message carrier, and then returns them (nextReservation).

(14) Find reservation by resource

Searches for reservations for the designated resource key, and returns whether or not reservations exist (findReservationByResource). Stores the search results of reservations in the designated message carrier, and then returns them (nextReservation).

(15) Find reservation by resource and period

Searches for reservations by the designated resource key and date (period), and returns whether or not reservations exist (findReservationByResourceAndPeriod). Stores the search results of reservations in the designated message key, and then returns them (nextReservation).

(16) Find reserved cell by key (findReservedCellByKey)

Obtains reservation cells with the designated reservation cell key, and stores them in the designated message carrier.

(17) Find reservation by awaiting cancellation key (findReservationByCancelWaitingKey)

Searches for the reservation cells in which the designated reservation key indicates awaiting cancellation, and stores the list of its regular reservation keys in the message carrier for output.

(18) Find awaiting cancellation by reservation key (findCancelWaitingByReservationKey)

Searches for the reservation cells in which the designated reservation key indicates a regular reservation, and stores the reservation key list of its awaiting cancellation in the message carrier for output.

(19) Add resource (with key)

Creates and adds a new resource in accordance with input information (return value is true or false) (insertResourceWithKey). Then returns the information for the added resource.

(20) Add resource (without key)

Creates and adds a new resource in accordance with input information (insertResourceWithoutKey). Obtains the primary key from the number assignment class (the return value is true or false). Then returns the information for the added resource.

(21) Delete resource (removeResource)

Deletes (physically deletes) the resource with the designated resource key.

(22) Find resource key (findResourceByKey)

Obtains the resources with the designated resource key, and stores the information in the message carrier for output.

(23) Find resource conditions

Searches for the resources that match the designated conditions and returns whether or not any exist. Stores the search results of resources in the designated message carrier, and then returns them (nextResource).

The basic operations explained in the above paragraph are groups of even more detailed operations. For example, as shown in FIG. 19, the reservation registration operation (register reservation, in above paragraph) executes registration processing for the resource part 430, for the reservation parts 440, and for the reservation cell parts 450. The reservation cancellation operation (cancel reservation, in the above paragraph) executes deletion processing for the resource part 430, for the reservation parts 440, and for the reservation cell parts 450. The vacant status confirmation operation (find reservation by resource, in the above paragraph) executes search processing for the reservation parts 440. The reserved period change operation (change reserved period, in the above paragraph) executes update processing for the reservation parts 440 and deletion or registration processing for the reservation cell parts 450. The reserved resource change operation (change reserved resource, in the above paragraph) executes search processing for the resource part 430, update processing for the reservation parts 440, and deletion or registration processing for the reservation cell parts 450. The search operation by reservation condition (find reservation by resource, in the above paragraph) executes search processing for the reservation parts 440.

Figure 20:
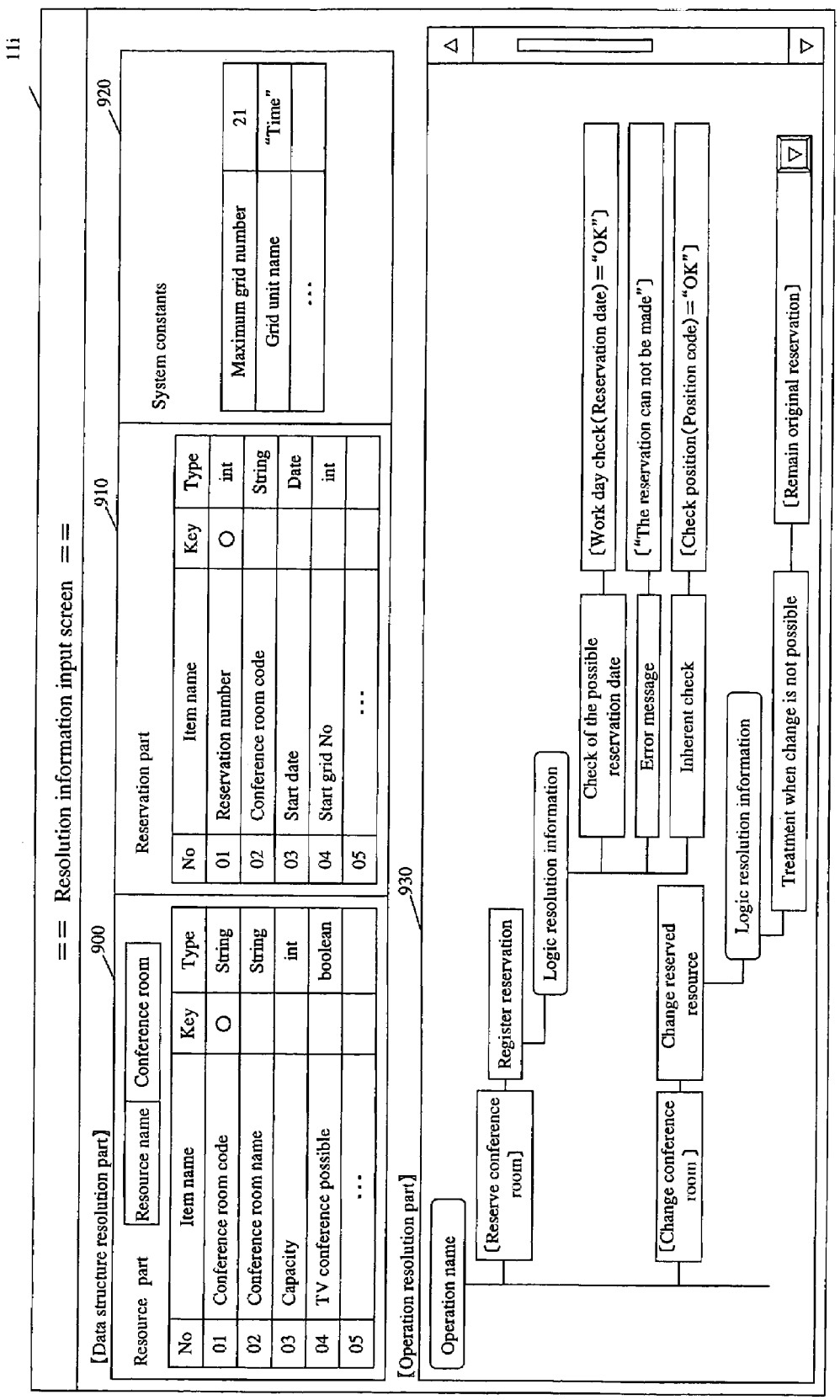
FIG. 20 shows an example of a screen for entering resolution information for a data structure resolution unit for a time band reservation type data structure.

This type of data structure resolution unit 3 is prepared for the time band reservation type data structure. The resolution logic analyzer 7 analyzes the resolution logic of the data structure resolution unit 3 and, for example, creates the resolution information input screen 11i, as shown in FIG. 20, and displays this for the user.

As shown in FIGS. 7 and 16, the resolution information input screen 11i comprises data structure resolution parts 900 through 920, for the input of resolution information for the data structure unit 320 in the data structure resolution unit 3, and an operation resolution part 930 for the input of resolution information for the resolution logic 382 embedded in the model program 380 that corresponds to the operation base unit 310 in the data structure resolution unit 3.

The data structure resolution part 900 is the part for input of the resolution information for the resource parts 430 in the time band reservation data structure. The data structure resolution part 900 is an input part for the resource name, and 'Conference room' is entered here. The user enters item names, whether or not they are keys, and data types here. In other words, resolution logic 382 for providing resource records with attributes is included in the model program 380. In the example of FIG. 20, the item name 'Conference room code' is entered, and the facts that the 'conference room code' is a key and character string type data are also entered. The item name 'Conference room name' is entered, and the fact that the 'conference room name' is character string type data is also entered. The item name 'Capacity' is entered, and the fact that the 'capacity' is integer type data is entered. The item name 'TV conference possible' is entered, and the fact that the 'TV conference possible' is Boolean type data is entered.

The data structure resolution part 910 is a part for input of the resolution information for the reservation parts 440 in the time band reservation type data structure. The user enters item names, whether or not they are keys, and data types here. In other words, resolution logic 382 for providing attributes for reservation records is included in the model program 380. In the example of FIG. 20, the item name 'Reservation number' is entered, and the facts that the 'reservation number' is a key and integer type data are also entered. The item name 'Conference room code' is entered, and the fact that the 'conference room code' is character string type data is also entered. The item name 'Start date' is also entered, and the fact that the 'start date' is date type data is also entered. The item name 'Start grid number (No)' is entered, as is the fact that the 'start grid number' is integer type data is also entered.

The data structure resolution part 920 is a part for the input of resolution information for the reservation cell parts 450 in the time band reservation type data structure. In other words, resolution logic 382 for providing attributes for reservation cell records is included in the model program 380. Here, the maximum grid number and the grid unit name are entered. In the example of FIG. 20, the maximum grid number of 21 and the grid unit name of 'Time' are entered.

The operation resolution part 930 is a part for the input of the resolution information for the resolution logic 352 embedded in the model programs 350 through 370 corresponding to the operation base unit 310 in the data structure resolution 3. Firstly, the user is asked to enter the operation name. In FIG. 20, an operation name of 'Conference room reservation' is entered. Next, the basic operation corresponding to this 'conference room reservation' is selected. The basic operation name list is used in this selection. In FIG. 20, 'register reservation' is selected as the basic operation that corresponds to the 'conference room reservation'. The model program corresponding to this basic operation 'Register reservation' is read out, and entry of the resolution information that will replace the embedded resolution logic is requested. In FIG. 20, 'Work day check (reservation date)='OK'' is entered for an item of the check of the possible reservation date. 'The reservation cannot be made' is entered for the item of the error message. 'Check position (position code)='OK'' is entered for the item of the inherent check. The check conditions for the possible reservation date and inherent checks can be described as Boolean data.

If the above resolution information has been entered, the program for the 'register reservation' operation, which is a basic operation can be generated. The user is prompted to continue entering resolution information for basic operations deemed necessary in accordance with the specification of the target program. In the example of FIG. 20, resolution information about a 'Change conference room' operation is entered next. The operation 'change reserved resource' is selected as the basic operation that corresponds to this 'change conference room'.

3. Simple Type Data Structure

Figure 21:
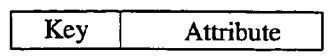
FIG. 21 is a schematic diagram that shows an overview of a simple type data structure.

The simple type data structure does not have links such as the slip type data structure shown in FIG. 4 and is a data structure that has, for example, only a header part 400 (refer to FIG. 21). For example, it can be applied just for managing 'Office organization' or for issuing separate slips for each single product. The data structure part 320 prescribes one record type and the corresponding model program includes resolution logic for providing attributes for that one record type. A processing unit for executing creation, deletion, and key search operations is provided for the record type.

Furthermore, the operation base unit 310 for the simple type data structure includes basic operations such as those shown below. The character strings in brackets are method names.

(1) Find record (findSimpleEntityByKey)

Searches for an instance of an entity (=record type. Same hereinafter.) that has the designated key (return value is the entity information). The return value may be entity information and the state information for that entity.

(2) Add record (createSimpleEntityWithKey1)

Creates an instance of an entity that has the designated key (return value is true or false).

(3) Add record (createSimpleEntityWithKey2)

Creates an instance of an entity that has the designated key (return value is entity information).

(4) Add record (without key) (createSimpleEntityWithoutKey)

Creates an instance of an entity (return value is entity information).

(5) Delete record (removeEntity)

Deletes an instance of an entity that has the designated key.

(6) Refer to record state (getState)

Obtains the state from an instance of the entity that has the designated key.

(7) Find record by condition

Prepares a group of entity instances that match the condition and returns whether or not that preparation has been possible. Also, obtains information about the next entity (nextSimpleEntity).

(8) Update record

Updates information about an instance of an entity that has the designated key (return value is true or false).

(9) Update record

Updates information about an instance of an entity that has the designated key (return value is the updated entity information).

Resolution logic for settings peculiar to the target program is embedded in all the model programs corresponding to basic operations for the simple type data structure.

4. Matrix Type Data Structure

Figure 22:
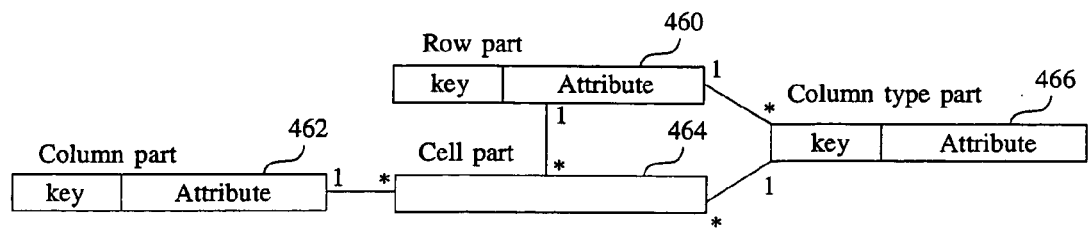
FIG. 22 is a schematic diagram that shows an overview of a matrix type data structure.

Next, the data structure resolution unit 3 for the matrix type data structure will be explained. As shown in FIG. 22, this matrix type data structure includes a row part 462, a column part 460, a cell part 464 that represents a record for an intersection of the column and row, a column type part 466 that prescribes each column type and represents attributes that can be allocated to each cell part 464, a link between the row part 462 and the cell part 464, a link between the column part 460 and the cell part 464, a link between the column part 460 and the column type part 466, and a link between the column type part 466 and the cell part 464. There are N (where N is an integer of 0 or more) cell parts 464 for one row part 462 and M (where M in an integer of 0 or more) cell parts 464 for one column part 460. There are also K (where K is an integer of 0 or more) column type parts 466 for one column part 460 and L (where L is an integer of 0 or more) cell parts 464 for one column type part 466. The data structure unit 320 includes resolution logic for providing attributes for the row part 462, column part 460, and column type part 466. A processing unit for executing creation, deletion, search operation and etc. is provided for each of the row part 462, column part 460, cell part 464, and column type part 466.

Figure 24:
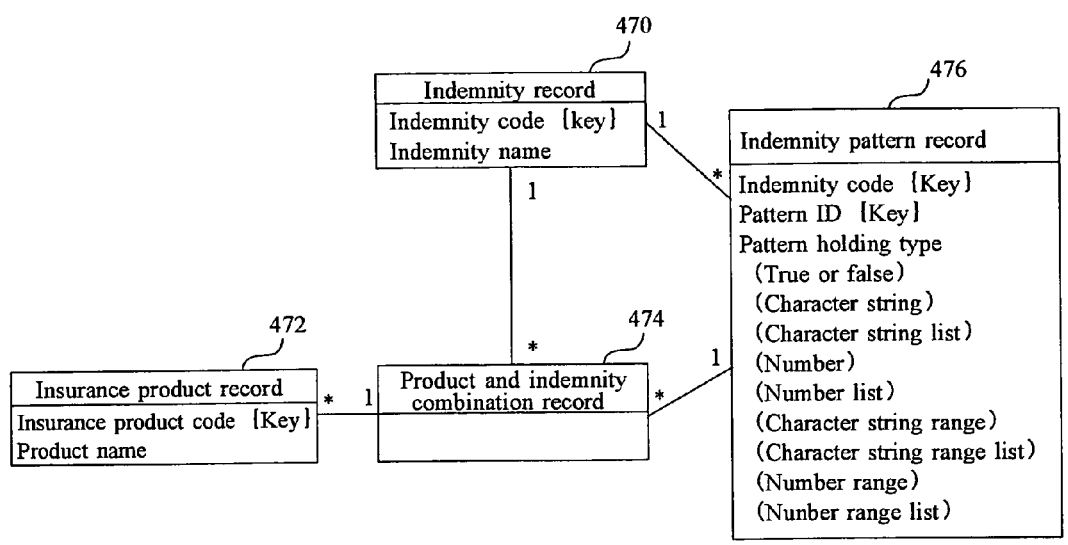

An Example of the use of the matrix type data structure is explained using FIGS. 23 and 24. FIG. 23 is an example of vehicle insurance for which a matrix data structure can be applied. Each line shows the insurance product name A, B, C, D, and E, and the indemnity details (use, model, special non-discharge agreement by age, special family bike contact, and uninsured party injury insurance). On the other hand, each column shows information about the use, model, special non-discharge agreement by age, special family bike contact, and uninsured party injury insurance for each of A, B, C, D, and E.

A matrix type data structure, such as that shown in FIG. 24, is prescribed for expressing a table such as that shown in FIG. 23. In other words, the insurance product record 472 corresponds to the row part 462. The insurance product code is a key, and the product name is provided as an attribute. The indemnity record 470 corresponds to the column part 460. The indemnity code is a key, and an indemnity name is provided as an attribute. The product and indemnity combination record 474 corresponds to the cell part 464. The indemnity pattern record 476 corresponds to the column type part 466. The indemnity code and pattern ID are keys. A pattern holding type (code that identifies whether it is true or false, character string, character string list (a plurality of character strings), character string range, character string range list, number, number list, number range, or number range list) and either the true or false, character string, character string list (a plurality of character strings), character string range, character string range list, number, number list, number range, or number range list specified in the pattern holding type are provided as attributes. Thus, resolution logic 382 for providing attributes for at least the row part 462, column part 460, and column type part 466 is included in the model program 380 that corresponds to the data structure unit 320 of the matrix type data structure. In case of the matrix type data structure, there is also resolution logic for allocating the column type part 466 to the cell parts 464.

In a table such as that shown in FIG. 23, there are five instances, A, B, C, D, and E, that correspond to the insurance product record 472. There are also four instances, use and model, special non-discharge agreement by age, special family bike contract, and uninsured party injury insurance, which correspond to the indemnity record 470. There are twenty instances, which are combinations of rows and columns, and which correspond to the product and indemnity combination record 474. There are eight instances that correspond to the indemnity pattern record 476. These include two instances for use and model, two for the special non-discharge agreement by age, two for special family bike contract, and two for uninsured party injury insurance contract. In other words, an instance regarding use and model, which includes as an attribute, a character string list which comprises character strings: ordinary private vehicle, small private vehicle, light private vehicle, two-wheeled vehicle, and motorized bicycle, is included. Also, an instance regarding use and model, which includes as an attribute, a character string list that comprises character strings: ordinary private vehicle, small private vehicle, light private vehicle is included. In addition, an instance relating to special non-discharge agreement by age, which includes as an attribute, a number list of 21, 26, 30, and 0, and an instance relating to special non-discharge agreement by age, which includes as an attribute, a number list of 50 are included. Furthermore, an instances relating to special family bike contract, which include as an attribute, the true or false indication of Yes, and an instance relating to family bike contract, which include as an attribute, the true or false indication of No (none) are included. Also, an instance relating to uninsured party injury insurance contract, which includes as an attribute, the true or false indication of Yes and an instance relating to uninsured party injury contract, which includes as an attribute, the true or false indication of No (none) are included.

Furthermore, the operation base unit 310 of the matrix type data structure also includes basic operations such as those shown below.

(1) Add column (without column type information)

Adds a column instance. Cells included in one column that corresponds to the added column are added, but a relationship to a column type is not generated. The column information is an argument.

(2) Add column (with column type information)

Adds a column instance and a column type. Cells included in one column that corresponds to the added column are added, but a relationship to a column type is not generated. The column information is an argument.

(3) Add column (with column type information and cell information)

Adds a column instance and a column type. Cells included in on column that corresponds to the added column are added, and the relationship to the column type is held. The column information is an argument.

(4) Delete column

Deletes the designated column. If the column is deleted, cells and column types relating to that column are also deleted. The column key is an argument.

(5) Change column (without cell information)

Changes the designated column (without cell information). The column information is an argument.

(6) Change cells in a column

Changes the designated column with cell information. Cell information equivalent to the number of column and row instances is an argument.

(7) Add row addition (with cell information)

Adds a row instance and cells included in one row, which relate to the added row instance, and held the relationship with the column type. The row information is an argument.

(8) Add row (without cell information)

Adds a row instance and cells included in one row, which relate to the added row instance. But a relationship with the column type is not generated. The row information is an argument.

(9) Delete row

Deletes the designated row. Also deletes related cells. The row key is an argument.

(10) Change row (without cell information)

Changes the designated row (without cell information). The row information is an argument.

(11) Change cell

Changes the column type of the designated cell. The cell information is an argument.

(12) Change cells in a row

Changes the designated row with cell information. Cell information equivalent to the number of row and column instances is an argument.

(13) Add column type

Adds a column type instance. The column type information is an argument.

(14) Delete column type

Deletes the designated column type. Column types that are referenced by cells cannot be deleted. The column type information is the argument.

(15) Change column type

Updates the column type information. The column type information is the argument.

(16) Find cell (without cell information)

Searches and returns the cell for the designated row and column. The cell column type information is the argument.

(17) Find row (without cell information)

Searches and returns information for the row that corresponds to the row key, which is the argument.

(18) Find column (without cell information)

Searches and returns information for the column that corresponds to the column key, which is the argument.

(19) Find row (with cell information)

Returns information for the designated row. (There is column type link information in the cell.) The row key is the argument.

(20) Find row (condition designation)

Searches by using the designated condition that is the argument, and returns group information for the searched multiple rows (including cell column type information).

(21) Find column type (column key specification)

Searches by using the designated column key, and returns the column type list.

(22) Find row list (column cell value specification)

Returns a row list that matches the designated column and cell values. Resolution logic for providing peculiar settings for the target program is embedded in all the model programs that correspond to basic operations for the matrix type data structure.

5. Hierarchy Type Data Structure

Next, the data structure analysis unit 3 for the hierarchy type data structure will be explained. In the hierarchy type data structure, a plurality of entities (record types) are configured to a single column hierarchical structure such as in organizations, classifications, and total values. This structure is used if the concept of a hierarchy is fixed. Except for the highest instance, a tree data structure in which one instance is always determined as the upper instance is supposed. There can be hierarchical gaps between instances and there is no restriction on the number of levels.

Figure 25:
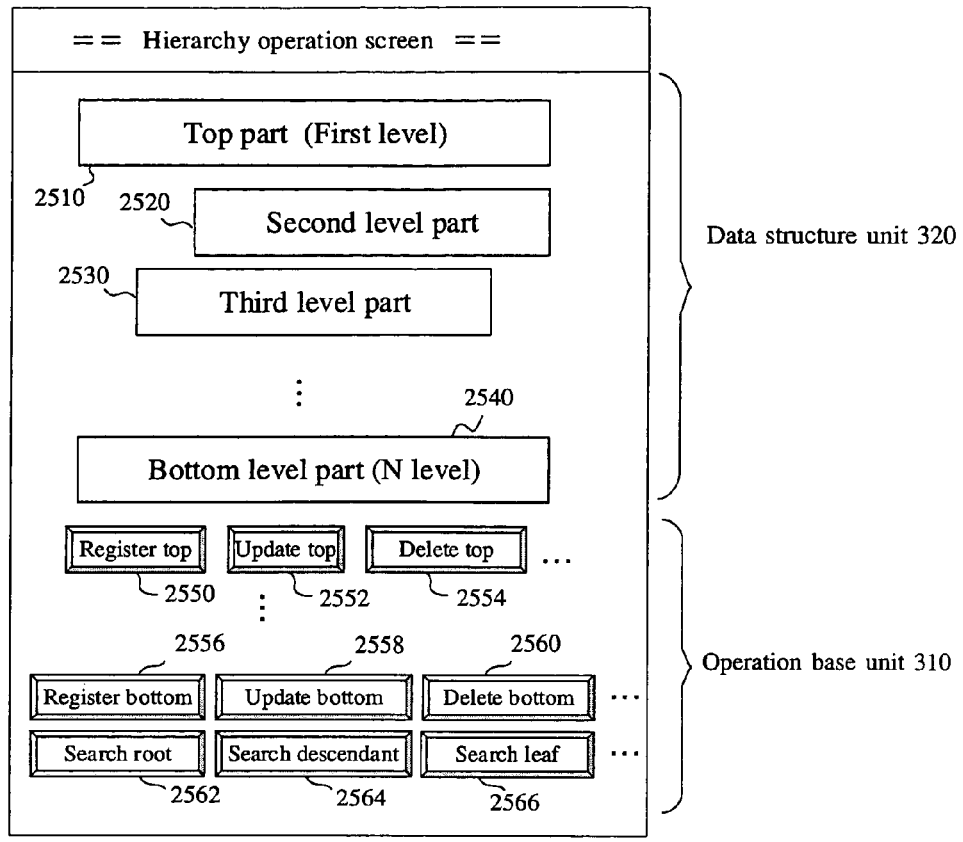
FIG. 25 shows an example of an operation screen output by a program for processing a hierarchy type data structures.

An example of a screen displayed by the program to be generated if the hierarchy type data structure has been selected is shown in FIG. 25. The data structure unit 320 includes the top part 2510 that displays the first level of data, the second level part 2520 that displays the second level of data, the third level part 2530 that displays the third level of data, . . . , the bottom part 2540 that displays the Nth level of data. The operation base unit 310 relates to buttons such as a register top button 2550 for registering records in the first level (registration operation with the designation of the hierarchical level being the top), an update top button 2552 for updating records in the top level (update operation with the designation of the hierarchical level being the top), a delete top button 2554 for deleting records in the top level (delete operation with the designation of the hierarchical level being the top), a register bottom button 2556 for registering records in the bottom level (registration operation with the designation of the hierarchical level being the bottom), an update bottom button 2558 for updating records in the bottom level (update operation with the designation of the hierarchy as being the bottom), a delete bottom button 2560 for deleting records in the bottom level (delete operation with the designation of the hierarchical being the bottom), a root search button 2562 for searching for the root of a particular record, a descendant search button 2564 for searching for descendants of a particular record, and a leaf search button 2566 for searching for leaves of a particular record. Buttons for operating records in middle levels are not shown here but exist.

Figure 26:
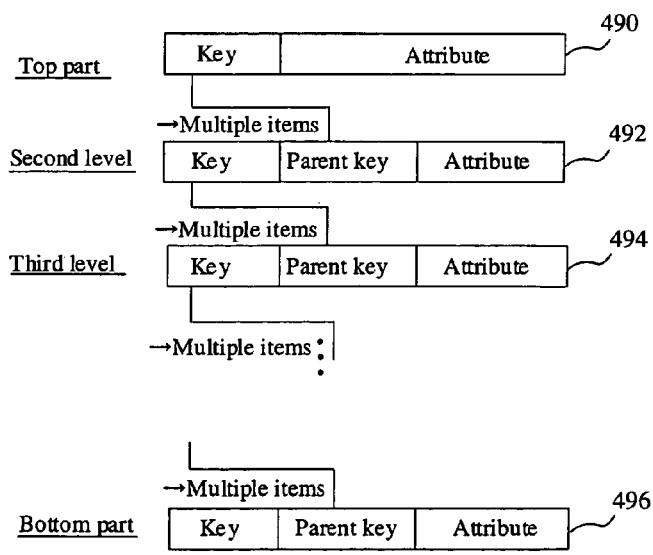
FIG. 26 is a schematic diagram that shows an overview of a hierarchy type data structure.

As shown in FIG. 26, the hierarchy type data structure in this embodiment of the present invention used by programs such as that which displays the screen shown in FIG. 25, includes: the top part 490 in the highest level that includes a key and an attribute; the second level part 492 that includes a key, a parent key, and an attribute; the third level 494 that includes a key, parent key, and an attribute; . . . , the bottom part 496 in the lowest level that includes a key, parent keys, and an attribute; a link from the top part 480 to the second level part 492; a link from the second level part 492 to the third level part 494; a link from the third level part 494 to the fourth level part; . . . , and a link from the N-1 level part to the bottom part 496. Below a certain record, there may be a plurality of lower level records. A processing unit for executing creation, deletion, search operation and etc. is provided for each record type such as the top part 490.

Furthermore, the operation base unit 310 includes basic operations such as those as shown below. The character strings in brackets are method names.

(1) Find node (findNodeByKey)

Searches for a node by the designated node key. (2) Find upper node (findUpperOfNode)

By using the designated node key, searches for upper nodes of that node. How far up the level to search is designated by a relative position relationship. (3) Find root node (findRootOfNode)

By using the designated key, searches for the root node of that node.

(4) Find lower node

By using the designated node key, searches for lower nodes of that node. How far down the level to search is designated by a relative positional relationship (findLowersOfNode). Reads out the node information from the searched node list in accordance with the designated number of nodes, and then creates a return value (nextNodes).

(5) Find leaf node

By using the designated node key, searches for leaf nodes of that node (findLeavesOfNode). Then, reads out the node information from the searched node list in accordance with the designated number of nodes, and creates a return value (nextNodes).

(6) Search nodes to root

By using the designated node key, searches for nodes from that node to the root of that node (findUppersOfNode). Then, reads out the node information from the searched node list in accordance with the designated number of nodes, and creates a return value (nextNodes).

(7) Search for a node in the absolute level

By using the designated node key, searches for nodes positioned in the absolute hierarchy level linked to that node (findNLevelNodesOfNode). Then, reads out the node information from the searched node list in accordance with the designated number of nodes, and creates a return value (nextNodes).

(8) Search for a root in the absolute level

By using the designated absolute hierarchy, searches for root nodes in that hierarchy (findRootsByLevel). Then, reads out the node information from the searched node list in accordance with the designated number of nodes, and creates a return value (nextNodes).

(9) Search for a leaf node in the absolute level

By using the designated absolute hierarchy, searches for leaf nodes in that hierarchy (findLeavesByLevel). Then, reads out the node information from the searched node list in accordance with the designated number of nodes, and creates a return value (nextNodes).

(10) Search for all nodes in the absolute hierarchy

By using the designated absolute hierarchy, searches for all nodes in that hierarchy (findNodesByLevel). Then, reads out the node information from the searched node list in accordance with the designated number of nodes, and creates a return value (nextNodes).

(11) Find node by condition

Searches for a node based on the designated condition. Then, reads out the node information from the searched node list in accordance with the designated number of nodes, and creates a return value (nextNodes).

(12) Create node with key (createNodeWithKey1)

By using the designated key, creates a new node. If an upper node is designated, the created node becomes its lower node. The return value is true or false.

(13) Create node with key

By using the designated key, creates a new node. If an upper node is designated, the created node becomes its lower node (createNodeWithKey2). Then, reads out the node information from the created node list in accordance with the designated number of nodes, and creates a return value (nextNodes).

(14) Create node without key

Creates a new node without the designation of the key (createNodeWithoutKey). Obtains the key from the number assignment service. If an upper node is designated, the created node becomes its lower node. Then, reads out the node information from the created node list in accordance with the designated number of nodes, and creates a return value (nextNodes).

(15) Delete node (removeNode)

Deletes the node designated by a key. Linked upper and lower nodes remain but the links are removed.

(16) Delete node and link (removeAndLink)

Deletes the node designated by a key, and then links upper and lower nodes.

(17) Delete node and shift (removeAndShift)

Deletes the node designated by a key, and moves lower nodes to other nodes on the same level as the deleted node.

(18) Delete nodes by level (removeHierarchy)

Deletes the node designated by a key and all nodes below it.

(19) Link nodes (linkNodes)

Links two nodes designated by a key.

(20) Cut link between nodes (unlinkNodes)

Cuts the link between nodes designated by a key.

(21) Update node information

Updates node information. The return value may be true or false or may be node information.

Figure 27:
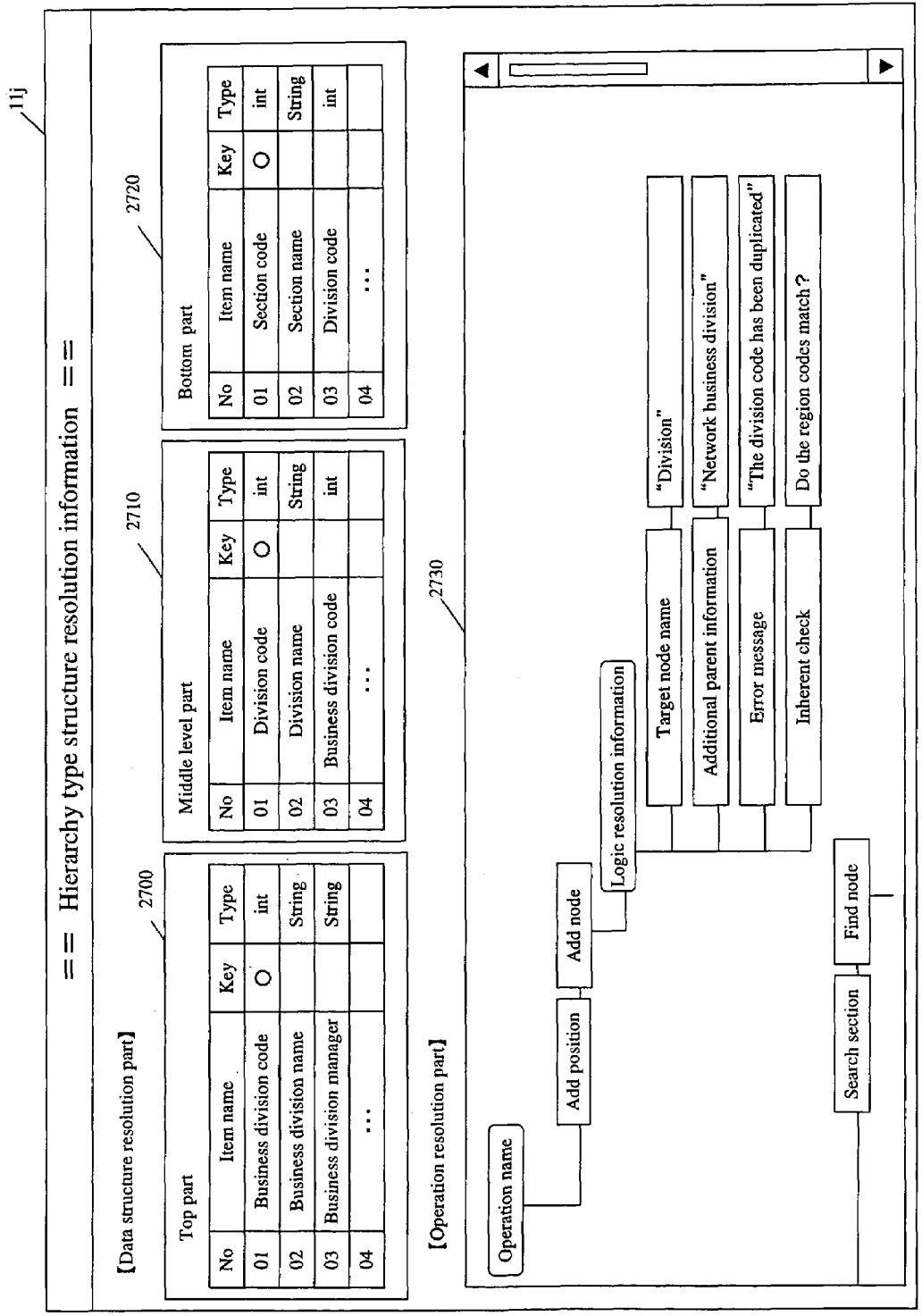
FIG. 27 shows an example of a screen for the input of resolution information for a data structure resolution unit for a hierarchy type data structure.

This type of data structure resolution unit 3 is prepared for the hierarchy type data structure. The resolution logic analyzer 7 analyzes the resolution logic in the data structure resolution unit 3, generates a resolution information input screen 11*j*, as shown in FIG. 27, and displays it for the user.

The resolution information input screen 11*j* includes data structure resolution parts 2700 through 2720 for the input of resolution information for the data structure unit 320 in the data structure resolution unit 3, and an operation resolution part 2730 for the input of resolution information for the resolution logic 382 embedded in the model programs 380 corresponding to the operation base unit 310 in the data structure resolution unit 3.

The data structure resolution part 2700 is a part for the entry of resolution information for the top part 490, which is the highest level. Item names, whether or not they are keys, and data types are entered here. In other words, resolution logic 382 for providing attributes for the top part 490 is included in the model programs 380. In the example of FIG. 27, the item name 'Business division code' is entered, and the facts that the 'business division code' is a key and integer type data are entered. The item name 'Business division name' is entered, and the fact that the 'business division name' is character string type data is entered. The item name 'Business division manager' is entered, and the fact that the 'business division manager' is character string type data is entered.

The data structure resolution part 2710 is a part for the entry of resolution information for the middle level in the hierarchy (level 2 through level N-1). Item names, whether or not they are keys, and data types are entered here. In other words, resolution logic 382 for providing attributes for the middle levels is included in the model program 380. In the example of FIG. 27, the item name 'Division code' is entered, and the facts that the 'division code' is a key and integer type data are entered. The item name 'Division name' is entered, and the fact that the 'division name' is character string type data is entered. The item name 'Business division code' is entered, and the fact that the 'business division code' is integer type data is entered.

The data structure resolution part 2720 is a part for entry of resolution information for the bottom part 496, which is the lowest level. Item names, whether or not they are keys, and data types are entered here. In other words, resolution logic 382 for providing attributes for the bottom part 496 is included in the model program 380. In the example of FIG. 27, the item name 'Section code' is entered, and the facts that the 'section code' is a key and integer type data is entered. The item name 'Section name' is entered, and the fact that the 'section name' is character string type data is entered. The item name 'Division code' is entered, and the fact that the division code is integer type data is entered.

The operation resolution part 2730 is a part for the entry of resolution information for resolution logic 352 embedded into model programs 350 through 370 that correspond to the basic operation part 310 in the data structure resolution unit 3. Firstly, the user is requested to enter the operation name. In FIG. 27, the operation name 'Add position' is entered. Next, the basic operation that corresponds to this 'Add position' is selected. The list of basic operation names is used in this selection. In FIG. 27, the basic operation 'Add node' is selected as the operation that corresponds to the 'Add position'. The model program that corresponds to this basic operation 'Add node' is read out and entry of resolution information to replace the embedded resolution logic is requested. In FIG. 27, 'Division' is entered as the item of the target node name. 'Network business division' is entered as the item of the additional parent information. 'Division codes have been duplicated' is entered as the error message item. 'Do the region codes match?' is entered as the item of the inherent check. The conditions for the inherent check can be described using Boolean or arithmetic formula.

The next operation name is 'Find section', and it is represented that the corresponding basic operation is 'Find node'. This type of input processing is repeated until all the necessary operations according to the specification of the target program have been prescribed.

6. Tree Type Data Structure

The tree type data structure is used if one entity manages an upper and lower relationship, as in classifications and directories. In other words, this data structure is used if one upper instance is determined between instances but the number of levels or the level concept are not fixed and have not been predetermined.

Figure 28:
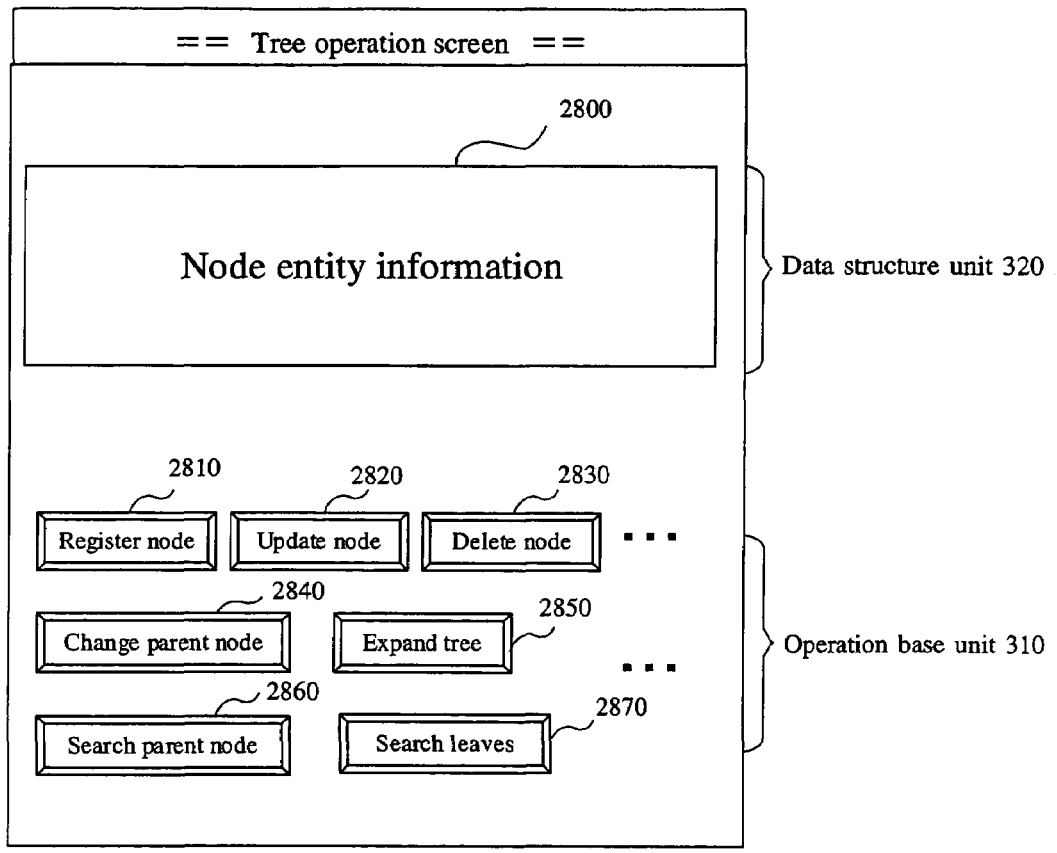
FIG. 28 shows an example of an operation screen output by a program for processing a tree type data structure.

FIG. 28 shows an example of a screen displayed by the program to be generated if the tree type data structure is selected. The data structure unit 320 includes node entity information 2800. For example, a diagram of a directory structure is shown. The operation base unit 310 relates a node registration button 2810 for registering a node, a node update button 2820 for updating a node, a node delete button 2830 for deleting a node, a parent node change button 2840 for changing the parent node, a button 2850 for expanding the tree, a parent node search button 2860 for searching for the parent node, a button 2870 for searching for the leaf nodes, and etc.

Figure 29:
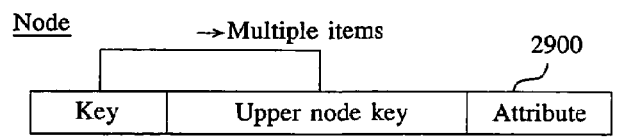
FIG. 29 is a schematic diagram that shows an overview of a tree type data structure.

As shown in FIG. 29, the tree type data structure in this embodiment of the present invention comprises only one node record 2900. This node record 2900 includes a key, keys of the upper nodes (0 for highest level, and N for lower levels (where N is an integer of 0 or more)), and an attribute. A processing unit for executing creation, deletion, search operation and etc. is provided for a node record.

Furthermore, the operation base unit 310 of the tree type data structure includes basic operations such as those shown below. The character strings in brackets are method names.

(1) Find node (findNodeByKey)
By using the designated node key, searches for the node.
(2) Find parent node (findParentOfNode)
By using the designated node key, searches for the parent node of that node.
(3) Find root node (findRootOfNode)
By using the designated node key, searches for the root node of that node.
(4) Find descendant nodes
By using the designated node key, searches for the descendant nodes of that node (findChildrenOfNode). Then, reads out the information for one node from the searched node list, and creates a return value (nextNode). Alternatively, reads out the node information from the searched node list in accordance with the designated number, and creates a return value (nextNodes).
(5) Find leaf node
By using the designated node key, searches for leaf nodes of that node (findLeavesOfNode). Then, reads the information for one node from the searched node list, and creates a return value (nextNode). Alternatively, reads out the node information from the searched node list in accordance with the designated number, and creates a return value (nextNodes).
(6) Search nodes to root
By using the designated node key, searches from that node to the root for upper nodes (findAncestorsOfNode). The designated level number determines how many levels go up in the search. Reads out information for one node from the searched node list, and creates a return value (nextNode). Alternatively, reads out the node information from the searched node list in accordance with the designated node number, and creates a return value (nextNodes).
(7) Search nodes to leaf
By using the designated node key, searches from that node to the leaves for lower nodes (findTreeOfNode). The designated level number determines how many levels go down in the search. Reads out information for one node from the searched node list, and creates a return value (nextNode). Alternatively, reads out the node information from the searched node list in accordance with the designated node number, and creates a return value (nextNodes).
(8) Find node by condition
Searches for a node by the designated condition. Reads out information for one node from the searched node list, and creates a return value (nextNode). Alternatively, reads out the node information from the searched node list in accordance with the designated node number, and creates a return value (nextNodes).

(9) Find number of descendant nodes (countChildren)

By using the designated node key and number of levels, obtains the number of descendant nodes from that node up to that level.

(10) Create node with key (createWithKey1(createNode))

By using the designated key, creates a new root-leaf node (which has no links to the parent node and to the descendant node). The return value is true or false. (11) Create node with key (createWithKey2(createNode)) By using the designated key, creates a new root-leaf node. The return value is node information. (12) Create node without key (createWithoutKey(createNode))

Creates a new root-leaf node without the designation of a key. The return value is the created node information. Obtains the key from the number assignment service.

(13) Create root node with key (createRootWithKey1 (createRoot))

By using the designated key, creates a new root node. The return value is true or false.

(14) Create root node with key (createRootWithKey2 (createRoot))

By using the designated key, creates a new root node. The return value is information of the created node.

(15) Create root node without key (createRootWithoutKey(createRoot))

Generates a new root node without the designation of a key. The return value is the created node information. Obtains the key from the number assignment service.

(16) Create leaf node with key (createLeafWithKey1 (createLeaf))

By using the designated key, creates a new leaf node. The return value is true or false.

(17) Create leaf node with key (createLeafWithKey2 (createLeaf))

By using the designated key, creates a new leaf node. The return value is information of the created node.

(18) Create leaf node without key (createLeafWithoutKey (createLeaf))

Creates a new leaf node without the designation of a key. The return value is information of the created node. Obtains the key from the number assignment service.

(19) Create tree with key (createTreeWithKey1)

By using the designated key, creates a new tree. The return value is true or false. If a parent node has been specified, the new tree becomes a sub-tree of that node.

(20) Create tree with key

By using the designated key, creates a new tree (createTreeWithKey2). If a parent node has been specified, the new tree becomes a sub-tree of that node. Reads out the information for one node from the created node list, and creates a return value (nextNode). Alternatively, reads out node information from the created node list in accordance with the designated node number, and creates a return value (nextNodes).

(21) Create tree without key

Creates a new tree without the designation of a key (createTreeWithoutKey). Obtains the key from the number assignment service. If a parent node has been specified, the new tree becomes a sub-tree of that node. Reads out the information for one node from the created node list, and creates a return value (nextNode). Alternatively, reads out node information from the created node list in accordance with the designated node number, and creates a return value (nextNodes).

(22) Delete node (removeNode)

Deletes the node designated by the key. The linked parent node and descendant nodes remain but the links are deleted.

(23) Delete node and link (removeAndLink)

Deletes the node designated by the key, and then links the parent node and descendant nodes of that node.

(24) Delete from node to leaves (removeTree)

Deletes nodes from the node designated by the key to the leaf nodes of that node.

(25) Link nodes (linkNodes)

Links two nodes designated by the keys.

(26) Cut link between nodes (unlinkNodes)

Cuts the link between two nodes designated by the keys.

(27) Change parent node (changeLink)

Changes the link between a node designated by the key and its parent node.

(28) Update node information

Updates node information. The return information may be true or false or may be node information.

Figure 30:
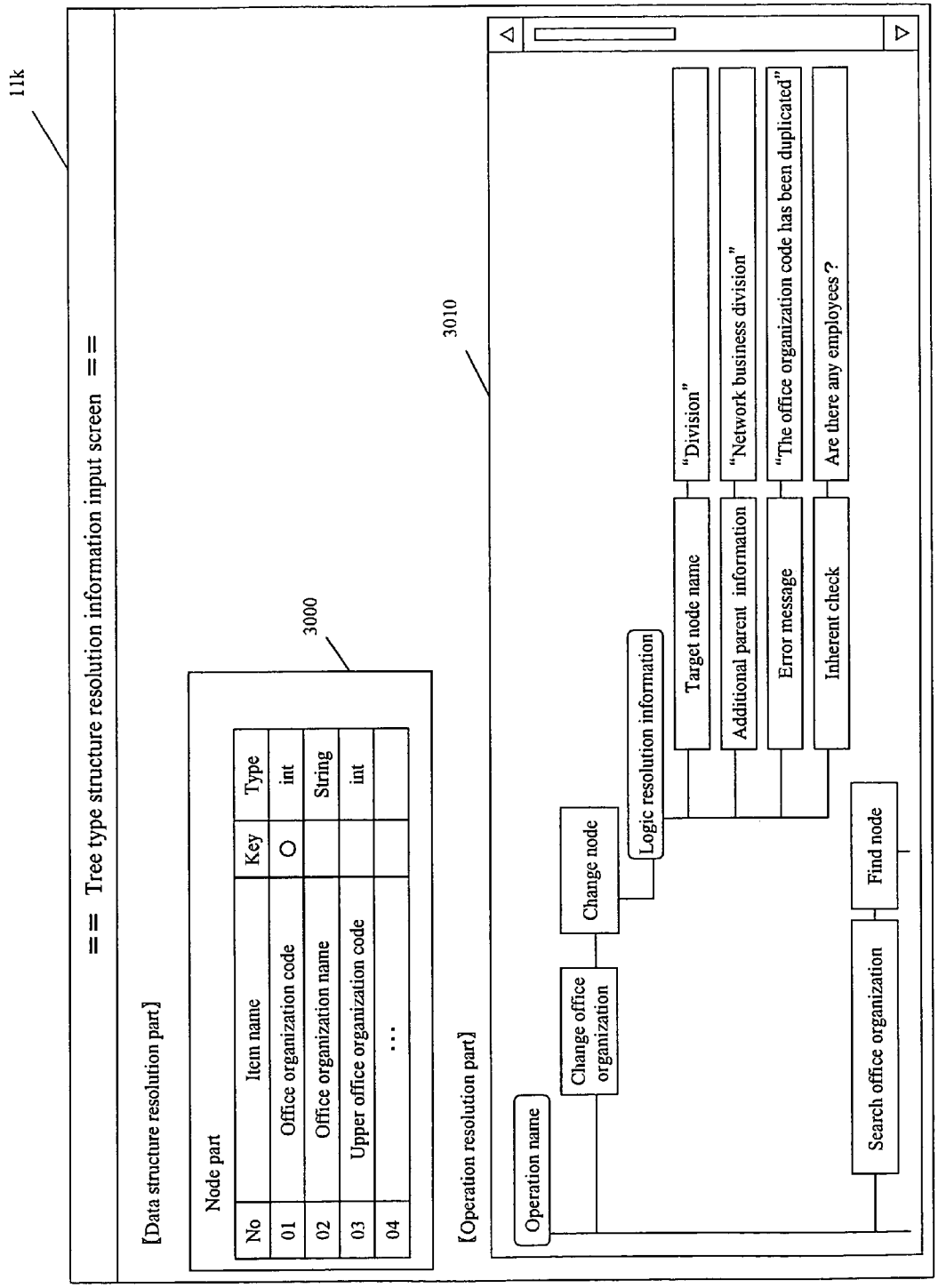
FIG. 30 shows an example of a screen for the input of resolution information for a data structure resolution unit for a tree type data structure.

This type of data structure resolution unit 3 is prepared for the tree type data structure. The resolution logic analyzer 7 analyzes the resolution logic of the data structure resolution unit 3, creates the resolution information input screen 11K, as shown in FIG. 30, and displays this for the user.

The resolution information input screen 11K includes a data structure resolution part 3000 for the input of resolution information for the data structure unit 320 of the data structure resolution unit 3, and an operation resolution part 3010 for the input of resolution information for the resolution logic 382 embedded in the model program 380 that corresponds to the operation base unit 310 of the data structure resolution unit 3.

The data structure resolution part 3000 is a part for entry of resolution information for the node records 2900. Item names, whether or not they are keys, and data types are entered here. In other words, resolution logic 382 for providing attributes for the node record 2900 is included in the model program 380. In the example of FIG. 30, the item name 'Office organization code' is entered, and the facts that the 'office organization code' is a key and integer type data are entered. The item name 'Office organization name' is entered, and the fact that the 'office organization name' is character string type data is entered. The item name 'Upper office organization code' is entered, and the fact that the 'upper office organization code' is integer type data is entered.

The operation resolution part 3010 is a part for the input of resolution information for the resolution logic 352 embedded in model programs 350 through 370 that correspond to the operation base unit 310 of the data structure resolution unit 3. Firstly, the user is asked to enter the operation name. In FIG. 30, the operation name is entered as 'Change office organization'. Next, the basic operation corresponding to this 'Change office organization' is selected. The basic operation name list is used in this selection. In FIG. 30, 'Change node' is selected as the basic operation that corresponds to the 'Change office organization'. The model program that corresponds to this basic operation 'Change node' is read out, and entry of the resolution information that will replace the embedded resolution logic is requested. In FIG. 30, 'Division' is entered for the item of the target node name. 'Network business division' is entered as the item of the additional parent information. 'Office organization codes have been duplicated' is entered as the error message. 'Are there any employees?' is entered as the item of the inherent check. The conditions of the inherent check can be described as either Boolean or arithmetic formula.

It is represented that the next operation name is 'Find office organization' and the corresponding basic operation is 'Find node'. Such input processing is repeated unit all the necessary operations according to the specification of the target program have been prescribed.

7. Detail-Led Slip Type Data Structure

The detail-led slip type data structure is used if in the slip type work, information in detail units is mainly used rather than in header units. Instead of issuing new slips, work progresses by changing the units in which details are bundled and attaching a new header. Work proceeds while the substance of the details is unchanged. The details, not the headers, lead the state change and the state change may cause the change of the headers.

For example, if there are transaction details with detail numbers 1001 through 1004, as shown in FIG. 31*d,* a sales slip (FIG. 31*a*) of sale number 101 is generated. An invoice slip (FIG. 31*b*) of invoice number 201 is generated if Merchant A has checked detail numbers 1001 through 1003. If payment for the invoice slip for detail numbers 1001 through 1003 is confirmed, a receipt slip (FIG. 31*c*) of receipt number 301 is generated. Even if details of detail numbers 1001 through 1003 are transferred to the invoice processing, the appearance of the sales slip does not change. That is, the sales slip still has the details of detail number 1001 through 1004. Thus, the transaction details are not changed, and the sales slip, invoice slip, and receipt slip that become the new headers are added relating to the transaction details. The detail-led slip type data structure is useful in this type of work.

Figure 32:
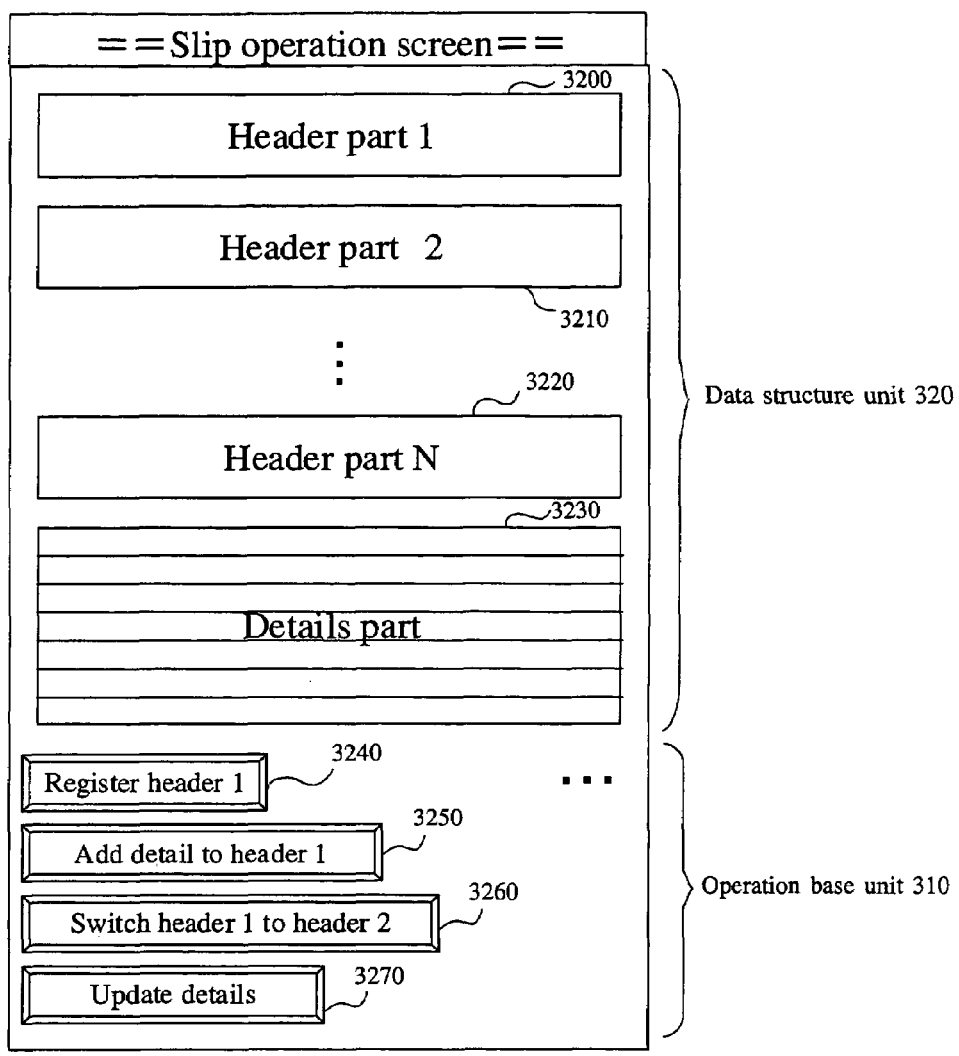
FIG. 32 shows an example of an operation screen output by a program that processes a detail-led slip type data structure.

Next, an example of a screen displayed by the program to be generated if the detail-led slip type data structure is selected is shown in FIG. 32. The data structure unit 320 includes: the data display part 3200 for the header part 1 (for example, sales slip), the data display part 3210 for the header part 2 (for example, invoice slip), . . . , the data display part 3220 for the header part N (for example, receipt slip), and the data display part 3230 for the detail part (for example transaction details). The operation base unit 310 relates to a button 3240 for registering header 1, a button 3250 for adding a detail to header 1, a button 3260 for switching header 1 to header 2, a button 3270 for updating details, and etc.

Figure 33:
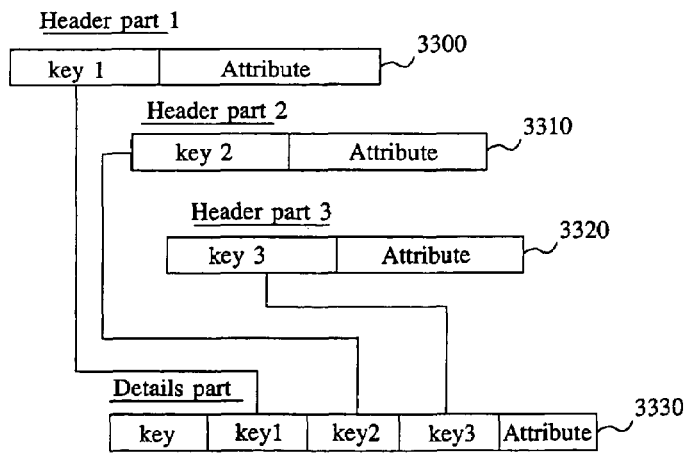
FIG. 33 is a schematic diagram that shows an overview of a detail-led slip type data structure.

As shown in FIG. 33, the detail-led slip type data structure in this embodiment of the present invention, which is used by the program that displays the screen as shown in FIG. 32, includes a header part 1 (3300), header part 2 (3310), header part 3 (3320), . . . , details part 3330, a link between header part 1 (3300) and details part 3330, a link between header part 2 (3310) and details part 3330, and a link between header part 3 (3320) and details part 3330. The header part 1 (3300) contains key 1 and an attribute. The header part 2 (3310) contains key 2 and an attribute. The header part 3 (3320) contains key 3 and an attribute. The details part 3330 contains a key for the details part 3330, key 1 for the header part 1 (3300), key 2 for the header part 2 (3310), key 3 for the header part 3 (3320), and an attribute. This example includes three headers, but the number of headers is not fixed.

A processing unit for executing creation, deletion, key search, and all item search operations and etc., is provided for each of the header part 1 (3300), header part 2 (3310), and header part 3 (3320). A processing unit for executing creation, deletion, and key search operations and etc., is provided for the details part 3330.

Furthermore, the operation base unit 310 in the detail-led slip type data structure comprises basic operations such as those shown below. The character strings in brackets are method names.

(1) Find slip (findSlipByHeaderKey)

Searches for a slip with the designated header key.

(2) Find single detail (findDetailByKey)

Searches for a single detail of a slip with the designated header key by the designated line number.

(3) Find detail state

Searches for a detail that has the designated state(findDetailByState) and obtains information for one detail after the search (NextDetail).

(4) Find header by header type (findOldHeaderByKind)

Searches for a header designated by a detail and a slip header type.

(5) Find slip by header type (findOldSlipByKind)

Searches for a slip designated by a detail and a slip header type.

(6) Find slip by condition

Searches slips by the designated condition, and obtains all information for one slip after conditional search (nextSlip).

(7) Create new slip with key (createSlipWithKey1)

creates a new slip with setting a key, and then returns results as true or false.

(8) Create new slip with key creates a new slip with setting a key (createSlipWithKey2), and then returns the created slip information.

(9) Create new slip without key

Creates a new slip without setting a key (createSlipWithoutKey), and then returns the created slip information.

(10) Add details (insertDetails1)

Adds a plurality of details to an existing slip, and returns the results as true or false.

(11) Add details

Adds a plurality of details to an existing slip (insertDetails2), and returns the added slip information.

(12) Change slip header type (changeHeaderWithKey)

Updates the detail state to the designated state, and changes to the header designated by a key and slip header type. Creates a new header if the designated slip type header does not exist.

(13) Change slip header type (changeHeaderWithoutKey)

Updates the detail state to the designated state, creates a new header of the designated slip header type, and changes the header.

(14) Change detail state (changeState)

Changes the detail state to the designated state. Checks the transition possible destination set in the detail state class and a flag for deletion permission.

(15) Delete detail (removeDetail)

Deletes one detail.

(16) Delete slip (removeSlip)

Deletes a slip.

(17) Update header

Updates contents of the header designated by a key, and returns results as true or false.

(18) Update header

Updates contents of the header designated by a key, and returns the updated header contents.

(19) Update detail

Updates contents of the slip detail designated by a key, and returns the results as true or false.

(20) Update detail

Updates contents of the slip detail designated by a key, and returns the updated slip contents.

Figure 34:
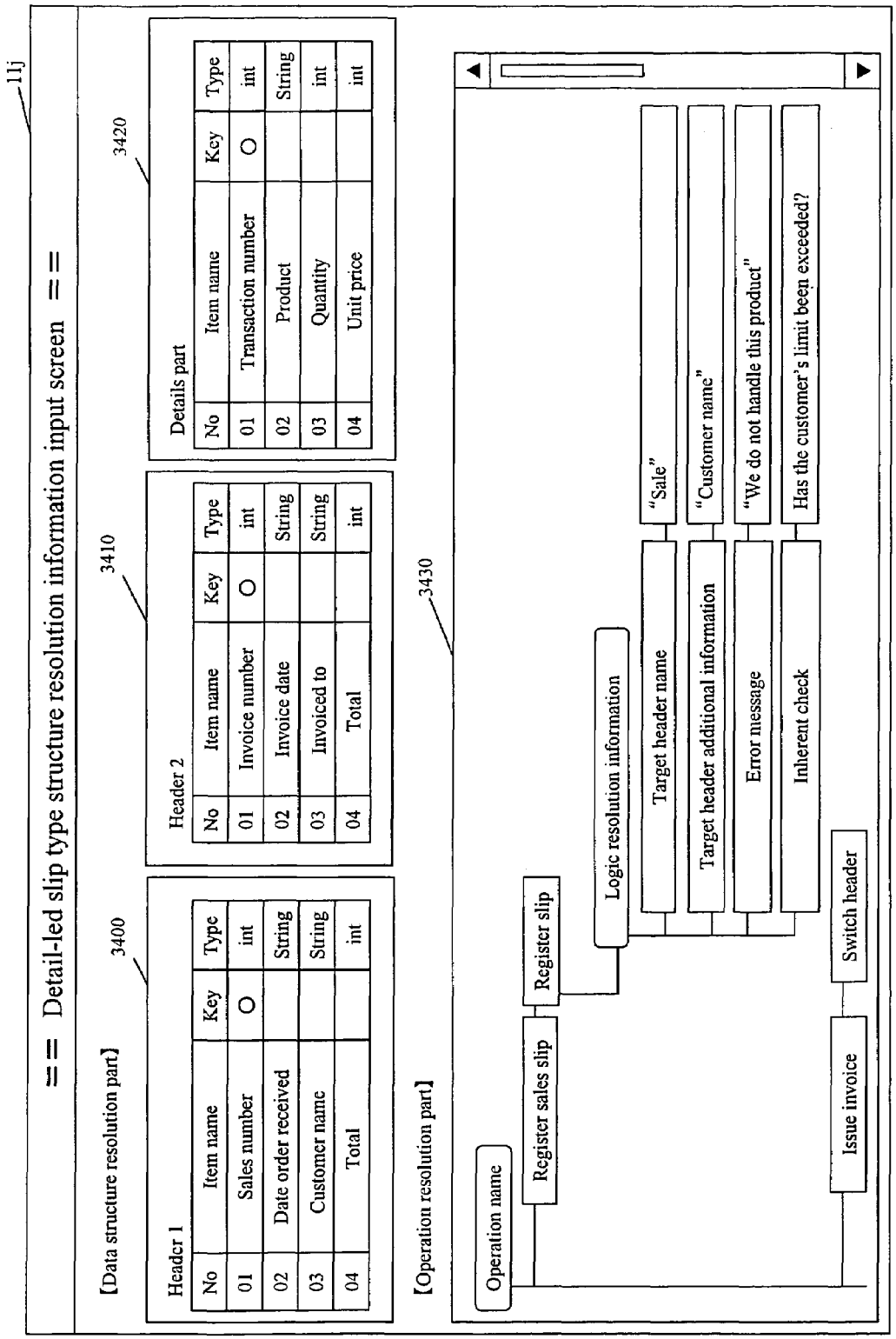
FIG. 34 shows an example of a screen for the input of resolution information for a data structure resolution unit for a detail-led slip type data structure.

This type of data structure resolution unit 3 is prepared for the detail-led slip type data structure. The resolution logic analyzer 7 analyzes the resolution logic of the data structure resolution unit 3, creates the resolution information input screen 11*l*, as shown in FIG. 34, and displays this for the user.

The resolution information input screen 11*l* includes data structure resolution parts 3400 through 3420 for entering resolution information for the data structure unit 320 in the data structure resolution unit 3, and an operation resolution part 3430 for entering resolution information for the resolution logic 382 embedded in the model program 380 that corresponds to the operation base unit 310 in the data structure resolution unit 3.

The data structure resolution part 3400 is a part for the input of resolution information for header part 1 (3300). Item names, whether or not they are keys, and data types are entered here. In other words, resolution logic 382 for providing attributes for the header part 1 (3300) is included in the model program 380. In the example of FIG. 34, the item name 'Sales number' is entered, and the facts that the sales number is a key and integer type data are entered. The item name 'Date order received' is entered, and the fact that 'date order received' is character string type data is entered. The item name 'Customer name' is entered, and the fact that 'customer name' is character string type data is entered. The item name 'Total' is also entered, and the fact that the 'total' is integer type data is entered.

The data structure resolution part 3410 is a part for the input of resolution information for the header part 2 (3310). Item names, whether or not they are keys, and data types are entered here. In other words, resolution logic 382 for providing attributes for the header part 2 (3310) is included in the model program 380. In the example of FIG. 34, the item name 'Invoice number' is entered, and the facts that the 'invoice number' is a key and integer type data are entered. The item name 'Invoice date' is entered, and the fact that the 'invoice date' is character string type data is entered. The item name 'Invoiced to' is entered, and the fact that 'invoiced to' is character string type data is entered. The item name 'total' is entered, and the fact that the 'total' is integer type data is entered.

The data structure resolution part 3420 is a part for entry of resolution information for the details part 3330. Item names, whether or not they are keys, and data types are entered here. In other words, resolution logic for providing attributes for the details part 3330 is included in the model program 380. In the example of FIG. 34, the item name 'Transaction number' is entered, and the facts that the 'transaction number' is key and integer type data are entered. The item name 'Product' is entered, and the fact that the 'product' is character string type data is entered. The item name 'Quantity' is entered, and the fact that the 'quantity' is integer type data is entered. The item name 'Unit price' is entered, and the fact that the 'unit price' is integer type data is entered.

The operation resolution part 3430 is a part for the input of resolution information for the resolution logic 352 embedded in model programs 350 through 370 that correspond to the operation base unit 310 in the data structure resolution unit 3. Firstly, the user is asked to enter the operation name. In FIG. 34, 'Register sales slip' is entered as the operation name. Next, the basic operation that corresponds to this 'register sales slip' is selected. The basic operation name list is used in this selection. In FIG. 34, the basic operation 'Register slip' is selected to correspond to 'register sales slip'. The model program corresponding to this basic operation 'Register slip' is read out and input of the resolution information for replacing the embedded resolution logic is requested. In FIG. 34, 'Sale' is entered for the item of the target header name. 'Customer name' is entered in the item of target header additional information. 'We do not handle this product' is entered for the item of the error message. 'Has the customer's limit been exceeded?' is entered for the item of the inherent check. The inherent check conditions can be described using Boolean or arithmetic formula. Thus, resolution logic for defining header record state by their relationship with operations and resolution logic for describing settings made in accordance with the program specification through record attributes, record states, or combinations of record attributes and states are embedded in the model program that corresponds to the basic operation.

It is represented that the next operation name is 'Issue invoice' and the corresponding basic operation is 'Switch header'. This input processing is repeated until all the operations needed in accordance with the target program specification are prescribed.

8. Composition Type Data Structure

The composition type data structure is used in such cases that something that configures and something that is configured are handled as one entity, as in a parts schedule, and their n to m relationships (composition information) are managed. A tree type data structure is used if 1 to n relationships are managed.

Figure 35:
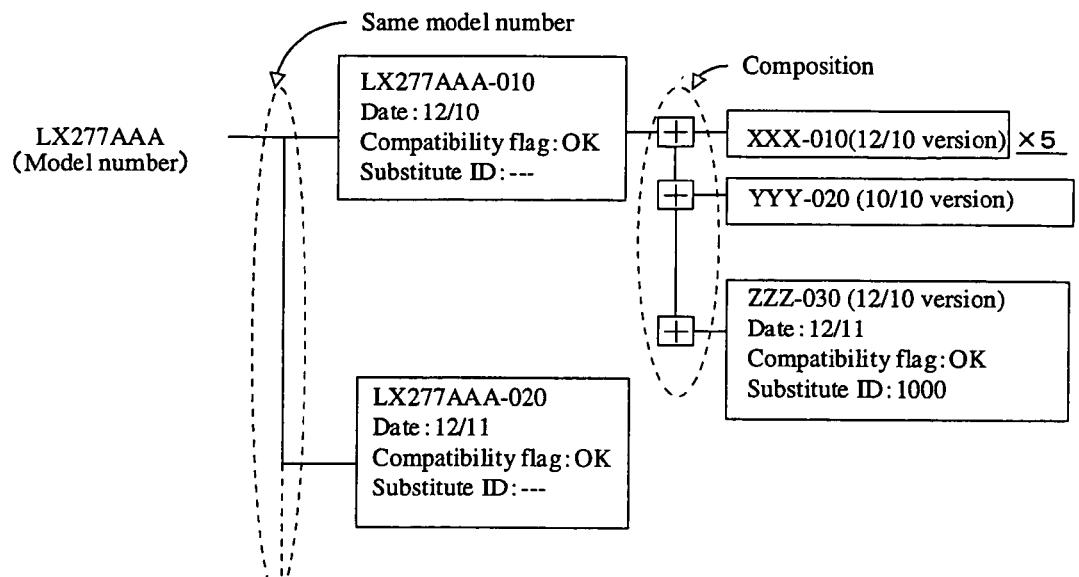
FIG. 35 shows an example of data model to which a composition type data structure can be applied.

For example, as shown in FIG. 35, within the one model number LX277AAA there exist different versions. Here, there is the LX277AAA-010 (Date: December 11, Compatibility flag: OK, Substitute group ID: -) version and the LX277AAA-020 (Date: December 12, Compatibility flat: OK, Substitute group ID: -) version. These three versions can be referred to as the one model number. Furthermore, parts for each version can be defined. In FIG. 35, there are five XXX-010 (December 10 version), a YYY-010 (October 10 version) and a ZZZ-030 (December 10 version) for the LS277AAA-010 version. The links that couple the version and parts are called the 'composition'. There may be versions for parts. Here, a compatibility flag shows whether or not the version is compatible with the basic version (basic model number). 'OK' indicates it has the compatibility. The substitute group ID is a group ID for substitute parts if substitute parts exist.

Figure 36:
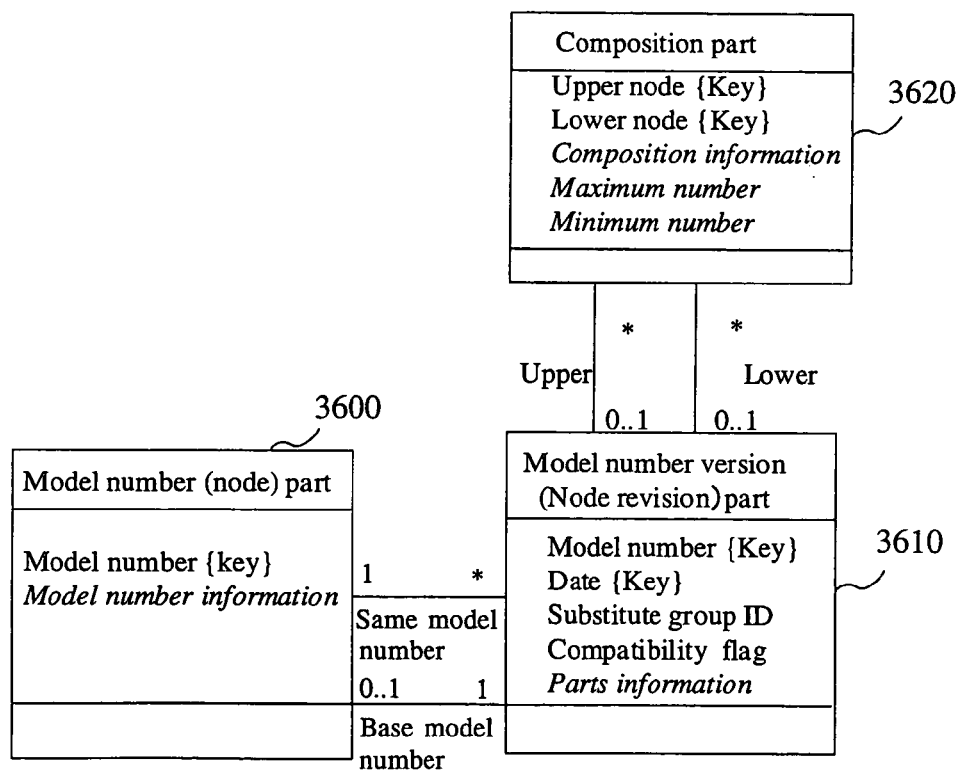
FIG. 36 is a schematic diagram that shows an overview of a composition type data structure.

As shown in FIG. 36, the composition type data structure for representing the state as in FIG. 35, includes a model number (node) part 3600, a model number version (node revision) part 3610, a composition part 3620, a link between the model number part 3600 and the model number version part 3610, and a link between the model number version part 3610 and the composition part 3620. The model number part 3600 includes a model number, which is a key, and the model number information, which is an attribute. The model number version part 3610 includes model number and date, which are keys, and substitute group ID, compatibility flag, and parts information, which are attributes. The composition part 3620 includes upper and lower nodes, which are keys, and composition information, and upper and lower limit numbers, which are attributes. There are N (where N is an integer of 0 or more) model number version parts 3610 for one model number part 3600. A model number part 3600, which is for the basic model number, may or may not exist for one model number version part 3610. There are M (where M is an integer of 0 or more) composition parts 3620 for one model number version part 3610. Note that an upper model number version part 3610 may or may not exist. In the same way, a lower model number version part 3610 may or may not exist. The model program 380 that corresponds to the data structure unit 320 of the composition type data structure includes resolution logic 382 for providing attributes for the model number part 3600, model number version part 3610, and composition part 3620.

Furthermore, the operation base unit 310 of the composition type data structure includes basic operations such as those shown below. The character strings in brackets are method names.

(1) Find node revision (findNodeRevisionByKey)

Searches for one node revision using a primary key.

(2) Find a plurality of node revisions

Searches for node revisions that refer to the same node as the designated node revision (findNodeRevisionByNode), and then reads out a message list from the search results list (nextNodeRevision).

(3) Search for a plurality of replaceable node revisions

Searches for node revisions that can replace the designated node (findReplaceableNodeRevisionsByNode), and then reads out a message list from the search results list (nextNodeRevision).

(4) Check whether replaceable (isNodeRevisionReplaceable)

Checks whether or not a node revision can be replaced.

(5) Find base version (findBaseNodeRevisionByNode)

Searches for the base version using a node key.

(6) Find base node revision (findBaseNodeRevisionByNodeRevision)

Searches for the base node revision using a node version.

(7) Find a plurality of substitutable node revisions

Searches for a plurality of substitutable node revisions (findSubstituteRevisionByNodeRevision), and then reads a message list from the search results list (nextNodeRevision).

(8) Confirm that substitution is possible

Confirms whether or not the designated node revision can substitute for other node revisions.

(9) Find single latest node revision (findLatestRevisionByNodeKey)

Searches for one latest node revision.

(10) Find single composition information by key (findCompositionByKey)

Searches for single composition information using a key.

(11) Find composition using upper node revision

Searches for composition using upper node revision (findCompositionsByUpprNodeRevision), and then reads out a message list from the search results list (nextComposition).

(12) Find a plurality of lower node revisions using the designated node revision information Searches for lower node revisions using the designated node revision information (findLowersOfNodeRevision), and then reads out the message list from the search results list (nextNodeRevision).

(13) Find a plurality of composition information using lower node key

Searches for composition information using lower node key (FindCompositionsByLowerNodeRevision), and then reads out the message list from search results list (nextComposition).

(14) Find a plurality of upper nodes by designated node revision information

Searches for upper nodes using the designated node revision information (findUppersOfNodeRevision), and then reads out the message list from the search results list (nextNodeRevision).

(15) Find root node revision

Searches for all root node revisions starting with the designated node version (findRootsOfNodeRevision), and then reads out the message list from the search results list (nextNodeRevision).

(16) Find leaf node revision

Searches for all leaf node revisions starting with the designated node revision (findLeavesOfNodeRevision), and then reads out the message list from the search results list (nextNodeRevision).

(17) Expand node revision upwards (expandNodeRevisionUpper)

Starting with the designated node revision, expands node revisions upwards by the designated number of the expanding levels.

(18) Expand node revision downwards (expandNodeRevisionLower)

Starting with the designated node revision, expands node revisions downwards by the designated number of the expanding levels.

(19) Expand composition information upwards (expandCompositionUpper)

Starting with the designated node revision, expands composition information upwards by the designated number of the expanding levels.

(20) Expand composition information downwards (expandCompositionLower)

Starting with the designated node revision, expands composition information downwards by the designated number of the expanding levels.

(21) Check whether or not designated node revision is above designated composition information (isNodeRevisionInCompositionUpper)

Checks whether or not the designated node revision is above the designated composition information.

(22) Check whether or not a node version is above the designated node revision (isNodeRevisionInRevisionUpper)

Checks whether or not a node revision is above the designated node revision.

(23) Check whether or not designated node revision is below designated composition information (isNodeRevisionInCompositionLower)

Checks whether or not the designated node revision is below the designated composition information.

(24) Check whether or not a node revision is below the designated node revision (isNodeRevisionInRevisionLower)

Checks whether or not a node revision is below the designated node revision.

(25) Register node revision (with key) (createNodeRevisionWithKey1)

Registers a new node version with the designated key. (There is a node revision registration key.) Notifies user if an error exists or not.

(26) Register node revision (with key) (show registered node revision) (createNodeRevisionWithKey2)

Registers a new node version with the designated key. (There is a node version registration key.) Displays the contents of the registered node revision.

(27) Register node revision (without key) (createNodeRevisionWithoutKey)

Uses a key obtained from the number assignment function to register a new node version. (There is no node revision registration key.)

(28) Register composition (return value is true or false) (createComposition1)

Registers the composition by the designated upper and lower node revisions.

(29) Register composition (return value is node revision information) (createComposition2)

Registers the composition by the designated upper and lower node revisions.

(30) Register composition information for two node revisions (linkNodeRevision)

Creates composition information for two designated node revisions.

(31) Establish base node revision and replaceable revisions (establishBaseNodeRevision)

Establishes base node revision and replaceable revisions.

(32) Release base node revision and replaceable revisions (releaseBaseNodeRevision)

Releases base node revision and replaceable revisions.

(33) Establish replaceable revision (establishReplaceableNodeRevision)

Enables the designated node revision to be replaceable.

(34) Release replaceable state (releaseReplaceableNodeRevision)

Releases the replaceable state of the designated node revision.

(35) Update node revision (return value is true or false)

Updates node revision. The return value may be node revision information or true or false.

(36) Change lower node revision of composition information

Changes the lower node revision of the designated composition information to the designated node revision.

(37) Delete node revision (removeNodeRevision)

Deletes a node revision.

(38) Delete single composition information (removeComposition)

Deletes single composition information.

Resolution logic for providing settings peculiar to the target program is embedded in each of the model programs that correspond to the basic operations in this composition type data structure.

9. Seat Reservation Type Data Structure

Figure 37:
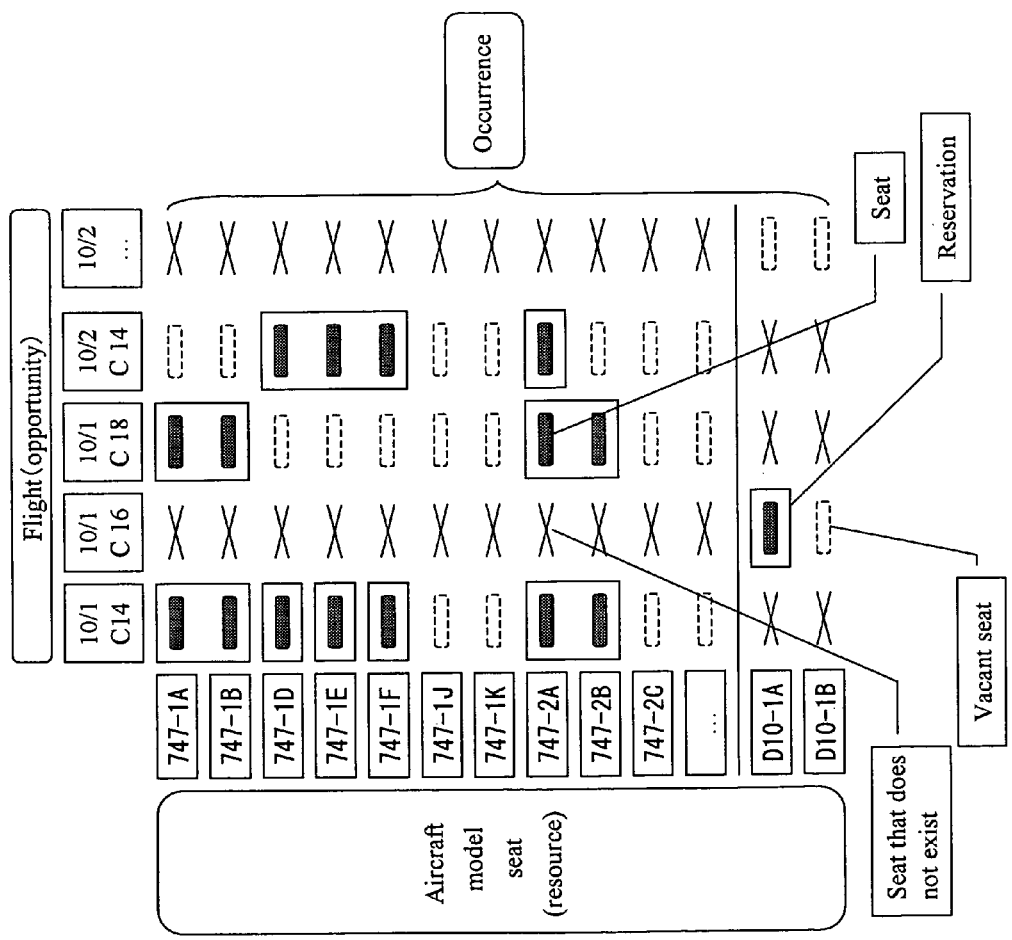
FIG. 37 shows an example of a model to which a seat reservation type data structure can be applied.

The seat reservation type data structure is used for managing resources and reservations for the usage opportunities of the resources, such as train or aeroplane ticket reservations, and concert ticket reservations. FIG. 37 shows an example of an aeroplane ticket reservation. Each line in FIG. 37 represents a seat on particular models of an aircraft. Entries such as '747-1A', '747-1B' . . . show the aircraft model name and the seat code. The seats can also be thought of as resources. On the other hand, each column shows a flight number. Entries such as '10/1 C14' and '10/1 C15' . . . show the date and the flight number. The flights can also be thought of as opportunities. The combination of a seat and a flight is called an occurrence and there are some that do not actually exist. In FIG. 37, x represents seats that do not actually exist. The black bar shows those seats for which reservations have been made and the rectangle around the black bar indicates the reservation. A broken line shows empty seats. Because of reservations for a round trip flight, normally, seat reservations can span a number of flights.

Figure 38:
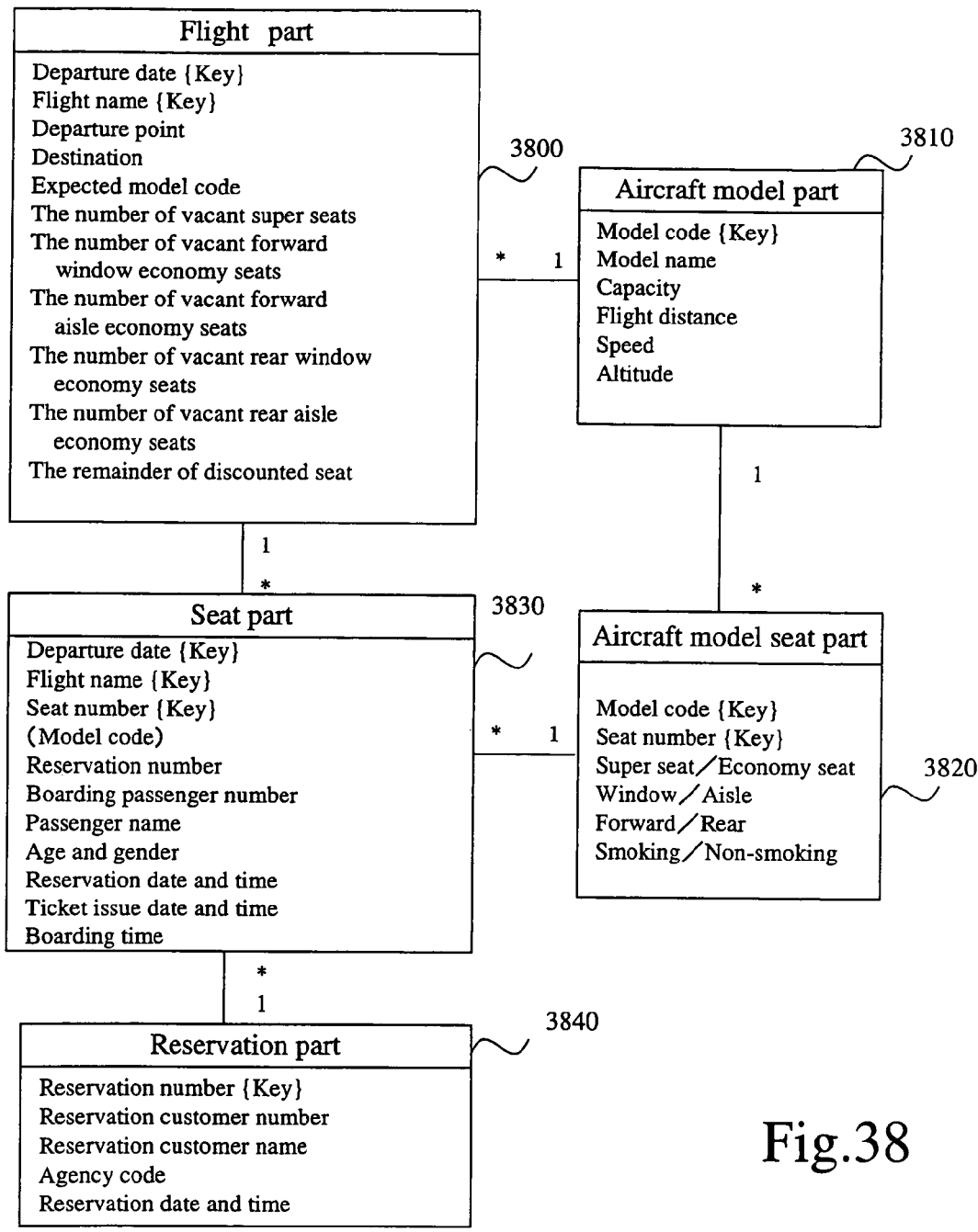
FIG. 38 shows the seat reservation data type structure for the model in FIG. 37.

The seat reservation type data structure shown in FIG. 38 is used for handling this type of work. The seat reservation type data structure includes a flight part 3800 that represents an opportunity, an aircraft model part 3810 that represents a resource group, an aircraft model seat part 3820 that represents a resource, a seat part 3830 that represents an occurrence, a reservation part 3840 that represents a reservation, a link between the flight part 3800 and the aircraft model part 3810, a link between the aircraft model part 3810 and the aircraft model seat part 3820, a link between the flight part 3800 and the seat part 3830, a link between the aircraft model seat part 3820 and the seat part 3830, and a link between the seat part 3830 and the reservations part 3840. There are N (where N is an integer of 0 or more) flight parts 3800 for each aircraft model part 3810 and there are M (where M is an integer of 0 or more) aircraft model seat parts 3820 for each aircraft model part 3810. There are K (where K is an integer of 0 or more) seat parts 3830 for each flight part 3800 and L (where L is an integer of 0 or more) seat parts 3830 for each reservation part 3840.

The flight part 3800 includes a departure date and a flight name, which are keys, and a departure point, a destination, an expected model code, the number of vacant super seats, the number of vacant forward window economy seats, the number of vacant forward aisle economy seats, the number of vacant rear window economy seats, the number of vacant rear aisle economy seats, and the remainder of discounted seats, which are all attributes. The aircraft model part 3810 includes a model code, which is a key, and a model name, capacity, flight distance, speed, and altitude, which are attributes. The aircraft model seat part 3820 includes a model code and a seat number, which are keys, and whether it is a super seat or an economy seat, whether it is a window seat or an aisle seat, whether it is a forward seat or a rear seat, whether it is a smoking seat or a non-smoking seat, which are all attributes. The seat part 3830 includes a departure date, a flight name, and a seat number, which are keys, and a reservation number, a boarding passenger number, a passenger name, an age and a gender, reservation date and time, ticket issue date and time, and a boarding time, which are all attributes. Model codes may also be included. The reservation part 3840 includes a reservation number, which is a key, and a reservation customer number, a reservation customer name, an agent code, and reservation date and time, which are all attributes.

Figure 39:
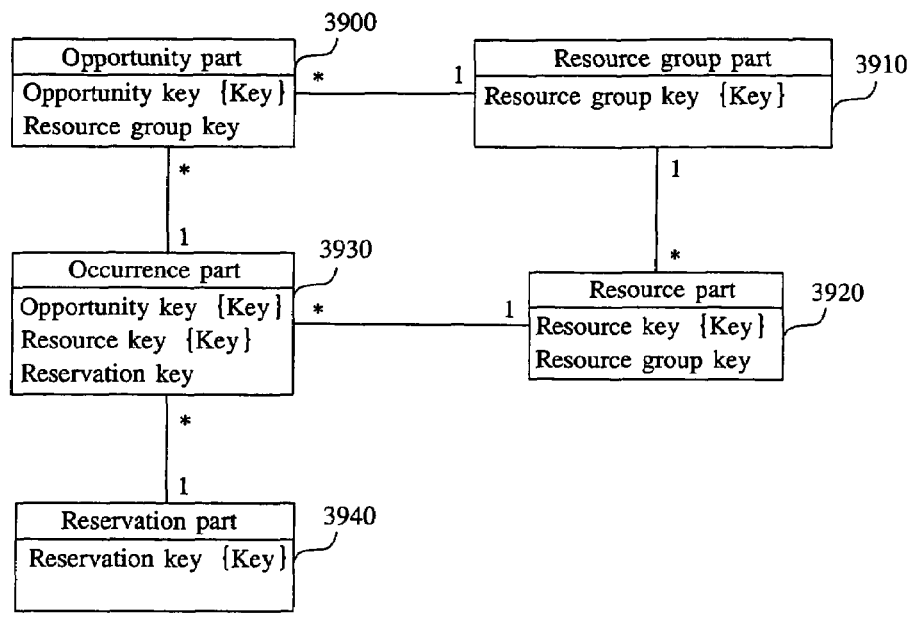
FIG. 39 is a schematic diagram that shows an overview of an general seat reservation type data structure.

Generally, as shown in FIG. 39, the seat reservation type data structure includes: an opportunity part 3900 that includes an opportunity key, which is a key, and a resource group key, which is an attribute; a resource group part 3910 that includes a resource group key, which is a key; a resource part 3920 that includes a resource key, which is a key, and a resource group key, which is an attribute; an occurrence part 3930 that includes an opportunity key and a resource key, which are keys, and a reservation key, which is an attribute; and a reservation part 3940 that includes a reservation key, which is a key.

The opportunity parts 3900 and resource group part 3910 are linked and there are N (where N is an integer of 0 or more) opportunity parts 3900 for one resource group part 3910. The resource group part 3910 and resource part 3920 are linked and there are M (where M is an integer of 0 or more) resource parts 3920 for each resource group part 3910. The resource part 3920 and occurrence parts 3930 are linked and there are K (where K is an integer of 0 or more) occurrence parts 3930 for each resource part 3920. The occurrence parts 3930 and reservation part 3940 are linked and there are L (where L is an integer of 0 or more) occurrence parts 3930 for each reservation part 3940.

Thus, resolution logic for providing attributes that cause the data structure shown in FIG. 39 to be like that shown in FIG. 38 is included in the model programs 380 for the data structure unit 320 in the seat reservation type data structure. In addition, a processing unit for executing creation, deletion, key search, and conditional search operations is provided for each of the opportunity part 3900, the resource group part 3910 and reservation part 3940. Furthermore, a processing unit for executing creation, deletion, and key search operations is provided for the occurrence part 3930. A processing unit for executing key search and conditional search operations is provided for the resource part 3920.

Furthermore, the operation base unit 310 of the seat reservation type data structure includes basic operations such as those shown below. The character strings in brackets are method names.

(1) Create new reservation (with key) (return value is true or false) (createSeatReservationWithKey1)

Creates a reservation and occurrence in accordance with input information.

(2) Register reservation (with key) (return value is information)

Creates a reservation and occurrence in accordance with input information (createSeatReservationWithKey2), and then returns information about the created reservation entity.

(3) Register reservation (without key) (return value is information)

Creates a reservation and occurrence in accordance with input information (createSeatReservationWithoutKey). Obtains a primary key from the number assignment class, then uses it. Returns information about the created reservation entity.

(4) Cancel reservation (cancelSeatReservation)

Deletes the reservation for the reservation key, which is the input information, and deletes related occurrences.

(5) Update reservation

Updates a reservation in accordance with input information (return value is true or false).

(6) Update reservation

Updates a reservation in accordance with input information (return value is information).

(7) Find reservation by key (findSeatReservationByKey)

Obtains the reservation for the designated reservation key and stores the information for that reservation in the message carrier for output.

(8) Find reservation by occurrence (findSeatReservationByOccurrence)

Obtains the reservation by the designated occurrence key, and stores the information for that reservation in the message carrier for output.

(9) Find reservation by opportunity

Searches for a reservation using the designated opportunity key and returns whether or not that reservation exists (findSeatReservationByOccasion). Alternatively, stores the search results of reservations in the designated message carrier (nextSeatReservation) and returns them.

(10) Find reservation by resource

Searches for a reservation using the designated resource key and returns whether or not the reservation exists (findSeatReservationByResource). Alternatively, stores the search results of reservations in the designated message carrier, and returns them (nextSeatReservation).

(11) Find reservation by condition

Searches for a reservation using the designated condition and returns whether or not the reservation exists. Alternatively, stores the search results of reservations in the designated message carrier, and returns them (nextSeatReservation).

(12) Add occurrence to reservation (with key) (return value is true or false) (createOccurrence1)

Adds an occurrence to a reservation in accordance with input information.

(13) Add occurrence to reservation (with key) (return value is information)

Adds an occurrence to a reservation in accordance with input information (createOccurrence2), and returns information about the created occurrence entity.

(14) Delete occurrence (removeOccurrence)

Deletes an occurrence for a reservation in accordance with the input information.

(15) Update occurrence

Updates an occurrence in accordance with the input information (return value is true or false).

(16) Update occurrence

Updates an occurrence in accordance with the input information (return value is information).

(17) Find occurrence by key (findOccurrenceByKey)

Obtains the occurrence for the designated occurrence key and stores it in the designated message carrier.

(18) Confirm vacant status (isVacant)

Confirms whether or not any occurrence corresponding to the designated resource key and opportunity key exists (return value is true or false).

(19) Change opportunity in reservation (changeReservedOccasion)

Obtains a reservation using the designated reservation key and changes the opportunity of the obtained reservation to the opportunity designated by the input information (return value is true or false).

(20) Change resource in reservation (changeReservedResource)

Obtains a reservation using the designated reservation key and changes resource of the obtained reservation to the resource designated by the input information (return value is true or false).

(21) Find reserved occurrence number

Searches for occurrences by the designated reservation key, and returns the number found.

(22) Find reserved occurrence by reservation

Searches for occurrences by the designated reservation key, and returns whether or not any exist (findOccurrenceBySeatReservation). Alternatively, stores the search results of occurrences in the designated message carrier, and returns them (nextOccurrence).

(23) Find reserved occurrence by opportunity

Searches for occurrences by the designated opportunity key, and returns whether or not any exist (findOccurrenceByOccasion). Alternatively, stores the search results of occurrences in the designated message carrier, and returns them (nextOccurrence).

(24) Find reserved occurrence by resource

Searches for occurrences with the designated resource key, and returns whether or not any exist (findOccurrenceByResource). Alternatively, stores the search results of occurrences in the designated message carrier, and returns them (nextOccurrence).

(25) Find occurrence by condition

Searches for occurrences by the designated condition and returns whether or not any exist. Alternatively, stores the search results of occurrences in the designated message carrier, and returns them (nextOccurrence).

(26) Add opportunity (with key) (return value is true or false) (createOccasionWithKey1)

Adds an opportunity in accordance with the input information.

(27) Add opportunity (without key) (return value is information)

Adds an opportunity in accordance with the input information (createOccasionWithoutKey). Obtains a primary key from the number assignment class, and uses it, and then, returns information of the created opportunity entity.

(28) Delete opportunity (removeOccasion)

Deletes the opportunity of the opportunity key, which is the input information. Such an opportunity cannot be deleted if there are reserved occurrences that are related to that opportunity.

(29) Update opportunity

Updates an opportunity in accordance with the input information (return value is true or false).

(30) Find opportunity by key (findOccasionByKey)

Obtains the opportunity for the designated opportunity key, and stores it in the designated message carrier.

(31) Find opportunity by condition

Obtains the opportunity by the designated condition, and stores this in the designated message carrier. Also, stores the search results of opportunities in the designated message carrier, and returns them (nextOccasion).

(32) Find opportunity resource group

Searches for an opportunity using the designated resource group key, and returns whether or not the opportunity exists. Alternatively, stores the search results of opportunities in the designated message carrier, and returns them (nextOccasion).

(33) Find opportunity by resource

Searches for an opportunity using the designated resource key, and returns whether or not the opportunity exists (findOccasionByResource). Stores the search results of opportunities in the designated message carrier, and returns them (nextOccasion).

(34) Find vacant opportunity by resource

Searches for a vacant opportunity using the designated resource key, and returns whether or not the vacant opportunity exists (findVacantOccasionByResource). Alternatively, stores the search results of opportunities in the designated message carrier, and returns them (nextOccasion).

(35) Find vacant opportunity by condition

Searches for a vacant opportunity using the designated condition, and returns whether or not the vacant opportunity exists. Alternatively, stores the search results of opportunities in the designated message carrier, and returns them (nextOccasion).

(36) Find resource by key (findOccasionByKey)

Obtains the resource for the designated resource key, and stores it in the designated message carrier.

(37) Find resource by condition

Searches for resources using the designated conditions, and returns whether or not any exist. Alternatively, stores the search results of resources in the designated message carrier, and returns them (nextResource).

(38) Find resource by opportunity

Searches for resources using the designated opportunity key, and returns whether or not any exist. Alternatively, stores the search results of resources in the designated message carrier, and returns them (nextResource).

(39) Find resource by resource group

Searches for resources using the designated resource group key, and returns whether or not any exist. Alternatively, stores the search results of resources in the designated message carrier, and returns them (nextResource).

(40) Find vacant resource by opportunity

Searches for vacant resources using the designated opportunity key, and returns whether or not any vacant resource exist (findVacantResourceByOccasion). Alternatively, stores the search results of resources in the designated message carrier, and returns them (nextResource).

(41) Add resource group (with key, return value is true or false)

Adds a resource group in accordance with the input information (return value is true or false).

(42) Delete resource group

Deletes (physically deletes) a resource group for the designated resource group key.

(43) Update resource group

Updates a resource group in accordance with the input information (return value is true or false).

(44) Find resource group by key

Acquires the resource group for the designated resource group key, and stores the information in the message carrier for output.

(45) Find resource group by condition

Searches for resource groups that match the designated conditions, and returns whether or not any resource group exists. Alternatively, stores the search results of resource groups in the designated message carrier, and then returns them (nextResourceGroup).

Resolution logic for providing settings peculiar to the target program is embedded in each of the model programs that correspond to the basic operations in this type of the seat reservation type data structure.

10. Pedigree Type Data Structure

The pedigree type data structure is used to manage information about destinations and sources of responsibility transfer, which is caused by creations, abolitions, mergers and etc., such as the merger or split of organizations as a result of changes in office organization.

Figure 40:
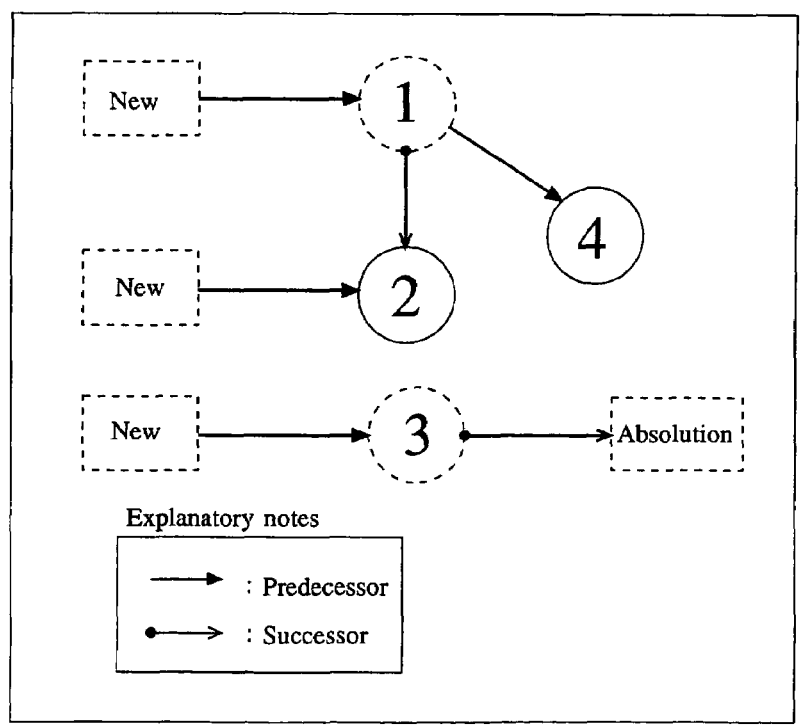
FIG. 40 is a diagram for explaining an example of a model to which a pedigree type data structure can be applied.

An example of the application of the pedigree data structure is given in FIG. 40. In the example shown in FIG. 40, a new organization (1) is created, and later, organization (4) is split away from organization (1). (1) is a predecessor for (4). Another new organization (2) is created, then (1) is absorbed by (2) and is abolished. Accordingly, (2) is the successor of (1). Another new organization (3) is created, but this dissolves without a successor. Thus, line node instances such as (1) through (4) can respectively have one link to their own predecessor and one link to their own successor. The origin of an instance without a predecessor is itself. Furthermore, this example shows that instances without successors exist in the actual world and that instances with successors are dissolved in the actual world.

Even if a plurality of instances with the same predecessor exist, there is only one successor for one predecessor. There is a case where a second instance, which is the successor of a first instance, does not necessarily have data that represents that the first instance is the predecessor. This occurs if the second instance has inherited from another instance and the first instance has arbitrarily specified that the second instance is a successor.

Figure 41:
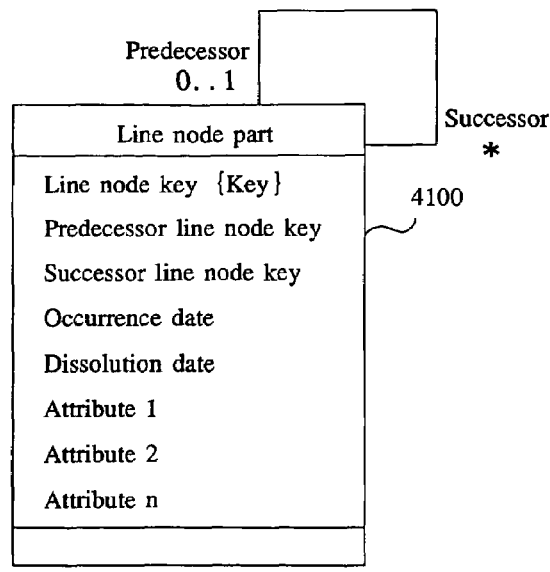
FIG. 41 is a schematic diagram that shows an overview of a pedigree type data structure.

As shown in FIG. 41, the pedigree type data structure that exhibits these sorts of characteristics include a line node part 4100. The line node part 4100 includes a line node, which is a key, and a predecessor line node key, a successor line node key, an occurrence date, a dissolution date, and attributes 1 through n, all of which are attributes. Even if a plurality of instances with the same predecessor exist, from the point of view of that predecessor, only one successor exists. It is also possible that a successor of a particular instance does not necessarily point to that particular instance as its predecessor. Resolution logic for providing attributes for the line node part 4100 is included in the model programs 380 that correspond to the data structure unit 320 of the pedigree type data structure. In addition, a processing unit for executing creation, deletion, key search, absorbed node search, and divided node search operations is provided for the line node part 4100.

Furthermore, the operation base unit 310 of the pedigree type data structure includes basic operations such as those shown below. The character strings in brackets are method names.

(1) Find line node by key (findNodeByKey)
Searches for a line node by the designated line node key.
(2) Find predecessor (findParentofNode)
Searches for the predecessor node for a node designated by a line node key.
(3) Find successor (findChildOfNode)
Searches for the successor node for a node designated by a line node key.
(4) Find absorbed node
Searches for a line node whose successor is the line node designated by the line node key (findAbsorbedNodesOfNodes). Reads out node information from the searched node list, and creates a return value (nextNode).
(5) Find divided node
Searches for a line node whose predecessor is the line node designated by the line node key (findDividedNodesOfNode). Reads out the node information from the searched node list, and creates a return value (nextNode).
(6) Find origin search
Searches for the predecessor node that is the origin of the node designated by the line node key (findRootOfNode).
(7) Find final successor (findLeafOfNode)
Searches for the final successor of the line node designated by the line node key.
(8) Check same line (upwards) (isAccessibleAncestor)
Investigates whether or not a line node can be accessed in the upward direction from the line node that is the origin point.
(9) Check same line (downwards) (isAccessibleDescendant)
Investigates whether or not a line node can be accessed in the downward direction from the line node that is the origin point.
(10) Find node by condition
Searches for a node using the designated condition.
(11) Create line node with key (return value is true or false) (createNodeWithKey1)
Creates a new line node with the designated key.
(12) Create line node with key (return value is the created node information) (createNodeWithKey2)
Creates a new line node with the designated key.
(13) Create line node without key (return value is created node information) (createNodeWithoutKey)
Creates a new node without the designation of the key. Obtains the key from the number assignment service.
(14) Delete line node (removeNode)
Deletes a line node designated with the key. The line node cannot be deleted if the line node is linked by another line node.
(15) Dissolve line node (dissolveNode)
Sets the date on the line node dissolution day and dissolves the line node.
(16) Revive dissolved line node (reviveNode)
Sets null as the line node dissolution day and invalidates the dissolution state.
(17) Update node information
Updates line node information. The return value may be true or false or may be node information.
(18) Convert line node
Creates a line node and dissolves the predecessor node.
(19) Absorb line node
Sets one existing one line node as the successor of a plurality of line nodes.
(20) Merge line nodes
Sets one newly created line node as the successor of a plurality of line nodes.
(21) Split line node
Creates a plurality of new line nodes whose predecessor is the designated line node.
(22) Divide line node
Dissolves the designated line node, and then creates a plurality of new line nodes whose predecessors is the designated line node. Resolution logic for providing settings peculiar to the target program is embedded in each of the model programs that correspond to the basic operations in the pedigree type data structure.

11. Stock Type Data Structure

Figure 42:
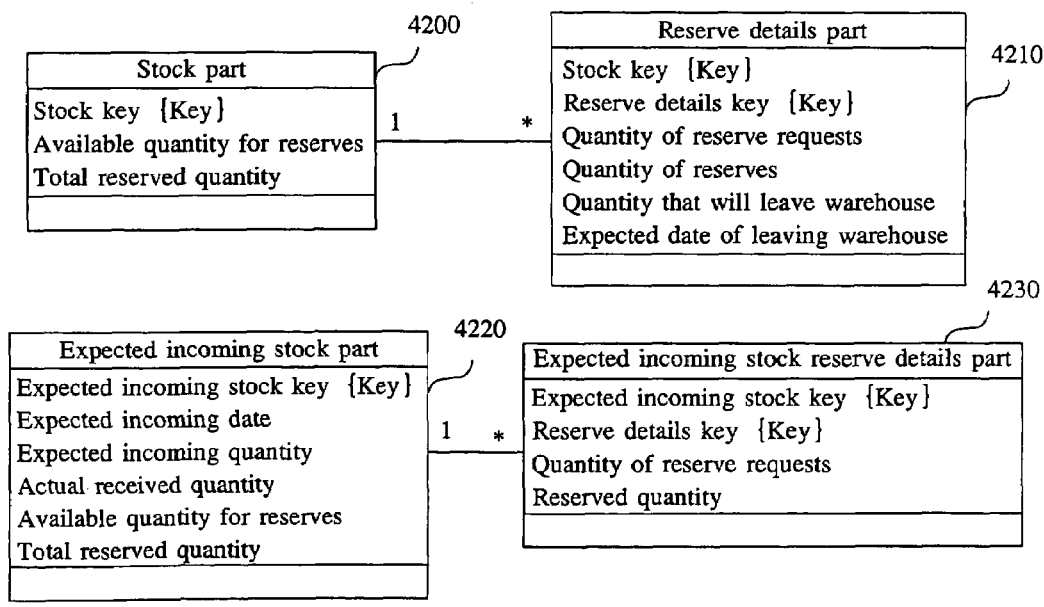
FIG. 42 is a schematic diagram that shows an overview of a stock type data structure.

The stock type data structure is used to manage state changes that are caused by any type of transactions, such as stock and/or balances. As shown in FIG. 42, the stock type data structure includes a stock part 4200 and reserve details part 4210 for the stock currently in the warehouse and an expected incoming stock part 4220 and expected incoming stock reserve details part 4230 for future stock that will be placed in the warehouse in the future. There are N (where N is an integer of 0 or more) reserve details parts 4210 for one stock part 4200, and links between the reserve detail parts 4210 and the stock part 4200. In addition, there are M (where M is an integer of 0 or more) expected incoming reserve stock detail parts 4230 for one expected incoming stock part 4220, and links between the expected incoming reserve stock detail parts 4230 and the expected incoming stock part 4220.

The stock part 4200 includes a stock key (for example, a combination of a warehouse code (required if there is more than one warehouse), a product code, an owner type, an owner code, a standard (color and size) code, and a lot number'), which is a key, and available quantity for reserves and total reserved quantity, which are attributes. The available quantity for reserves plus the total reserved quantity equals the stock quantity. The reserve details part 4210 includes a stock key and a reserve details key, which are keys, and quantity of reserve requests, quantity of reserves, quantity that will leave warehouse and expected date for leaving warehouse, which are all attributes. The reserve details part 4210 is generated when orders for products are received. Note however, that it is possible to provide it at the beginning of the processing.

The expected incoming stock part 4220 includes an expected incoming stock key (may be more simple than the stock key because there is uncertainty), which is a key, and an expected incoming date, expected incoming quantity, actual received quantity, available quantity for reserves, and total reserved quantity, which are all attributes. The expected incoming stock reserve details part 4230 includes an expected incoming stock key and a reserve details key, which are keys, and quantity of reserve requests and reserved quantity, which are attributes.

The model programs 380 that correspond to the data structure unit 320 in the stock type data structure includes resolution logic for providing attributes for the stock part 4200, the reserve details part 4210, the expected incoming stock parts 4220, and the expected incoming stock reserve details parts 4230. In addition, a processing unit for executing creation, deletion, key searches, and conditional search operations is respectively provided for the stock parts 4200, the reserve details parts 4210, the expected incoming stock parts 4220, and the expected incoming stock reserve details part 4230.

Furthermore, the operation base unit 310 of the stock type data structure includes basic operations such as those shown below. The character strings in brackets are method names.

(1) Find stock (findStockByKey)

Searches for a stock entity instance that has the designated key.

(2) Find stock by condition

Prepares groups of stock entity instances that match the condition and returns whether or not such preparation was possible. Then, obtains the information for the next stock entity (nextStock).

(3) Register stock (createStockWithKey)

Creates a stock entity instance that has the designated key (return value is true or false).

(4) Register stock (return value is entity information)

Creates a stock entity instance that has the designated key (CreateStockWithKey), and then returns the created stock entity information.

(5) Set available reserve quantity (setStockAvailableQuantity)

Searches for a stock entity instance that has the designated key and sets the designated value as the available reserve quantity, which is an attribute of the abstract level.

(6) Delete stock (removeStock)

Deletes an instance of a stock entity that has the designated key.

(7) Revise stock

Updates information for an instance of a stock entity that has the designated key (return value is true or false).

(8) Revise stock

Updates information for an instance of a stock entity that has the designated key (return value is the updated entity information).

(9) Find stock reserve (findReservationByKey)

Searches for an instance of a stock reserve details entity that has the designated key.

(10) Find all stock reserves

Searches for all instances of a stock reserve details entity that has the designated key (findReservationsByStock), and then acquires the information for the next stock reserve details entity (nextReservation).

(11) Reserve stock (createReservation)

Reserves designated stock to create one stock reserve details entity instance (return value is the created entity information).

(12) Reserve stock (createReservations)

Reserves a plurality of designated stocks to create one stock reserve details entity instance for each reserved stock (return value is the number of designated stocks).

(13) Reserve stock by condition

Reserves stock that match the condition and creates a stock reserve details entity instance (return value is the created stock reserve details entity).

(14) Remove stock reserve (removeReservation)

Deletes a stock reserve details entity instance that has the designated key. In other words, cancels the stock reserve. At the same time, reduces the total reserved quantity and increases the available quantity for reserves. Note however, that if the quantity that will leave warehouse is set in the stock reserve, the stock reserve cannot be removed.

(15) Revise stock reserve

Updates the information for a stock reserve details entity instance that has the designated key (return value is true or false).

(16) Revise stock reserve

Updates the information for a stock reserve details entity instance that has the designated key (return value is the updated entity information).

(17) Allocate stock (allocation with reserve)

This is a stock allocation for deliver with the reserve. Performs the allocation for a stock reserve details entity instance that has the designated key and sets the quantity that will leave warehouse (deliverWithReservation). Then, returns information of the stock entity corresponding to the allocated stock reserve details entity.

(18) Allocate stock (allocation without reserve)

This is a stock allocation for deliver without a reserve. Performs the allocation for a stock reserve details entity instance that has the designated key and sets the quantity that will leave warehouse. At the same time, creates a stock reserve details entity instance that corresponds to the allocated stock (return value is the updated stock entity information) (deliverWithoutReservation).

(19) Ship reservation (shipReservation)

Performs processing for shipment of the reserved stock. Deletes a stock reserve details entity instance that has the designated key and, at the same time, reduces the total reserved quantity (return value is stock entity information).

(20) Find expected incoming stock (findFutureReceptionByKey)

Searches for an expected incoming stock entity instance that has the designated key.

(21) Find expected incoming stock by condition

Prepares a group of expected incoming stock entity instances that match the condition and returns whether or not preparation was possible. Then, obtains information for the next expected incoming stock entity (nextFutureReception).

(22) Register expected incoming stock (createFutureReceptionWithKey)

Creates an expected incoming stock entity instance that has the designated key (return value is true or false).

(23) Cancel expected incoming stock (removeFutureReception)

Deletes an expected incoming stock entity instance that has the designated key, in other words, cancels the expected incoming stock. Cancels the expected incoming stock regardless of whether or not there is reserve information.

(24) Revise expected incoming stock

Updates information for an expected incoming stock entity instance that has the designated key (return value is true or false).

(25) Revise expected incoming stock

Updates information for an expected incoming stock entity instance that has the designated key (return value is the updated entity information).

(26) Find expected incoming stock reserve (findFutureReservationByKey)

Searches for an expected incoming stock reserve entity instance that has the designated key.

(27) Find expected incoming stock reserve

Searches for all expected incoming stock reserve entity instances that have the designated expected incoming stock key (findFutureReservationsByFutureReception). Then, obtains information for the next expected incoming stock reserve entity (nextFutureReservation).

(28) Reserve expected incoming stock

Reserves the designated expected incoming stock and creates an expected incoming stock reserve details entity instance (return value is information for the created expected incoming stock reserve details entity) (createFutureReservation).

(29) Cancel expected incoming stock reserve (removeFutureReservation)

Deletes an expected incoming stock reserve details entity instance. That is, cancels the expected incoming stock reserve.

(30) Revise expected incoming stock reserve

Updates information for an expected incoming stock reserve details entity instance that has the designated key (return value is true or false).

(31) Revise expected incoming stock reserve

Updates information for an expected incoming stock reserve details entity instance that has the designated key (return value is the updated entity information).

Resolution logic for providing settings peculiar to the target program is embedded in each of the model programs that correspond to the basic operation for the stock type data structure.

12. Plan Type Data Structure

The plan type data structure is used to manage planned values and actual values in plans such as sales plans and production plans. In plan management works, plans progress with the passage of time and, for example, sales targets and actual results are managed for each product, or each organization. Accordingly, a time axis and other axes, such as product and office organization, are defined, and data relating to combinations of the axes, such as goals and results for each product with the passage of time, goals and results for each organization with the passage of time, and goals and results for each combination of organization and product with the passage of time, are managed. The axis type that is predetermined is only time axis. Other axes can represent anything else. The number of other axes is arbitrary.

Figures 43, 44:
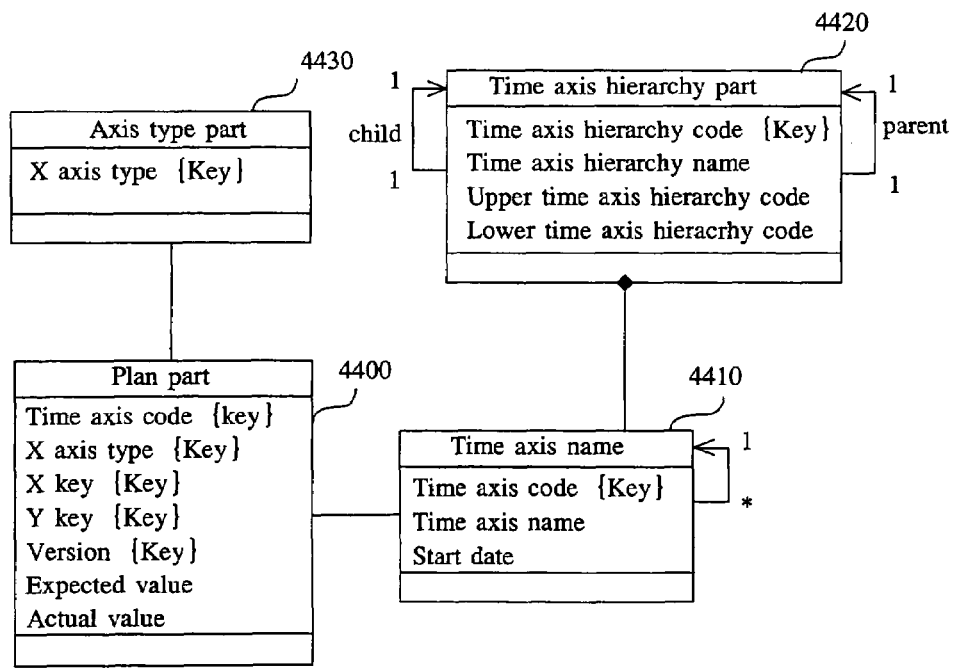
FIG. 43 is a diagram for explaining an example of a model to which a plan type data structure can be applied.
FIG. 44 is a schematic diagram that shows an overview of a plan type data structure.

For example, as shown in FIG. 43, product (X axis), organization (Y axis) and time (T axis) axes are prescribed. Target values and actual results are managed for headquarters, business divisions, and sections that represent the organizational hierarchy and for each of product types, models, and products that represent the product hierarchy. In addition, as to the time axis, business year, monthly, and daily data are managed. Note however, that data is actually managed only in the parts of the time (T axis) column in FIG. 43, which are marked with a circle. In other words, data for product types is managed for headquarters by business year and for business divisions by business year and by month. Data for models are managed for both headquarters and business divisions by business year and by month. Data for products is managed for business divisions by month and for sections by business year, by month, and by day.

The plan type data structure that is to deal with the above types of work has a structure as shown in FIG. 44. In other words, it includes a plan part 4400, a time axis part 4410, a time axis hierarchy part 4420, and an axis type part 4430. There are links between the plan part 4400 and the time axis part 4410, between the plan part 4400 and the axis type part 4430, and between the time axis hierarchy part 4420 and the time axis part 4410. The axis type part 4430 is provided because of cases in which the data represented by the axis is not simple data but data with a hierarchical structure (like the products shown above (if codes relating to products are hierarchically assembled)). These are not shown as entities here but entities for the Y-axis can be prepared. Alternatively, it is possible to form a configuration that reads data for the Y-axis from other systems (that uses a view prepared for the Y-axis). For example, a view can be provided if data corresponding to the Y-axis is in a simple type data structure or tree type data structure (as in the office organization shown above). Here, the view is an entity that can be merely referenced.

This plan part 4400 includes a time axis code (key) for specifying the time axis, an X-axis type (key) for specifying the type of the X-axis which represents such as the product type, an X key (key) that represents the contents of the X-axis, a Y key (key) that represents the contents of the Y-axis, a version number (key) that represents the plan version, and expected value and actual value, which are attributes. For example, '199904' (session of April, 1999) is set as the time axis code, 'Product type' as the X-axis type, 'PC' (product code) as the X key, '234' (business division code) as the Y key, '01' as the version, '12000000' as the expected value, and '10321000' as the actual value.

The time axis part 4410 includes a time axis code (key), and a time axis name and a start date, which are attributes. The time axis part 4410 is provided because types for times including business year, half year, quarter, and month can be defined and they have different start dates. For example, '199911' is set as the time axis code, 'session of November, 1999' as the time axis name, and '19991021' as the start date.

The time axis hierarchy part 4420 includes a time axis hierarchy code (key), and a time axis hierarchy name, an upper time axis hierarchy code, and a lower time axis hierarchy code, which are attributes. The time axis hierarchy part 4420 is provided because time is hierarchically managed such as business years, monthly, and daily. The upper time axis hierarchy code and lower time axis hierarchy code are set and vertical relationship is determined on a one to one basis. For example, 'monthly session' is set as the time axis hierarchy code, 'monthly' as the time axis hierarchy name, 'yearly session' as the upper time axis hierarchy code, and 'daily session' as the lower time axis hierarchy code. The axis type part 4430 includes the X axis type (key).

Thus, resolution logic for providing attributes for the plan part 4400, the time axis part 4410, the time axis hierarchy part 4420, and the axis type part 4430 is embedded in the model programs that correspond to the data structure unit 320 for this plan type data structure. Resolution logic for designating plan management units (for example, products and/or organizations) is also provided. In addition, a processing unit for executing creation, deletion, key search, and conditional search operations is respectively provided for at least the plan part 4400 and time axis part 4410.

Furthermore, the operation base unit 310 of the plan type data structure includes basic operations such as those shown below. The character strings in brackets are method names.

(1) Register time axis (createTimeAxis1)

Registers a new time axis. The return value is a true or false value. False is returned when an error occurs.

(2) Register time axis (createTimeAxis2)

Registers a new time axis. The return value is the created time axis information.

(3) Register time axis collectively (createTimeAxisTree)

Register a time axis with a tree structure. The time axis on the lower level has to be within the period of the upper level and those start dates must match.

(4) Delete time axis (removeTimeAxisTree)

Deletes the designated time axis and all lower time axes. Note however, that if even one plan is linked to the time axis, the key for that plan is returned and the time axis is not deleted.

(5) Update time axis (updateTimeAxis1)

Updates the information of the designated time axis (return value is a true or false value). Returns false when an error occurs.

(6) Update time axis (updateTimeAxis2)

Updates the information of the designated time axis. The return value is the updated time axis information.

(7) Find time axis by key (findTimeAxisByKey)

Searches for a time axis that matches the designated key. Returns relevant time axis information.

(8) Check time axis use (checkUsedTimeAxisTree)

Searches for plans that refer to the designated time axis. Returns the group of matching plans.

(9) Convert to child time axis by period designation (convertTimeAxisKeys)

By using the designated start date and time axis hierarchy, returns all child time axes belonging to that period.

(10) Register plan (createPlan1)

Registers a new plan (return value is true or false). Returns false when an error occurs.

(11) Register plan (createPlan2)

Registers a new plan (return value is information). Returns the registered plan information.

(12) Register plan result (createResult1)

Registers a new plan result (return value is true or false). Returns false when an error occurs.

(13) Register plan result (createResult2)

Registers a new plan result (return value is information). Returns the registered plan result information.

(14) Register plan with time axis creation (createPlanWithAxis)

Creates both the designated plan and time axis. Returns information for the created plan.

(15) Register plan result with time axis creation (createResultsWithAxis)

Creates both the designated plan result and time axis. Returns information for the created plan results.

(16) Update plan (updatePlan)

Changes the contents of the designated plan. Returns false if there is an error.

(17) Update plan result (updateResult)

Changes the contents of the designated plan result. Returns false if there is an error.

(18) Update expected plan value (updatePlanValue)

Changes the expected value of the designated plan. Returns the information for the plan after the update if there is no error.

(19) Update plan result value (updateResultValue)

Changes the value of the designated plan result. Returns the information for the plan result after the update if there is no error.

(20) Find plan by key (findPlanByKey)

Searches for a plan that matches the designated key. Returns the information of the matched plan.

(21) Find plan result by key (findResultsByKey)

Searches for a plan result that matches the designated key. Returns the information of the matched plan result.

(22) Find plans by axis collectively (findPlansByAxis)

In this search function, the information for a plan to be searched and the axis for plans, which are immediately below the plan to be searched, are designated as inputs. When this function is executed, (1) information for the matched plan in the search and (2) all plans that exist immediately below (the matched plan) as to the designated axis are obtained.

(23) Find plan results by axis collectively (findResultsByAxis)

In this search function, the information for a plan result to be searched and the axis for the plan results, which are immediately below the plan to be searched, are designated as inputs. When this function is executed, (1) information for the matched plan result in the search and (2) all plan results that exist immediately below (the matched plan result) as to the designated axis are obtained.

(24) Delete plan (removePlan)

Deletes the designated plan.

(25) Delete plan result (removeResult)

Deletes the designated plan result.

(26) Calculate expected total value (calcPlanValue)

Determines the expected total value of the designated plan by adding the expected values of plan immediately below (the designated plan) as to the designated axis.

(27) Calculate actual result total value (calcResultValue)

Determines the actual total value of the designated plan result by adding the actual values of plan results immediately below (the designated plan result) as to the designated axis.

(28) Calculate plan used rate (calcPlanUsedRate)

Determines the rate of the total of the expected values of plans that exist immediately below (the designated plan) as to the designated axis for the expected value of the designated plan.

(29) Calculate difference between plan and actual result (calcDifference)

Calculates the difference between the expected values of the designated plan and the actual plan result.

Resolution logic for performing settings peculiar to the target programs is embedded in each of the model programs that correspond to the basic operations for the plan type data structure.

This embodiment of the present invention explained above is one example and various modifications are possible. For example, examples of the user interfaces were given but other screens with the same contents can also be used. Also, examples of basic operations for each data structure were given but the basic operations do not have to be as described above. It is possible to provide fewer basic operations and in such a case, the user may provide the remainder by himself. In addition, it is possible to provide more basic operations for the user to reduce his workloads Data structures described above are examples. Therefore, other data structures may be prepared. On the other hand, fewer number of the data structure may be implemented.

Also, in the example described above, the program automatic generation apparatus for generating a target program is implemented in combination of the program for performing the above described processing and a computer, but the apparatus may be implemented by combining dedicated circuits and etc. Furthermore, if it is implemented by combining the program and a computer, the program can be stored on storage devices or storage media such as floppy disk, CD-ROM, DVD, HDD, semi-conductor memory, and etc.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. An automatic program generation apparatus for automatically generating a program that will perform a predetermined processing, comprising:

a plurality of data resolution units that respectively include a model program for a corresponding data structure, wherein said model program includes resolution logic for performing a setting peculiar to said predetermined processing; and a resolution unit for generating a program for performing said predetermined processing by acquiring resolution information relating to said setting peculiar to said predetermined processing for the resolution logic included in said model program in said data resolution unit corresponding to a selected data structure and by synthesizing the model program and the resolution information for the resolution logic, and wherein said resolution unit comprises an analyzer that analyzes said resolution logic included in said model program in said data resolution unit corresponding to the selected data structure, to specify items of said resolution information to be inputted, and prompts a user to input said resolution information for said resolution logic based on the specified items in the analysis.

2. The automatic program generation apparatus according to claim 1, wherein the data resolution unit corresponding to the selected data structure is either a data resolution unit for a simply type data structure, a data resolution unit for a slip type data structure, a data resolution unit for a hierarchy type data structure, a data resolution unit for a tree type data structure, a data resolution unit for a stock type data structure, a data resolution unit for a time band reservation type data structure, a data resolution unit for a plan type data structure, a data resolution unit for a seat reservation type data structure, a data resolution unit for a composition type data structures, a data resolution unit for a detail-led slip type data structure, a data resolution unit for a pedigree type data structure, or a data resolution unit for a matrix type data structure.

3. The automatic program generation apparatus according to claim 1, wherein said data resolution unit comprises:

a first model program that prescribes a data structure comprising one or a plurality of record types and a link between record types if a plurality of record type exists, and that includes resolution logic for performing a setting for said predetermined processing as to said data structure; and a second model program that includes resolution logic for performing a setting for said predetermined processing as to an operation, and that corresponds to a basic operation executed for said data structure.

4. An automatic program generation program embodied on a medium, for automatically generating a program that will perform a predetermined processing, said automatic program generation program comprising:

acquiring resolution information relating to a setting peculiar to said predetermined processing for resolution logic included in a model program in a data resolution unit corresponding to a selected data structure, wherein said data resolution unit includes said model program for a corresponding data structure, and said model program includes the resolution logic for performing a setting peculiar to said predetermined processing; and generating a program for performing said predetermined processing by synthesizing the model program and the acquired resolution information for the resolution logic, and wherein said acquiring comprises:

analyzing said resolution logic included in said model program in said data resolution unit corresponding to the selected data structure, to specify items of said resolution information to be inputted; and prompting a user to input said resolution information for said resolution logic based on the specified items.

5. The automatic program generation program according to claim 4, wherein said data resolution unit comprises:

a first model program that prescribes a data structure comprising one or a plurality of record types and a link between record types if a plurality of record type exists, and that includes resolution logic for performing a setting for said predetermined processing as to said data structure; and a second model program that includes resolution logic for performing a setting for said predetermined processing as to an operation, and that corresponds to a basic operation executed for said data structure.

6. The automatic program generation program according to claim 5, wherein said first model program prescribes a simple type data structure comprising one kind of record type, and includes resolution logic for providing an attribute for the record, and wherein resolution logic for providing a setting in accordance with said predetermined specification is embedded in said second model program, and said second model program is to execute at least addition, deletion, update, and search operations for said record.

7. The automatic program generation program according to claim 5, wherein said first model program prescribes a slip type data structure with one kind of header record type, one kind of detail record type, and links for linking said one header record type and one or a plurality of said detail record types, and includes a resolution logic for providing attributes for the header record and the detail record, and wherein said second model program is to execute, for said slip type data structure, at least an operation for creating a new slip and an operation for searching slips, and resolution logic for defining a header record state by relationship with operations and resolution logic for describing settings in accordance with said predetermined specification through a record attribute, a record state, or a combination of said record attribute and said record state are embedded in said second model program.

8. The automatic program generation program according to claim 5, wherein said first model program prescribes a time band reservation type data structure configured by a resource record type, a reservation record type relating to a resource reservation, a reservation cell record type relating to a reservation time unit, links for linking one resource record type and one or a plurality of reservation record types, and a link for linking one reservation record type and one or a plurality of reservation cell record types, and includes resolution logic for providing an attribute to each record in said time band reservation type data structure, and wherein said second model program includes resolution logic for providing a setting in accordance with said predetermined specification, and is to execute for said time band reservation type data structure, at least an operation for registering a reservation, an operation for deleting a reservation, an operation for updating a reservation, and an operation for searching reservations.

9. The automatic program generation program according to claim 5, wherein said first model program prescribes a matrix type data structure that includes a row record type, a column record type, a cell record type that represents an intersection of the row and the column, and a column type record type that represents an attribute that can be allocated to each cell, and includes resolution logic for providing attributes to the row record, the column record, and the column type record and resolution logic for allocating the column type record to a cell, and wherein said second model program includes resolution logic for performing a setting in accordance with said predetermined specification, and is to execute at least an add operation, a change operation, a delete operation, and a search operation for the row record, the column record, and the column type record in said matrix type data structure.

10. The automatic program generation program according to claim 5, wherein said first model program prescribes a detail-led slip type data structure comprising a plurality of kinds of header record types, one kind of detail record type, and links for linking said plurality of kinds of header record types and said one kind of detail record type, and includes resolution logic for providing an attribute for each record in said detail-led slip type data structure, and wherein said second model program is to execute for said detail-led slip type data structure, at least an operation for creating a new slip, an operation for searching slips, an operation for deleting a slip, and an operation for changing a slip header type, and resolution logic for defining a header record state by relationship with operations and resolution logic for describing a setting peculiar to said predetermined specification by a record attribute, a record state, or a combination of the record attribute and the record state are embedded in said second model program.

11. The automatic program generation program according to claim 5, wherein said first model program prescribes a stock type data structure comprising a stock record type, a stock reserve details record type for prescribing a stock reserve, an expected incoming stock record type, an expected incoming stock reserve details record type for prescribing a reserve for expected incoming stocks, a link for linking said stock record type and said stock reserve details record type, and a link for linking said expected incoming stock record type and said expected incoming stock reserve details record type, and includes resolution logic for providing an attribute for each record in said stock type data structure, and wherein said second model program is to execute for each record included in said stock type data structure, at least an add operation, a delete operation, and a search operation, and includes resolution logic for providing a setting in accordance with said predetermined specification.

12. The automatic program generation program according to claim 5, wherein said first model program prescribes a seat reservation type data structure comprising a resource record type, a resource group record type for prescribing a resource group, an opportunity record type for prescribing an opportunity to use the resource group, an occurrence record type for prescribing a combination of the opportunity and the resource, and a reservation record type relating to one or a plurality of occurrences, and includes resolution logic for providing an attribute for each record in said seat reservation type data structure, and wherein said second model program is to execute for each record included in said seat reservation type data structure, at least a generation operation, a deletion operation, and a search operation, and includes resolution logic for providing a setting in accordance with said predetermined specification.

13. The automatic program generation program according to claim 5, wherein said first model program prescribes a plan type data structure comprising a plan record type, a time axis record type relating to a time axis, and a time axis hierarchy record type that prescribes a management unit for said time axis, and includes resolution logic for providing an attribute for the plan record, the time axis record, and the time axis hierarchy record and resolution logic for designating a plan management unit, and wherein said second model program is to execute for each record included in said plan type data structure, at least an addition operation, a deletion operation, and a search operation, and includes resolution logic for providing a setting in accordance with said predetermined specification.

14. The automatic program generation program according to claim 5, wherein said first model program prescribes a composition type data structure comprising a node record type, a node version record type for managing the node version, and a composition record type that represents composition relationship between node version records, and includes resolution logic for providing an attribute for each record included in said composition type data structure, and wherein said second model program is to execute for each record included in said composition type data structure, at least an addition operation, a deletion operation, a search operation, and resolution logic for providing a setting in accordance with said predetermined specification is embedded in said second model program.

15. The automatic program generation program according to claim 5, wherein said first model program prescribes a pedigree type data structure comprising one kind of record type to which related information for preserving line continuity is attached, and includes resolution logic for providing an attribute for the record, and wherein said second model program is to execute for the record, at least an addition operation, a deletion operation, and a search operation, and includes resolution logic for providing a setting in accordance with said predetermined specification.

16. The automatic program generation program according to claim 5, wherein said first model program prescribes a tree data structure comprising a record type for holding information relating to an upper node, and includes resolution logic for providing an attribute for the record, and wherein said second model program is to execute for the record, at least an addition operation, a deletion operation, and a search operation, and resolution logic for describing a setting in accordance with said predetermined specification by a record attribute, a record state, or a combination of the record attribute and the record state is embedded in said second model program.

17. The automatic program generation program according to claim 5, wherein
said first model program prescribes a hierarchy type data structure including one record type which is a root and a record type in each level for holding information relating to a parent node, and includes resolution logic for providing an attribute for each record included in the hierarchy type data structure, and
wherein said second model program is to execute for each record, at least an addition operation, a deletion operation, and a search operation, and resolution logic for describing a setting in accordance with said predetermined specification by the record attribute, the record state, or a combination of the record attribute and the record states is embedded in said second model program.

18. An automatic program generation method for automatically generating a program that will perform a predetermined processing in a computer, said automatic program generation method comprising:
acquiring resolution information relating to a setting peculiar to said predetermined processing for a resolution logic included in a model program in a data resolution unit corresponding to a selected data structure, wherein said data resolution unit includes said model program for a corresponding data structure, and said model program includes the resolution logic for performing a setting peculiar to said predetermined processing; and
generating a program for performing said predetermined processing by synthesizing the model program and the acquired resolution information for the resolution logic, and
wherein said acquiring comprises:
analyzing said resolution logic included in said model program in said data resolution unit corresponding to the selected data structure to specify items of said resolution information to be inputted; and
prompting a user to input said resolution information for said resolution logic based on the specified items.

19. An apparatus for generating a program that will perform predetermined processing, the apparatus comprising:
data resolution units each having a model program for a corresponding data structure, wherein each model program includes resolution logic for performing a setting which is unfamiliar to the predetermined processing;
a resolution unit which generates a program for performing the predetermined processing by obtaining resolution information related to the setting and by synthesizing the model program and the resolution information for the resolution logic; and
means for analyzing the resolution logic included in the model program of the data resolution unit corresponding to the selected data structure to specify items of the resolution information to be inputted and prompting a user to input the resolution information for the resolution logic based on the analysis.

* * * * *

UNITED STATES PATENT AND TRADEMARK OFFICE
CERTIFICATE OF CORRECTION

| | |
|---|---|
| PATENT NO. | : 6,973,639 B2 |
| APPLICATION NO. | : 09/767857 |
| DATED | : December 6, 2005 |
| INVENTOR(S) | : Keiji Hashimoto et al. |

It is certified that error appears in the above-identified patent and that said Letters Patent is hereby corrected as shown below:

On the title page item [56], Column 2 (Other Publications), Line 3, after "Vol. 14" insert - - , - -.
Column 47, Line 38, delete "structures," and insert - - structure, - - therefor.

Signed and Sealed this

Twenty-second Day of August, 2006

JON W. DUDAS
*Director of the United States Patent and Trademark Office*